United States Patent
Arasi et al.

(10) Patent No.: US 10,793,776 B2
(45) Date of Patent: Oct. 6, 2020

(54) COMPOSITIONS COMPRISING FUNCTIONALIZED POLYVINYL ALCOHOL AND NANOCAPSULES CONTAINING A LIQUID CRYSTALLINE MEDIUM

(71) Applicant: MERCK PATENT GMBH, Darmstadt (DE)

(72) Inventors: Hassan Arasi, Southampton (GB); Mariam Namutebi, Southampton (GB); Rachel Tuffin, Chandlers Ford (GB)

(73) Assignee: MERCK PATENT GMBH, Darmstadt (DE)

( * ) Notice: Subject to any disclaimer, the term of this patent is extended or adjusted under 35 U.S.C. 154(b) by 50 days.

(21) Appl. No.: 16/153,023

(22) Filed: Oct. 5, 2018

(65) Prior Publication Data
US 2019/0106627 A1    Apr. 11, 2019

(30) Foreign Application Priority Data
Oct. 5, 2017    (EP) .................................... 17195020

(51) Int. Cl.
| | | |
|---|---|---|
| *G02F 1/1333* | (2006.01) | |
| *C09K 19/54* | (2006.01) | |
| *C09K 19/30* | (2006.01) | |
| *C09K 19/34* | (2006.01) | |
| *C08F 16/06* | (2006.01) | |
| *B01J 13/18* | (2006.01) | |
| *G02F 1/1334* | (2006.01) | |
| *C09K 19/20* | (2006.01) | |
| *C09K 19/18* | (2006.01) | |
| *C09K 19/12* | (2006.01) | |
| *C09K 19/04* | (2006.01) | |

(52) U.S. Cl.
CPC ........... *C09K 19/544* (2013.01); *B01J 13/185* (2013.01); *C08F 16/06* (2013.01); *C09K 19/12* (2013.01); *C09K 19/18* (2013.01); *C09K 19/20* (2013.01); *C09K 19/3003* (2013.01); *C09K 19/3402* (2013.01); *G02F 1/1334* (2013.01); *C08F 2810/30* (2013.01); *C09K 2019/0466* (2013.01); *C09K 2019/123* (2013.01); *C09K 2019/181* (2013.01); *C09K 2019/183* (2013.01); *C09K 2019/3009* (2013.01); *C09K 2019/3025* (2013.01); *C09K 2019/3422* (2013.01); *C09K 2019/546* (2013.01); *C09K 2219/03* (2013.01)

(58) Field of Classification Search
CPC ...... C09K 19/544; C09K 19/12; C09K 19/18; C09K 19/20; C09K 19/3003; C09K 19/3402; C09K 2019/0466; C09K 2019/123; C09K 2019/181; C09K 2019/183; C09K 2019/3009; C09K 2019/3025; C09K 2019/3422; C09K 2019/546; C09K 2219/03; G02F 1/1333; G02F 1/1334; B01J 13/185; C08F 16/06; C08F 2810/30
USPC ...................................................... 252/299.5
See application file for complete search history.

(56) References Cited

U.S. PATENT DOCUMENTS

| | | | |
|---|---|---|---|
| 4,435,047 A | 3/1984 | Fergason | |
| 4,688,900 A | 8/1987 | Doane | |
| 7,397,530 B2 | 7/2008 | Dyrli et al. | |
| 2012/0113363 A1 | 5/2012 | Lim | |
| 2014/0184984 A1 | 7/2014 | Kim | |
| 2016/0178941 A1 | 6/2016 | Kim | |
| 2019/0106627 A1* | 4/2019 | Arasi ................... | C09K 19/544 |

FOREIGN PATENT DOCUMENTS

| | | |
|---|---|---|
| WO | 04063309 A1 | 7/2004 |
| WO | 2013110564 A1 | 8/2013 |
| WO | 18042026 A1 | 3/2018 |
| WO | 18078078 A1 | 5/2018 |

OTHER PUBLICATIONS

Nuttelman et al: Biomaterials 23 (17) (2002) pp. 3617-3626.
Extended EP search report in corresponding EP 18198163.0 dated Mar. 13, 2019 ) pp. 1-2.
Kang and Kim; Optics Express, 2013, vol. 21, pp. 15719-15727.

* cited by examiner

*Primary Examiner* — Geraldina Visconti
(74) *Attorney, Agent, or Firm* — Millen White Zelano and Branigan, PC; John Sopp

(57) ABSTRACT

The use of functionalized polymerizable polyvinyl alcohol as a binder or matrix for a dispersion of nanoparticles, wherein the nanoparticles respectively comprise a polymeric shell and a core containing a liquid crystalline medium. Composites comprising the functionalized polymer and the nanocapsules, methods for preparing the composites and electro-optical devices containing such composites.

20 Claims, No Drawings

COMPOSITIONS COMPRISING FUNCTIONALIZED POLYVINYL ALCOHOL AND NANOCAPSULES CONTAINING A LIQUID CRYSTALLINE MEDIUM

The present invention relates to the use of functionalized polymerizable polyvinyl alcohol as binder or matrix for a dispersion of nanoparticles, wherein the nanoparticles respectively comprise a polymeric shell and a core containing a liquid crystalline medium, to composites comprising the functionalized polymer and the nanocapsules, to methods for making such composites and to their use in electro-optical devices.

Liquid crystalline (LC) media are widely used in liquid crystal displays (LCDs), in particular in electro-optical displays having active-matrix or passive-matrix addressing, to display information. In the case of active-matrix displays, individual pixels are usually addressed by integrated, non-linear active elements, such as transistors, for example thin-film transistors (TFTs), while in the case of passive-matrix displays, individual pixels are usually addressed by the multiplex method, as known from the prior art.

Still commonly used are LCDs of the TN ("twisted nematic") type, which however have the disadvantage of a strong viewing-angle dependence of the contrast. In addition, so-called VA ("vertically aligned") displays are known which have a broader viewing angle. Furthermore, OCB ("optically compensated bend") displays are known which are based on a birefringence effect and have an LC layer with a so-called "bend" alignment. Also known are so-called IPS ("in-plane switching") displays, which contain an LC layer between two substrates, where the two electrodes are arranged on only one of the two substrates and preferably have intermeshed, comb-shaped structures. Furthermore, so-called FFS ("fringe-field switching") displays have been provided, which contain two electrodes on the same substrate, wherein one electrode is structured in a comb-shaped manner and the other is unstructured. A strong, so-called "fringe field" is thereby generated, i.e., a strong electric field close to the edge of the electrodes, and, throughout the cell, an electric field which has both a strong vertical component and also a strong horizontal component.

A further development are displays of the so-called PS ("polymer sustained") or PSA ("polymer sustained alignment") type, for which the term "polymer stabilized" is also occasionally used. In these, a small amount, for example 0.3% by weight, typically <1% by weight, of one or more polymerizable compounds, preferably polymerizable monomeric compound(s), is added to the LC medium and, after filling the LC medium into the display, is polymerized or crosslinked in situ, usually by UV photopolymerization, optionally while a voltage is applied to the electrodes of the display. The polymerization is carried out at a temperature where the LC medium exhibits a liquid crystal phase, usually at room temperature. The addition of polymerizable mesogenic or liquid crystalline compounds, also known as reactive mesogens or "RMs", to the LC mixture has proven particularly suitable.

In addition, displays based on polymer dispersed liquid crystal (PDLC) films have been described, see e.g., U.S. Pat. No. 4,688,900. In such PDLC films usually micrometer-sized droplets (microdroplets) of LC medium are randomly distributed in a polymer matrix. The LC domains in these phase-separated systems have a size which can result in strong scattering of light. PDLC films are usually prepared using methods of polymerization-induced phase separation (PIPS), wherein phase separation is reaction-induced. Alternatively, PDLC films may be prepared based on temperature-induced phase separation (TIPS) or solvent-induced phase separation (SIPS). Besides PDLC films, so-called polymer network liquid crystal (PNLC) systems are known, wherein a polymer network is formed in a continuous LC phase.

Furthermore, micrometer-sized encapsulated LC materials (microcapsules) for use in displays have been described, wherein the microcapsules are prepared by forming an aqueous emulsion of LC material with an immiscible binder such as polyvinyl alcohol (PVA) which serves as the encapsulating medium, see e.g., U.S. Pat. No. 4,435,047.

A method for microencapsulation of electro-optical fluid using polymerization of at least partly solubilized polymer precursors and crosslinking is described in WO 2013/110564 A1.

In addition to the above display types, recently LCDs have been proposed which include a layer comprising nanocapsules, wherein the nanocapsules contain liquid crystal molecules.

For example, Kang and Kim in Optics Express, 2013, Vol. 21, pp. 15719-15727 describe optically isotropic nanoencapsulated LCs for use in displays based on the Kerr effect and in-plane switching. Nanocapsules having a mean diameter of approximately 110 nm are prepared by adding a nematic LC to a mixture of nonionic polymeric surfactant and PVA, which serves as shell-forming polymer and water-soluble emulsifier, dissolved in aqueous solution, forming a nanoemulsion, heating up of the nanoemulsion to a cloud point and stirring to phase separate PVA around the LC nanodroplets, and crosslinking of the polymeric shell with crosslinking agents such as dialdehydes. Furthermore, a coating solution containing the prepared LC nanocapsules, hydrophilic PVA as a binder and ethylene glycol as a plasticizer is described.

Another LCD device having LC nanocapsules arranged therein is described in US 2012/0113363 A1.

A configuration of an LCD device which contains LC nanocapsules in a so-called buffer layer is described in US 2014/0184984 A1. According to US 2014/0184984 A1 the buffer layer may be formed from transparent or semi-transparent materials, and it may have a water-soluble property, an oil-soluble property or a mixed property thereof. It is further described that the buffer layer may be hardened by heat or UV radiation, wherein an additive may be further included in the buffer layer to increase the strength and to reduce the hardening time of the buffer layer.

Display devices which include LC nanocapsules in a buffer layer are also described in US 2016/0178941 A1. In this publication it is remarked that the buffer layer should have good dispersibility with the nanocapsules, good substrate adhesion, excellent light transmittance and excellent electric insulation. It is further described therein that the refractive index of the buffer layer should be isotropic and not much different from that of the average refractive index of the liquid crystal in the nanocapsules. It is in particular described that the buffer layer may be formed of an oil-soluble resin binder, wherein optionally the buffer layer may be formed to further include a water-soluble binder with the oil-soluble binder. In the case of using both oil-soluble and water-soluble materials, it is described that the water-soluble binder is reacted with the oil-soluble material, wherein the buffer layer can be formed to be oil soluble overall.

There is a need in the art for a binder that is suitable for dispersing nanocapsules, in particular nanocapsules which respectively comprise a polymeric shell and a core containing a liquid crystalline medium, and which can give improved, and optionally tunable, chemical, physical and electro-optical properties of the combined composite material comprising the binder and the nanocapsules, in particular for use in electro-optical devices.

An object of the present invention is therefore to provide a binder material that is particularly suitable to disperse nanocapsules, in particular LC nanocapsules, and which provides beneficial characteristics in the resultant composite and during the preparation thereof. It is a further object to provide an improved composition or composite material containing a favourable binder material in combination with LC nanocapsules which exhibits favourable stability and reliability and which is useful in light-modulation elements and electro-optical devices. It is furthermore an object to provide composite systems in light-modulation elements and electro-optical devices which have a favourably wide viewing angle range and which are substantially insensitive to external forces such as from touching. It is a further object to provide a facile process which provides ease of fabrication of such compositions or composites.

It is a particular object to provide composite systems comprising nanocapsules and binder which can favourably give or contribute to beneficial characteristics such as a suitably low threshold voltage and a reduced operating voltage in electro-optical applications, an excellent dark state and a high contrast, favourably low hysteresis, favourably fast response times, improved low-temperature behaviour and an improvement in the operating properties at low temperatures, a minimal temperature dependence of the electro-optical parameters such as, for example, the threshold voltage, and suitability for film formation. In this respect, it is a particular object to provide the combination of an improved binder together with particularly favourable nanocapsules, wherein the liquid crystalline media contained in the nanocapsules have suitably high Δε and high electrical resistance as well as suitably high Δn and favourable values of the electro-optical parameters, while furthermore particularly providing relatively low rotational viscosity and favourable reliability. Moreover, it is an object that the mesogenic media comprised in the nanocapsules exhibit broad and stable LC, in particular nematic, phase ranges, low melting points and a relatively high clearing point, and a suitably high voltage holding ratio.

Further objects of the present invention are immediately evident to the person skilled in the art from the following detailed description.

The objects are solved by the broadest embodiments of subject-matter described herein, while preferred embodiments are also set forth and are further described below.

The present invention, for example, provides the following items including main aspects, preferred embodiments and particular features, which respectively alone and in combination contribute to solving the above objects and eventually provide additional advantages.

A first aspect of the present invention provides a method for preparing a composite, wherein the method comprises
(i) providing nanocapsules which respectively comprise a polymeric shell and a core containing a liquid crystalline medium, and
(ii) mixing the nanocapsules with a polymer comprising one or more of the repeating units A and/or B

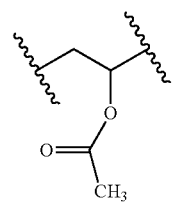

A

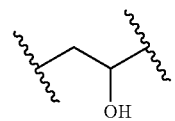

B and one or more of the repeating units C and/or D

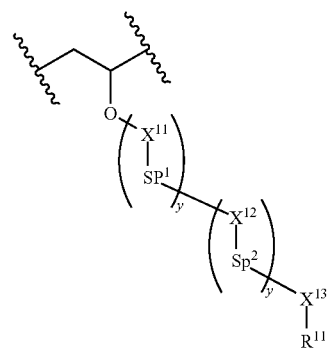

C

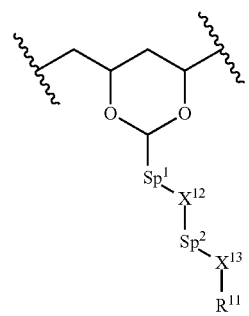

D wherein
Sp$^1$ and Sp$^2$ respectively represent a spacer group,
X$^{11}$ represents CH$_2$, CO, S—CO or NH—CO,
y is, independently in each occurrence, 0 or an integer from 1 to 10, preferably 0 or an integer from 1 to 3,
X$^{12}$ represents, independently in each occurrence, O, S, CO, NH or an ester group,
X$^{13}$ represents, independently in each occurrence, O, S, CO, NH or single bond, preferably O or single bond, and
R$^{11}$ is a polymerizable group, preferably an epoxide, an acryloyl group or methacryloyl group, more preferably an acryloyl group and/or methacryloyl group, and most preferably an acryloyl group.

It has surprisingly been found that by providing the method according to the invention it is possible to prepare a favourable composition comprising the nanocapsules in combination with the polymer as defined above and below, wherein the composition exhibits favourable characteristics in terms of its physical and chemical attributes, in particular with respect to its electro-optical properties and its suitability in light-modulation elements and electro-optical devices.

Another aspect of the present invention thus relates to a composite which is obtained by or respectively is obtainable from carrying out the method according to the invention.

In a further aspect the invention provides a composite comprising nanocapsules which respectively comprise a polymeric shell and a core containing a liquid crystalline medium, and a polymer which comprises one or more of the repeating units A and/or B and one or more of the repeating units C and/or D as defined above and below.

It was advantageously recognized that improved composites are obtainable by combining LC nanocapsules with the polymer as described herein, which in particular is used as a matrix or binder material for the LC nanocapsules.

In particular, the polymer as described herein which is used as a binder can give advantageous compatibility with the nanocapsules and dispersibility, while furthermore giving suitable film forming properties. Favourably, for processing such as film formation, the polymer may be used with a minimum of or even entirely without addition of organic solvent, which can provide benefits in terms of capsule compatibility and ultimately the electro-optical performance of the composite system.

Advantageously it was found that polyvinyl alcohol (PVA) can be used as a suitable starting material to provide the polymer binder according to the present invention. PVA may be partially or fully hydrolysed, and by varying the degree of hydrolysis the water solubility and hydrophilicity of the polymer can be adjusted. Thus water uptake may be controlled or reduced to some degree. The properties, such as mechanical strength or viscosity, of the polymer may be favourably preset by, e.g., adjusting the molecular weight and the degree of hydrolysis.

Presently it was recognized that the PVA polymer can form a suitable basis for a binder which can however even further be improved, in particular by suitable chemical modification and in view of particular properties and specific uses as binder for given LC nanocapsules.

In addition to adjusting the degree of hydrolysis, i.e., to preset a suitable range of the amounts and of the ratio of repeating units A and B as defined above in the polymer backbone, it has been found that functionalization or modification of the repeating unit B can be useful to further tune and adjust the properties of the polymeric binder.

In particular, by setting a suitable degree of substitution, i.e., the number or amount of repeating units B to be converted or modified in the polymer backbone, and/or by setting the type of modification to be carried out, i.e., to determine the specific type of repeating unit C and/or D which are described above and below and which may introduce functional or respectively functionalized side chains, a polymer may be provided with even further improved and adjusted properties.

In the present invention the modified and polymerizable, in particular photopolymerizable, PVA having the grafted side chains as defined in formula C and/or D is used as the binder or at least as a component of the binder for dispersing the LC nanocapsules and coating.

In a preferred embodiment it is especially desired that the polymer has a sufficient degree of hydrophilicity and water solubility, which can inter alia provide benefits in terms of the dispersibility and during film formation. By suitably setting and adjusting the degree of hydrolysis of the starting PVA material in combination with the degree of substitution on the hydrolysed parts of the PVA polymer and the kind of substitution, a polymer with a sufficient hydrophilicity can be provided, which in turn can be beneficial to disperse the LC nanocapsules while also giving good film forming properties.

In a preferred embodiment the polymer as used according to the invention can be dissolved in an aqueous solution in an amount of up to 50% by weight. Preferably the polymer is soluble in water in an amount of 10% by weight to 50% by weight, more preferably 20% by weight to 40% by weight, and in particular 20% by weight to 35% by weight.

Preferably the polymeric binder is provided as an aqueous mixture, where the binder together with LC nanocapsules may be coated onto a rigid or flexible substrate, e.g., using knife coating, die coating, roll coating or printing via ink-jet techniques. After coating the formed film may be dried, and as further described below the film may be further polymerised using UV light or heat.

While the polymer should have at least a minimum of water solubility to give the desired dispersibility, after forming the composite, preferably as a film or a layer, the amount of water uptake should be minimized and ideally be very low. This can favourably contribute to enhancing the electro-optical performance and to improve the stability and the reliability of the film. In this respect, the inclusion of the repeating unit C and/or D as shown above and below can already give a favourably lowered tendency of the formed composite to absorb water when compared to the non-functionalized, unmodified PVA.

In addition, the functionalized substituted polymer contains polymerizable groups. It is thus possible to further adjust and tune the material properties by polymerizing some or preferably substantially all of the polymerizable groups in the polymer. The binder may thus first be used to give the hydrophilicity and processing performance, e.g., suitable wetting behaviour on a given substrate and coatability, as initially desired during dispersion of the capsules and film formation. Subsequently, in a second step, polymerization of the polymerizable groups may be carried out to further change the material properties. In particular, by further polymerizing the material, and optionally cross-linking, the composite may be further strengthened, while at the same time further decreasing the tendency to show swelling behaviour and absorption of water. In particular, the dried binder preferably absorbs little or even substantially no water.

Thus the method according to the invention preferably further comprises the step of polymerizing the polymerizable constituents of the obtained composite.

Thus a favourably adjustable binder, in particular in terms of its chemical, physical and electro-optical properties, can be provided for dispersing LC nanocapsules, wherein the properties may be tuned by suitably setting the respective amounts of the repeating units A, B, C and respectively D as described above and below, and by setting the type of repeating units C and/or D.

The provision of the polymeric binder as described herein surprisingly can give further benefits such as the possibility to achieve a desired refractive index matching with the LC nanocapsules, a suitably high dielectric constant, a very low ion content as well as suitable transparency and sufficient flexibility.

The binder properties can be favourably influenced by cross-linking the polymer. Therefore, in an embodiment the functionalized, polymerizable PVA binder is cross-linked, preferably by further adding cross-linking agents such as dialdehydes, e.g., glutaraldehyde, formaldehyde, glyoxal, diacrylates, triacrylates, tetraacrylates, dimethacrylates, trimethacrylates or tetramethacrylates. Such cross-linking may, e.g., favourably reduce any tendency for undesirable crack-formation and also undesirable or excessive water uptake. Moreover, the addition of multifunctional or multi-reactive polymerizable monomers can be useful to further tune the optical properties of the binder formulation, in particular in view of the refractive index of the LC nanocapsules. In an embodiment the difference between the ordinary index of refraction of the binder and the liquid crystal capsules is preferably set to be less than 0.10, more preferably less than 0.03, and most preferably less than 0.01.

In addition, the composite may further comprise customary additives such as stabilizers, antioxidants, free radical scavengers, surfactants and/or plasticizers, e.g., ethylene glycol can be used as a preferable plasticizer. Furthermore, in order to favourably influence film forming properties film-forming agents, for example polyacrylic acid, and anti-foaming agents may be added. Such agents may be used to improve film formation and substrate wettability. Optionally, degassing and/or filtration of the coating composition can be carried out to further improve film properties. Likewise, setting and adjusting binder viscosity can have a favourable influence on the forming film or respectively formed film.

Preferably, the polymer which comprises one or more of the repeating units A and/or B and one or more of the repeating units C and/or D as defined above and below and which is mixed with the nanocapsules is used as the main component of the binder as used according to the invention, more preferably is used in amount of 60% or more of the total dry weight of the binder, even more preferably 75% or more of the total dry weight of the binder, and in particular 90% or more of the total dry weight of the binder.

The nanocapsules and the polymer which comprises one or more of the repeating units A and/or B and one or more of the repeating units C and/or D as defined above and below are preferably mixed in a weight ratio ranging from 1:10 to 10:1, more preferably from 1:5 to 5:1, and in particular from 1:2 to 2:1.

In a particularly preferred embodiment the dried binder essentially consists of the polymer which comprises one or more of the repeating units A and/or B and one or more of the repeating units C and/or D as defined above and below.

The composite according to the invention is particularly preferably used in or respectively used as a switching layer and in a light-modulation element.

In particular, the LC nanocapsules may be dispersed in the polymer, and subsequently the obtained dispersion can be arranged as a layer, preferably supported on a substrate or as a layer between two opposing substrates.

In another aspect of the invention a switching layer is thus provided which comprises the nanocapsules as set forth above and below, wherein the nanocapsules are dispersed in the polymeric binder according to the invention, in particular the polymeric binder which is obtainable from polymerizing the polymer as set forth herein, i.e., from polymerizing the polymerizable groups of the polymer, while optionally further using di- or multifunctional monomeric or oligomeric polymerizable compounds.

According to the invention the polymer comprising one or more of the repeating units A and/or B and one or more of the repeating units C and/or D as set forth herein is particularly useful for dispersing nanoparticles, and in particular nanocapsules.

Another aspect of the invention relates to an electro-optical device which comprises the composite according to the invention or respectively the switching layer according to the invention.

By providing nanoencapsulated LC medium combined with the present binder material in an electro-optical device several significant advantages are obtainable. These include, for example, good mechanical stability, flexibility and insensitivity to external applied forces or respectively pressure such as from touch as well as further favourable properties regarding switching speed, transmittance, dark state, where the dark state preferably has a transmission below 0.5%, contrast ratio, viewing angle behaviour and threshold voltage, in particular a reduced operating voltage and reduced hysteresis.

Surprisingly, it was found that, in addition to a reduced hysteresis, the dark state can be improved.

Further advantages rest in the possible use of flexible substrates and the possibility to vary film or layer thickness and the tolerability of film thickness deviations or variance. In this respect simple dropping, coating, laminating or printing methods can be used to apply the light-modulating material to the substrate.

Furthermore, there is no need to provide an alignment layer, such as conventionally used polyimide (PI) alignment layers, on the substrate and/or to rub the substrate surface.

When the two electrodes in the device are provided on the same substrate such as in the case of IPS or FFS a single substrate can be sufficient to provide functionality and stability or respectively support, making the provision of an opposing substrate merely optional. However such opposing substrate may still be beneficial, for example in terms of providing further optical elements or physical or chemical protection. Considering the encapsulation and the inclusion of the capsules in a binder material, the sealing of the layer comprising the LC material may no longer be needed to ensure sufficient material enclosure and to prevent material leakage from the layer.

Without limiting the present invention thereby, in the following the invention is illustrated by the detailed description of the aspects, embodiments and particular features, and particular embodiments are described in more detail.

The term "liquid crystal" (LC) relates to materials or media having liquid-crystalline mesophases in some temperature ranges (thermotropic LCs) or in some concentration ranges in solutions (lyotropic LCs). They contain mesogenic compounds.

The terms "mesogenic compound" and "liquid crystal compound" mean a compound comprising one or more calamitic (rod- or board/lath-shaped) or discotic (disc-shaped) mesogenic groups, i.e., groups with the ability to induce liquid-crystalline phase or mesophase behaviour.

The LC compounds or materials and the mesogenic compounds or materials comprising mesogenic groups do not necessarily have to exhibit a liquid-crystalline phase themselves. It is also possible that they show liquid-crystalline phase behaviour only in mixtures with other compounds. This includes low-molecular-weight non-reactive liquid-crystalline compounds, reactive or polymerizable liquid-crystalline compounds, and liquid-crystalline polymers.

A calamitic mesogenic compound is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected, e.g., from carbyl or hydrocarbyl groups, polar groups like halogen, nitro, hydroxy, etc., or polymerizable groups.

For the sake of simplicity, the term "liquid crystal" material or medium is used for both liquid crystal materials or media and mesogenic materials or media, and vice versa, and the term "mesogen" is used for the mesogenic groups of the material.

The term "non-mesogenic compound or material" means a compound or material that does not contain a mesogenic group as defined above.

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post-polymerization purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerization" means the chemical process to form a polymer by bonding together multiple polymerizable groups or polymer precursors (polymerizable compounds) containing such polymerizable groups.

Polymerizable compounds with one polymerizable group are also referred to as "monoreactive" compounds, compounds with two polymerizable groups as "direactive" compounds, and compounds with more than two polymerizable groups as "multireactive" compounds. Compounds without a polymerizable group are also referred to as "non-reactive" or "non-polymerizable" compounds.

The terms "film" and "layer" include rigid or flexible, self-supporting or freestanding films or layers with more or less pronounced mechanical stability, as well as coatings or layers on a supporting substrate or between two substrates.

Visible light is electromagnetic radiation that has a wavelength in a range from about 400 nm to about 745 nm. Ultraviolet (UV) light is electromagnetic radiation with a wavelength in a range from about 200 nm to about 400 nm.

It has surprisingly been found that by providing the method according to the invention it is possible to prepare a composite which exhibits favourable characteristics in terms of its physical and chemical attributes, in particular with respect to its electro-optical properties and its suitability in light-modulation elements and electro-optical devices.

As one of the components the composite comprises the polymer comprising, preferably substantially consisting of, and in particular consisting of one or more of the repeating units A and/or B and one or more of the repeating units C and/or D.

$Sp^1$ and $Sp^2$ as set forth in units C and D respectively represent a spacer group. The spacer groups according to the invention preferably comprise or consist of carbyl or hydrocarbyl groups.

Above and below, carbyl group denotes a mono- or polyvalent organic group containing at least one carbon atom which either contains no further atoms, such as, for example, —C≡C—, or optionally contains one or more further atoms, such as, for example, halogen, N, O, S, P, Si, Se, As, Te or Ge, for example a carbonyl group, etc.

Hydrocarbyl group denotes a carbyl group, which additionally contains one or more H atoms and optionally one or more heteroatoms, such as, for example, halogen, N, O, S, P, Si, Se, As, Te or Ge.

Halogen denotes F, Cl, Br or I, preferably F or Cl, more preferably F.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Above and below, the terms alkyl, aryl, heteroaryl, etc., also encompass polyvalent groups, for example alkylene, arylene, heteroarylene, etc. The term aryl denotes an aromatic carbon group or a group derived therefrom. The term heteroaryl denotes aryl in accordance with the above definition containing one or more heteroatoms.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms.

Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e., they can have one ring, such as, for example, phenyl, or two or more rings, which may also be fused, such as, for example, naphthyl, or covalently linked, such as, for example, biphenyl, or contain a combination of fused and linked rings. Heteroaryl groups contain one or more heteroatoms, preferably selected from O, N, S, and Se.

Particular preference is given to mono-, bi-, or tricyclic aryl groups having 6 to 25 C atoms and mono-, bi- or tricyclic heteroaryl groups having 2 to 25 C atoms, which optionally contain fused rings and which are optionally substituted. Preference is furthermore given to 5-, 6-, or 7-membered aryl and heteroaryl groups, in which, in addition, one or more CH groups may be replaced by N, S, or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc., preferably 1,4-phenyl, 1,3-phenyl, or 1,2-phenyl.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The non-aromatic alicyclic and heterocyclic groups encompass both saturated rings, i.e., those that contain exclusively single bonds, and partially unsaturated rings, i.e., those that may also contain multiple bonds. Heterocyclic rings contain one or more heteroatoms, preferably selected from Si, O, N, S, and Se.

The non-aromatic alicyclic and heterocyclic groups can be monocyclic, i.e., contain only one ring, such as, for example, cyclohexane, or polycyclic, i.e., contain a plurality of rings, such as, for example, decahydronaphthalene or bicyclooctane. Particular preference is given to saturated groups. Preference is furthermore given to mono-, bi-, or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbyl, and hydrocarbyl radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature ($T_g$) in the polymer, in particular bulky groups, such as, for example, t-butyl or optionally substituted aryl groups.

Preferred substituents are, for example, F, Cl, Br, I, —OH, —CN, —NO₂, —NCO, —NCS, —OCN, —SCN, —C(=O)N($R^x$)₂, —C(=O)$Y^1$, —C(=O)$R^x$, —C(=O)O$R^x$, —N($R^x$)₂, in which $R^x$ has the above-mentioned meaning, and $Y^1$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

Substituted silyl or aryl preferably means substituted by halogen, —CN, $R^0$, —$OR^0$, —CO—$R^0$, —CO—O—$R^0$, —O—CO—$R^0$ or —O—CO—O—$R^0$, in which $R^0$ has the above-mentioned meaning.

Particularly preferred substituents are, for example, F, Cl, CN, NO₂, CH₃, C₂H₅, OCH₃, OC₂H₅, COCH₃, COC₂H₅, COOCH₃, COOC₂H₅, CF₃, OCF₃, OCHF₂, OC₂F₅, furthermore phenyl.

Preferably, the polymer, in particular the modified polymerizable polyvinyl alcohol, as used according to the invention has an average molecular weight, given as the weight average molecular weight, within the range of 5,000 g/mol to 250,000 g/mol, more preferably within the range of 9,000 g/mol to 150,000 g/mol, and even more preferably within the range of 15,000 g/mol to 120,000 g/mol. Herein the average molecular weight of the polymer is determined by gel permeation chromatography.

Preferably the amount of the repeating unit A in the polymer as a whole is in the range from 0 to 90 mol %, more preferably in the range from 5 mol % to 80 mol %, even more preferably in the range from 10 mol % to 70 mol %, and in particular in the range from 15 mol % to 30 mol %.

Preferably the amount of the repeating unit B in the polymer as a whole is in the range from 1 mol % to 98 mol %, more preferably in the range from 5 mol % to 90 mol %, even more preferably in the range from 10 mol % to 80 mol %, and in particular in the range from 15 mol % to 70 mol %.

Preferably the amount of the repeating unit C in the polymer as a whole is in the range from 0 to 80 mol %, more preferably in the range from 2 mol % to 50 mol %, even more preferably in the range from 5 mol % to 40 mol %, and in particular in the range from 10 to 30 mol %.

Preferably the amount of the repeating unit D in the polymer as a whole is in the range from 0 to 80 mol %, more preferably in the range from 2 mol % to 50 mol %, even more preferably in the range from 5 mol % to 40 mol %, and in particular in the range from 10 to 30 mol %.

However, in the polymer as used according to the invention at least one of the repeating units C and D is present.

Preferably, the total amount of the repeating units A, B, C, and D in the polymer together is in the range from 70 mol % to 100 mol %, more preferably is more than 95 mol %, even more preferably is more than 98 mol %, yet even more preferably is more than 99 mol %, and in particular is about 100 mol %.

It is particularly preferred that the polymer comprises the repeating unit B, more preferably A and B, and at least one of the repeating units C and D, more preferably C, wherein the combined amounts of the repeating units A, B, C and D in the polymer, if respectively present, as a whole are 100 mol % or less.

In a preferred embodiment the polymer comprises, preferably consists of, the repeating units A and/or B and the repeating units C and no repeating unit D.

In another preferred embodiment, the polymer comprises, preferably consists of, the repeating units A and/or B, and the repeating units D and no repeating unit C.

In a preferred embodiment polymers according to the present invention are derived from commercially available PVA with molecular weights ranging from about 9,000 g/mol to about 150,000 g/mol and a degree of hydrolysis between about 30 mol % to about 50 mol % or about 75 mol % to about 90 mol %, for example PVA 9-10K 30 mol % hydrolyzed, PVA 9-10K 80 mol % hydrolyzed, PVA 31K 88 mol % hydrolyzed, PVA 130K 88 mol % hydrolyzed.

In a preferred embodiment of the invention a polymer is used having a side chain in the repeating units C which corresponds to $R^{11}-X^{13}-(Sp^2-X^{12})_y-(Sp^1-X^{11})_y-**$ and which is selected from the group of moieties of the following formulae A to H and J

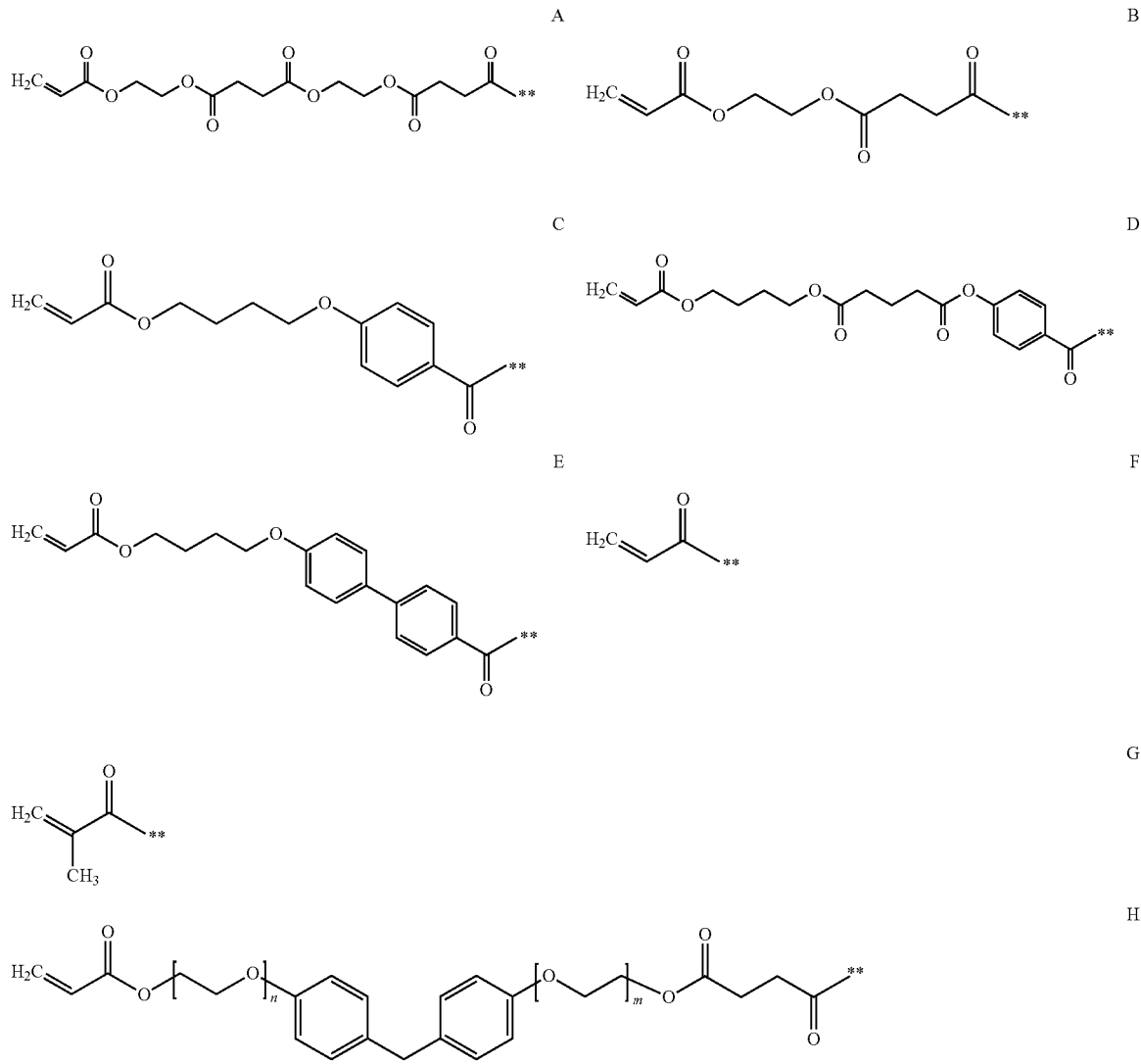

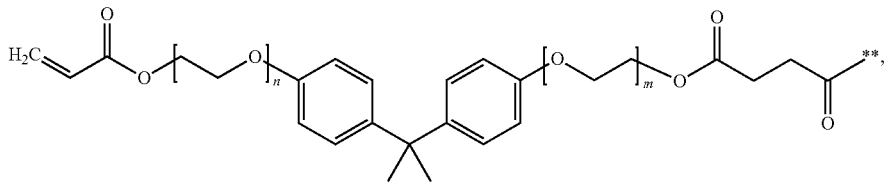

wherein m denotes, independently in each occurrence, an integer from 0 to wherein m denotes, independently in each occurrence, an integer from 0 to 10, and n denotes, independently in each occurrence, an integer from 0 to 10.

Preferably the polymers comprising repeating units C having side chains according to formulae A to H and J can be obtained by esterification of the carboxcylic acid compounds of the corresponding acyl moieties of formulae A to H and J with hydrolysed parts, i.e., repeating units B, of the utilized initial PVA.

In another embodiment, the side chain in the repeating units C which corresponds to $R^{11}$—$X^{13}$-$(Sp^2$-$X^{12})_y$-$(Sp^1$-$X^{11})_y$—** is a moiety of formula K

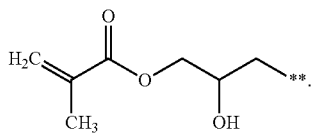

A polymer having side chains according to formula K can preferably be obtained from the reaction between hydrolysed parts of the utilized initial PVA and a corresponding epoxide precursor of the moiety of formula K, e.g., as illustrated below:

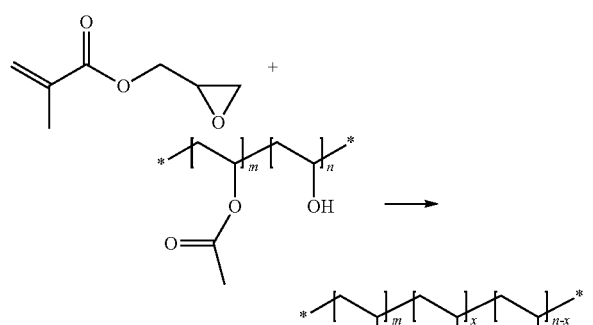

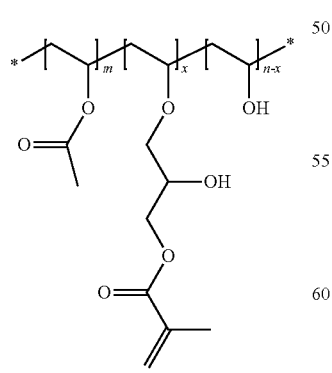

In another preferred embodiment of the invention a polymer is used having a side chain in the repeating units D which corresponds to a group of formula N

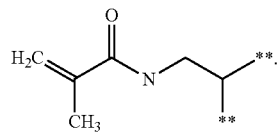

A polymer having side chains according to formula N can preferably be obtained from the reaction between between two hydrolized parts of the utilized initial PVA with a corresponding dimethyl or diethyl acetal precursor of the moiety of formula N, e.g., as illustrated below:

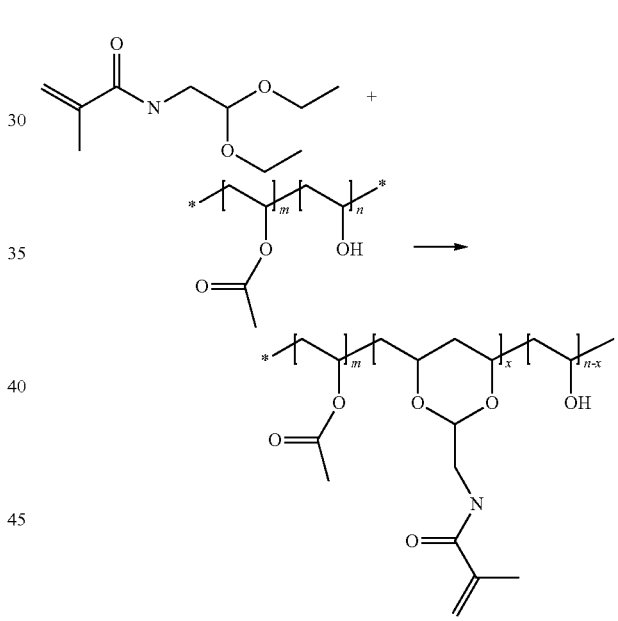

The polymer used as a binder includes polymerizable groups, herein designated as $R^{11}$. These groups are functional groups which are suitable for polymerization.

These polymerizable groups are preferably selected from $CH_2$=$CW^1$—COO—,

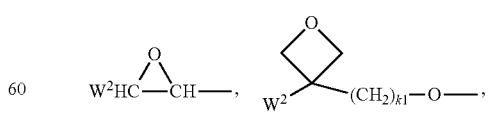

$CH_2$=$CW^2$—$(O)_{k1}$—, $CH_3$—CH=CH—O—, $(CH_2$=$CH)_2CH$—OCO—, $(CH_2$=CH—$CH_2)_2CH$—OCO—, $(CH_2$=$CH)_2CH$—O—, $(CH_2$=CH—$CH_2)_2N$—, HO—$CW^2W^3$—, HS—$CW^2W^3$—, $HW^2N$—, HO—$CW^2W^3$—NH—, $CH_2$=$CW^1$—CO—NH—,

CH$_2$=CH—(COO)$_{k1}$-Phe-(O)$_{k2}$—, Phe-CH=CH—, HOOC—, OCN—, with W$^1$ being H, Cl, CN, phenyl or alkyl with 1 to 5 C atoms, in particular H, Cl or CH$_3$, W$^2$ and W$^3$ being independently of each other H or alkyl with 1 to 5 C atoms, in particular H, methyl, ethyl or n-propyl, Phe being 1,4-phenylene and k$_1$ and k$_2$ being independently of each other 0 or 1.

The polymerizable or reactive group is preferably selected from a vinyl group, an acrylate group, a methacrylate group, a fluoroacrylate group, an oxetane group or an epoxy group.

It is particularly preferred that the polymerizable group is an acrylate group or a methacrylate group and that R$^{11}$ in particular is an acryloyl group or a methacryloyl group.

In a preferred embodiment at least one crosslinking agent is added to the binder composition, i.e., a polymerizable compound containing two or more polymerizable groups. Conventional crosslinkers known in the art can be used. It is particularly preferred to provide direactive or multireactive acrylates and/or methacrylates.

In an embodiment di- or multireactive monomeric or oligomeric polymerizable compounds are further comprised in the composite, preferably added in an amount, based on the overall composition, from 0.1% by weight to 25% by weight, more preferably from 0.5% by weight to 15% by weight, even more preferably from 1% by weight to 10% by weight, and in particular from 2% by weight to 5% by weight.

Preferred direactive and multireactive compounds are for example selected from ethylenediacrylate, propylene diacrylate, butylene diacrylate, pentylene diacrylate, 1,6-hexanediolacrylate, bisphenol-A-diacrylate, bisphenol-A-dimethacrylate, trimethylylpropanediacrylate, trimethylolpropanetriacrylate, pentaerythrittriacrylate, triethyleneglycoldiacrylate, tripropylene glycol diacrylate, tripropyleneglycoltriacrylate, pentaerythritoltriacrylate, pentaerythritoltetraacrylate, ethylene dimethacrylate, also known as ethyleneglycol dimethacrylate, propylene diamethcrylate, butylene dimethacrylate, pentylene dimethacrylate, hexylene dimethacrylate, ditrimethylpropanetetraacrylate, dipentaerythritolpentaacrylate, glycerol dimethacrylate and trimethylpropane trimethacrylate.

The composite according to the invention particularly preferably further comprises one or more direactive and/or multireactive polymerizable compounds, preferably selected from diacrylates, dimethacrylates, triacrylates and trimethacrylates.

Particularly preferably ethylene glycol dimethylacrylate, glycerol dimethacrylate, bisphenol A glycerolate (1 glycerol/phenol) diacrylate, glycerol 1,3-diglycerolate diacrylate, pentaerythritol triacrylate, trimethylolpropane triacrylate or pentaerythritol tetraacrylate are used.

Polymerization of the polymerizable constituent(s) of the composite can be carried out using conventional methods. The polymerization can be carried out in one or more steps. In particular, polymerization of the polymerizable compound(s) is preferably achieved by exposure to heat or to actinic radiation, wherein exposure to actinic radiation means irradiation with light, like UV light, visible light or IR light, irradiation with X-rays or gamma rays, or irradiation with high-energy particles, such as ions or electrons. In a preferred embodiment free radical polymerization is carried out.

In an embodiment, polymerization is carried out by photoirradiation, i.e., with light, preferably UV light. As a source for actinic radiation, for example a single UV lamp or a set of UV lamps can be used. When using a high lamp power the curing time can be reduced. Another possible source for photoradiation is a laser, e.g., a UV laser, a visible laser or an IR laser. In a preferred embodiment a light emitting diode (LED) is used, in particular a UV LED. For example, a UV broad band source such as UVACUBE 2000 from Dr. Hönle AG or a UV LED source such as Delolux 20 with a wavelength of 365 nm may be used. Typical lamp powers may range from e.g., 10 mW to 80 mW with preferable irradiation times between 2 s and 300 s, wherein irradiation and polymerization particularly preferably are carried out at room temperature.

In another embodiment thermal polymerization is carried out. In a preferred embodiment, thermal polymerization is carried out at a temperature in the range from 60° C. to 90° C., more preferably 70° C. to 80°, with typical polymerization times ranging from 20 minutes to 180 minutes.

Suitable and conventionally used thermal initiators or photoinitiators can be added to the composition to facilitate the reaction, for example azo compounds or organic peroxides such as Luperox type initiators. Moreover, suitable conditions for the polymerization and suitable types and amounts of initiators are known in the art and are described in the literature.

For example, when polymerizing by means of UV light, a photoinitiator can be used that decomposes under UV irradiation to produce free radicals or ions that start the polymerization reaction. For polymerizing acrylate or methacrylate groups preferably a radical photoinitiator is used. For polymerizing vinyl, epoxide or oxetane groups preferably a cationic photoinitiator is used. It is also possible to use a thermal polymerization initiator that decomposes when heated to produce free radicals or ions that start the polymerization. Typical radical photoinitiators are for example the commercially available Irgacure® or Darocure® (Ciba Geigy AG, Basel, Switzerland). A typical cationic photoinitiator is for example UVI 6974 (Union Carbide).

In addition to the polymer binder, the composite according to the present invention further comprises nanocapsules which respectively comprise a polymeric shell and a core containing a liquid crystalline medium.

The composite is particularly useful in light-modulation elements or ectro-optical devices.

It was found that the combination of the nanocapsules with the binder material as presently used can suitably influence and increase the processibility and applicability of the light modulating material, in particular in view of coating, dropping or printing on substrates and film formation. In this respect, the binder can act as both a dispersion matrix and an adhesion or binding agent, and furthermore provide suitable physical and mechanical stability while maintaining or even promoting flexibility. Furthermore, density or concentration of the capsules can advantageously be adjusted by varying the amount of binder or buffer material provided.

By having the possibility to concentrate the nanoparticles or capsules as prepared, for example by centrifugation, filtration or drying, and to redisperse them, it is possible to set or adjust the density or proportion of the particles in a film or layer independently of the concentration as obtained from the original production process.

Preferably, the liquid crystalline medium contained in the nanocapsules comprises one or more compounds of formula I $$R\text{-}A\text{-}Y\text{-}A'\text{-}R' \qquad \qquad \text{I}$$

wherein

R and R' denote, independently of one another, a group selected from F, CF$_3$, OCF$_3$, CN, and straight-chain or branched alkyl or alkoxy having 1 to 15 carbon atoms or straight-chain or branched alkenyl having 2 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, A and A' denote, independently of one another, a group selected from -Cyc-, -Phe-, -Cyc-Cyc-, -Cyc-Phe-, -Phe-Phe-, -Cyc-Cyc-Cyc-, -Cyc-Cyc-Phe-, -Cyc-Phe-Cyc-, -Cyc-Phe-Phe-, -Phe-Cyc-Phe-, -Phe-Phe-Phe- and the respective mirror images thereof, wherein Cyc is trans-1,4-cyclohexylene, in which one or two non-adjacent $CH_2$ groups may be replaced by O, and wherein Phe is 1,4-phenylene, in which one or two non-adjacent CH groups may be replaced by N and which may be substituted by one or two F, and Y denotes single bond, —COO—, —$CH_2CH_2$—, —$CF_2CF_2$—, —$CH_2O$—, —$CF_2O$—, —CH=CH—, —CF=CF— or —C≡C—.

In a preferred embodiment the liquid-crystalline medium consists of 2 to 25, preferably 3 to 20 compounds, at least one of which is a compound of formula I. The medium preferably comprises one or more, more preferably two or more, and most preferably three or more compounds of the formula I according to the invention. The medium preferably comprises low molecular weight liquid-crystalline compounds selected from nematic or nematogenic substances, for example from the known classes of the azoxybenzenes, benzylidene-anilines, biphenyls, terphenyls, phenyl or cyclohexyl benzoates, phenyl or cyclohexyl esters of cyclohehexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexylpyridazines, phenyl- or cyclohexyldioxanes, phenyl- or cyclo-hexyl-1,3-dithianes, 1,2-diphenyl-ethanes, 1,2-dicyclohexylethanes, 1-phenyl-2-cyclohexylethanes, 1-cyclohexyl-2-(4-phenylcyclohexyl)-ethanes, 1-cyclohexyl-2-biphenyl-ethanes, 1-phenyl2-cyclohexyl-phenylethanes, optionally halogenated stilbenes, benzyl phenyl ether, tolanes, substituted cinnamic acids and further classes of nematic or nematogenic substances. The 1,4-phenylene groups in these compounds may also be laterally mono- or difluorinated. The liquid-crystalline mixture is preferably based on achiral compounds of this type.

In a preferred embodiment the LC host mixture is a nematic LC mixture, which preferably does not have a chiral LC phase.

Suitable LC mixtures can have positive dielectric anisotropy. Such mixtures are described, for example, in JP 07-181 439 (A), EP 0 667 555, EP 0 673 986, DE 195 09 410, DE 195 28 106, DE 195 28 107, WO 96/23 851, WO 96/28 521 and WO2012/079676. In another embodiment the LC medium has negative dielectric anisotropy. Such media are described in for example EP 1 378 557 A1.

Herein, the preparation of LC nanocapsules is not particularly limited and may be carried out by different methods, e.g., by encapsulation with a preformed polymer, coacervation, solvent evaporation, or by a solute co-diffusion method. Moreover, an interfacial polymerization method, as e.g., described in US 2016/0178941 A1 may be used. Besides US 2016/0178941 A1, it is also referred to US 2014/0184984 A1 for further description of preparations of LC nanocapsules.

However, in a preferred embodiment nanocapsules comprising LC medium are favourably prepared by a process using in situ polymerization as further described below. In this process encapsulation of the mesogenic medium on the nanoscale can favourably be performed starting from polymerizable monomers, and it is preferably based on polymerization induced phase separation.

In this preferred embodiment the LC nanocapsules are prepared by a method which comprises the steps of providing a composition comprising the mesogenic medium as described above and below and one or more polymerizable compounds, dispersing the composition as nanodroplets in an aqueous phase using a surfactant, and polymerizing the one or more polymerizable compounds to obtain nanocapsules each comprising a polymeric shell and a core which contains the mesogenic medium. Following the generation of the nanodroplets the one or more polymerizable compounds are polymerized such that nanocapsules are obtained, each of which comprise a polymeric shell and a core which contains the mesogenic medium.

The presently described method to prepare the capsules provides an efficient and controlled process, ultimately on the nanoscale, to produce nanosized containers, which typically are spherical or spheroidal, enclosing LC material. The process makes use of dispersion, in particular nanoemulsion, which is also called miniemulsion, wherein nanosized phases comprising LC material and reactive, polymerizable compound(s) are dispersed in a suitable dispersion medium.

Initially a composition comprising the mesogenic medium and one or more polymerizable compounds is provided. For setting and influencing the solubility, solubilization and/or mixing optionally and preferably an organic solvent may be added to the composition, which can, e.g., favourably influence phase separation during polymerization. Therefore, in a preferred embodiment the composition as initially provided further comprises one or more organic solvents.

The composition is then dispersed as nanodroplets in an aqueous phase. It was found that before polymerization the provision of surfactant can favourably promote formation and subsequently stabilization, in particular ionic and/or steric stabilization, of discrete nanodroplets in the dispersion medium, in particular the aqueous dispersion medium, wherein the nanodroplets comprise the LC medium and polymerizable compound(s).

Agitation, preferably mechanical agitation, in particular high-shear mixing, can suitably yield or further effect dispersion, in particular emulsion, and homogenization, and likewise promote nanodroplet formation. As an alternative, membrane emulsification may for example be used.

Both mechanical agitation and the provision of surfactant thus can play advantageous roles in obtaining nanodroplets and in turn nano-sized capsules, in particular nanocapsules with a substantially uniform size distribution or respectively low polydispersity.

The dispersed phase exhibits poor solubility in the dispersion medium, that means it shows low solubility or is even practically insoluble in the dispersion medium which forms the continuous phase. Favourably, water, water-based or aqueous solutions or mixtures are used to form the continuous or external phase.

Through dispersion the individual nanodroplets are in such a way decoupled from one another so that each droplet constitutes a separate nanosized reaction volume for the subsequent polymerization.

The aqueous mixture can be prepared or provided in different ways. In an embodiment a surfactant solution or mixture, preferably in water, can be prepared and added to the composition comprising the mesogenic medium and the polymerizable compound(s). The provided aqueous mixture is then agitated, in particular mechanically agitated, to obtain nanodroplets comprising the polymerizable compound(s) and the LC medium according to the invention dispersed in an aqueous phase. Agitation or mixing can be carried out using high-shear mixing. For example, high-performance dispersing devices using the rotor-stator principle can be used, such as commercially available Turrax (IKA). Optionally such high-shear mixing may be replaced by sonication, in particular high power ultrasound. It is also possible to combine sonication and high-shear mixing, wherein preferably sonication precedes high-shear mixing.

The combination of agitation as described above with the provision of surfactant can favourably result in the suitable formation and stabilization of the dispersion, in particular emulsion. The use of a high-pressure homogenizer, optionally and preferably used in addition to the above described mixing, can further favourably influence the preparation of the nanodispersion, in particular nanoemulsion, by setting or adjusting and respectively reducing droplet size and by also making the droplet size distribution narrower, i.e., improving uniformity of the particle size. It is particularly preferred when the high-pressure homogenization is repeated, especially for several times such as three, four or five times. For example, a commercially available Microfluidizer (Microfluidics) can be used.

Following the generation of the nanodroplets the one or more polymerizable compounds are polymerized. Thereby nanocapsules are obtained comprising a polymeric shell and a core which contains the mesogenic medium.

The polymerizable compound(s) used for forming the nanocapsules is (are) at least partially soluble or respectively at least partially solubilized in the phase comprising the mesogenic medium, preferably the one or more polymerizable compounds and the mesogenic medium are intimately mixed, in particular homogeneously mixed, wherein this mixture is nanophase-separated through polymerization, i.e., polymerization-induced phase separation (PIPS). The temperature can be set and adjusted to favourably influence the solubility.

It is advantageously observed that the provided LC medium as set forth above and below is suitably stable with respect to the encapsulation process, in particular the polymerization, and the conditions associated therewith, such as exposure to heat or UV light, e.g., from a UV lamp in the wavelength range from 300 nm to 380 nm. Considering that there is no need to carry out the polymerization between glass substrates, the choice of wavelength is favourably not limited by the UV cutoff of glass, but can be rather set, e.g., in view of the material properties and stability of the composition.

The process conveniently utilizes in situ polymerization and is favourably and preferably based on polymerization combined with phase separation, in particular a combination of nanodispersion and PIPS. The process provides significant advantages in terms of providing a controlled and adaptable preparation method. The nanocapsules obtained by or respectively obtainable from this process show suitable and tunable particle size, while at the same time giving favourably high particle size uniformity, i.e., favourably low polydispersity, and in turn advantageously homogeneous product properties. It was surprisingly found that the setting of a suitable capsule nanosize while furthermore observing and achieving a low polydispersity can have a favourable influence on the operating voltage. Considering the controllability and adaptability of the process, the electro-optical parameters of the obtained nanocapsules and in particular of the LC medium contained therein can be favourably set and tuned.

The size given by the nanodroplets sets the length scale or volume of the transformations or respectively separations, leading to polymerization induced nanophase separation. Moreover, the droplet interface can serve as a template for the encapsulating polymeric shell. The polymer chains or networks forming or starting to form in the nanodroplets may segregate to or be driven to or accumulate at the interface with the aqueous phase, where polymerization may proceed and also terminate to form a closed encapsulation layer. In this respect the forming or respectively formed polymeric shell is substantially immiscible in both the aqueous phase as well as the LC medium.

The polymerization can ensue, be promoted and/or continue at the interface between the aqueous phase and the phase comprising the LC medium. In this respect the interface can act as a diffusion barrier and as a reaction site.

Furthermore, the characteristics, in particular the structure and the building blocks of the polymer, of the forming and formed interface of the capsules can influence the material properties, in particular LC alignment, e.g., through homeotropic anchoring, anchoring energy and switching behaviour in response to an electric field. In one embodiment the anchoring energy or strength is reduced to favourably influence electro-optical switching, wherein, e.g., the polymer surface morphology and polarity can be suitably set and adjusted.

In the process for preparing LC nanocapsules one or more polymerizable compounds are provided as the precursors for the polymeric shell or wall containing or respectively surrounding the LC medium. The polymerizable compounds have at least one polymerizable group. In this respect, it is also referred to the description of the polymerizable group of the polymer binder above.

The one or more polymerizable compounds are chosen such that they have a suitable and sufficient solubility in the LC component or phase. Moreover, they need to be susceptible to the polymerization conditions and environment. In particular, the polymerizable compound(s) can undergo a suitable polymerization with a high conversion rate, leading to a favourably low amount of residual unreacted polymerizable compound after the reaction. This can provide benefits in terms of stability and performance of the LC medium. Furthermore, the polymerizable component is chosen such that the polymer forming therefrom is suitably phase-separating or respectively that the polymer formed therefrom is phase-separated to constitute the polymeric capsule shell. In particular, solubility of the LC component in the shell polymer and swelling or gelling of the formed polymer shell are favourably avoided or respectively minimized, wherein the amount and also the constitution of the LC medium remains substantially constant in the formed capsules. Thus favourably preferential solubility of any LC compound of the LC material in the wall is minimized or avoided.

Swelling or even bursting of the nanocapsules and undesirable leakage of LC material from the capsules are favourably minimized or even completely avoided by providing a suitably tough polymer shell.

The polymerization or curing time depends, inter alia, on the reactivity and the amount of the polymerizable material, the thickness of the formed capsule shell and, if present, the type and amount of polymerization initiator as well as the reaction temperature and/or the power of the radiation, e.g., of the UV lamp. The polymerization or curing times and conditions may be chosen such as to, e.g., obtain a fast process for polymerization, or alternatively to, e.g., obtain a slower process wherein however the completeness of conversion and separation of the polymer may be beneficially influenced. It can thus be preferred to have short polymerization and curing times, for example below 5 minutes, while in an alternative embodiment longer polymerization times, such as more than one hour or even at least three hours, can be preferred.

In an embodiment non-mesogenic polymerizable compounds, i.e., compounds that do not contain a mesogenic group, are used. However, they should exhibit sufficient and suitable solubility or respectively miscibility with the LC component. In a preferred embodiment an organic solvent is additionally provided.

In another aspect, polymerizable mesogenic or liquid-crystalline compounds, also known as reactive mesogens (RMs), are used. These compounds contain a mesogenic group and one or more polymerizable groups, i.e., functional groups which are suitable for polymerization.

Optionally, in an embodiment the polymerizable compound(s) according to the invention comprise(s) only reactive mesogen(s), i.e., all the reactive monomers are mesogens. Alternatively, RMs can be provided in combination with one or more non-mesogenic polymerizable compounds. The RMs can be monoreactive or di- or multireactive. RMs can exhibit favourable solubility or respectively miscibility with the LC medium. However, it is further devised that the polymer forming or respectively formed therefrom shows suitable phase separation behaviour. Preferred polymerizable mesogenic compounds comprise at least one polymerizable group as a terminal group and a mesogenic group as a core group, further preferably comprising a spacer and/or a linking group between the polymerizable group and the mesogenic group. In an embodiment 2-methyl-1,4-phenylene-bis[4[3(acryloyloxy)propyloxy]benzoate (RM 257, Merck KGaA) is used. Alternatively or additionally, one or more lateral substituents of the mesogenic group may also be polymerizable groups.

In yet another embodiment, the use of mesogenic polymerizable compounds is avoided.

In a preferred embodiment the one or more polymerizable compounds are selected from vinylchloride, vinylidenechloride, acrylnitriles, methacrylnitriles, acrylamides, methacrylamides, methyl-, ethyl-, n- or tert.-butyl-, cyclohexyl-, 2-ethylhexyl-, phenyloxyethyl-, hydroxyethyl-, hydroxypropyl-, 2-5 C-alkoxyethyl-, tetrahydrofurfurylacrylates or methacrylates, vinylacetates, -propionates, -acrylates, -succinates, N-vinylpyrrolidones, N-vinylcarbazoles, styrenes, divinylbenzenes, ethylenediacrylates, 1,6-hexanediolacrylates, bisphenol-A-diacrylates and -dimethacrylates, trimethylylpropanediacrylates, trimethylolpropanetriacrylates, pentaerythrittriacrylates, triethyleneglycoldiacrylates, ethyleneglycoldimethacrylates, tripropyleneglycoltriacrylates, pentaerythritoltriacrylates, pentaerythritoltetraacrylates, ditrimethylpropanetetraacrylates or dipentaerythritolpenta- or hexaacrylates. Also thiol-enes are preferred like, for example, the commercially available product Norland 65 (Norland Products).

The polymerizable or reactive group is preferably selected from a vinyl group, an acrylate group, a methacrylate group, a fluoroacrylate group, an oxetane group or an epoxy group, especially preferably an acrylate group or a methacrylate group.

Preferably the one or more polymerizable compounds are selected from acrylates, methacrylates, fluoroacrylates and vinyl acetate, wherein the composition more preferably further comprises one or more direactive and/or trireactive polymerizable compounds, preferably selected from diacrylates, dimethacrylates, triacrylates and trimethacrylates.

In an embodiment the one or more polymerizable compounds as set forth above comprise polymerizable groups selected from one, two or more acrylate, methacrylate and vinyl acetate groups, wherein the compounds preferably are non-mesogenic compounds.

In a preferred embodiment the composition for preparing the capsules comprises one or more monoacrylates, preferably added in an amount, based on the overall composition, from 0.1% by weight to 75% by weight, more preferably from 0.5% by weight to 50% by weight, in particular from 2.5% by weight to 25% by weight. Particularly preferred monoreactive compounds are selected from methyl acrylate, ethyl acrylate, propyl acrylate, isopropyl acrylate, butyl acrylate, t-butyl acrylate, pentyl acrylate, hexyl acrylate, nonyl acrylate, 2-ethyl-hexyl acrylate, 2-hydroxy-ethyl acrylate, 2-hydroxy-butyl acrylate, 2,3-dihydroxypropyl acrylate and glycidyl acrylate.

Additionally or alternatively vinyl acetate may be added.

In another preferred embodiment the composition comprises, optionally in addition to the above monoacrylates, one or more monomethacrylates, preferably added in an amount, based on the overall composition, from 0.1% by weight to 75% by weight, more preferably from 0.5% by weight to 50% by weight, in particular from 2.5% by weight to 25% by weight. Particularly preferred monoreactive compounds are selected from methyl methacrylate, ethyl methacrylate, propyl methacrylate, ispropyl methacrylate, butyl methacrylate, t-butyl methacrylate, pentyl methacrylate, hexyl methacrylate, nonyl methacrylate, 2-ethyl-hexyl methacrylate, 2-hydroxy-ethyl methacrylate, 2-hydroxy-butyl methacrylate, 2,3-dihydroxypropyl methacrylate, glycidyl methacrylate, adamantyl methacrylate and isobornyl methacrylate.

It is particularly preferred that at least one crosslinking agent is added to the composition, i.e., a polymerizable compound containing two or more polymerizable groups. Crosslinking of the polymeric shell in the prepared particle can provide additional benefits, especially with respect to further improve stability and containment, and to tune or respectively reduce susceptibility to swelling, in particular swelling due to solvent. In this respect direactive and multireactive compounds can serve to form polymer networks of their own and/or to crosslink polymer chains formed substantially from polymerizing monoreactive compounds.

Conventional crosslinkers known in the art can be used. It is particularly preferred to additionally provide direactive or multireactive acrylates and/or methacrylates, preferably added in an amount, based on the overall composition, from 0.1% by weight to 75% by weight, more preferably from 0.5% by weight to 50% by weight, in particular from 2.5% by weight to 25% by weight. Particularly preferred compounds are selected from ethylene diacrylate, propylene diacrylate, butylene diacrylate, pentylene diacrylate, hexylene diacrylate, glycol diacrylate, glycerol diacrylate, pentaerythritol tetraacrylate, ethylene dimethacrylate, also known as ethyleneglycol dimethacrylate, propylene diamethcrylate, butylene dimethacrylate, pentylene dimethacrylate, hexylene dimethacrylate, tripropylene glycol diacrylate, glycol dimethacrylate, glycerol dimethacrylate, trimethylpropane trimethacrylate and pentaerythritol triacrylate.

The ratio of monoreactive monomers and di- or multireactive monomers can be favourably set and adjusted to influence the polymer make-up of the shell and its properties.

In an embodiment the surfactant(s) used can be incorporated in the polymeric capsule shell, at least in part, and in particular at the interface with the LC in the interior of the capsule. Such incorporated surfactant molecules at the interface may favourably influence the electro-optical performance and reduce the operating voltage, in particular by setting or tuning the interfacial properties and interactions. In one case the surfactant may favourably influence alignment of the LC molecules, e.g., promoting a homeotropic alignment resulting in a radial configuration. Additionally or alternatively the surfactant molecules may influence the morphology and the physicochemical attributes of the interior polymer surface such that the anchoring strength is reduced. The surfactant thus not only contributes to the advantageous process according to the invention, but it may also provide benefits in the obtained nanocapsules. It is also possible to include further additives to adjust or tune several properties, such as size and interfacial characteristics or alignment, even more effectively and efficiently. Such optional additives further provided may likewise preferably reside or accumulate at the interface.

The surfactant can be useful in lowering the surface or interfacial tension and in promoting emulsifying and dispersion. The surfactant used in the preparation of the LC nanocapsules can promote or contribute to nandroplet formation and stabilization of the nanoemulsion. It may also be useful in setting or adjusting the size and size distribution of the droplets, and also of the produced nanocapsules.

According to a preferred embodiment, the surfactant as used in the preparation of the LC nanocapsules can be prepared or provided separately in an initial step, and then added to the other components. In particular, the surfactant can be prepared or provided as an aqueous mixture or composition, which is then added to the other components comprising the mesogenic medium and the polymerizable compound(s) as set forth above and below. Particularly preferably, one surfactant is provided as aqueous surfactant.

Conventional surfactants known in the art can be used, including anionic surfactants, for example sulfate, e.g., sodium lauryl sulfate, sulfonate, phosphate and carboxylate surfactants, cationic surfactants, for example secondary or tertiary amine and quaternary ammonium salt surfactants, zwitterionic surfactants, for example betaine, sultaine and phospholipid surfactants, and nonionic surfactants, for example long chain alcohol and phenol, ether, ester or amide nonionic surfactants.

In a preferred embodiment according to the invention nonionic surfactant is used. The use of nonionic surfactant can provide benefits during the process of preparing the nanocapsules, in particular with respect to dispersion formation and stabilization as well as in PIPS. It was furthermore recognized that it can be advantageous to avoid charged surfactants in case surfactant, for example residual surfactant, is comprised in the formed nanocapsules. The use of nonionic surfactant and the avoidance of ionic surfactant can thus be beneficial in terms of stability, reliability and the electro-optical characteristics and performance of the nanocapsules, also in the composite system and electro-optical devices.

Particular preference is given to polyethoxylated nonionic surfactant. Preferable compounds are selected from the group of polyoxyethylene glycol alkyl ether surfactants, polyoxypropylene glycol alkyl ether surfactants, glucoside alkyl ether surfactants, polyoxyethylene glycol octylphenol ether surfactants such as Triton™ X-100, polyoxyethylene glycol alkylphenol ether surfactants, glycerol alkyl ester surfactants, polyoxyethylene glycol sorbitan alkyl ester surfactants such as polysorbate, sorbitan alkyl ester surfactants, cocamide monoethanol-amine, cocamide diethanolamine and dodecyldimethylamine oxide.

In a particularly preferred embodiment the used surfactant(s) is (are) selected from polyoxyethylene glycol alkyl ether surfactants, which comprise commercially available Brij® agents (from Sigma-Aldrich). Particular preference is given to a surfactant which comprises, more preferably consists of, tricosaethylene glycol dodecyl ether. In a very particularly preferred embodiment the commercially available Brij® L23 (Sigma-Aldrich), also referred to as Brij 35 or polyoxyethylene (23) lauryl ether, is used. In further particular embodiments preference is given to commercially available Brij® 58, also known as polyethylene glycol hexadecyl ether or polyoxyethylene (20) cetyl ether, or to commercially available Brij® L4, also known as polyethylene glycol dodecyl ether or polyoxyethylene (4) lauryl ether.

In another embodiment it is preferred to use alkylaryl polyether alcohol, preferably commercially available Triton™ X-100, and in particular 4-(1,1,3,3-tetramethylbutyl) phenyl-polyethylene glycol and compounds of the formula $C_{14}H_{22}O(C_2H_4O)_nH$ where n is 9 and 10. Alternatively or additionally, octylphenol ethoxylates surfactants such as ECOSURF™ surfactants (commercially available from Dow), e.g., ESOSURF™ EH-9 (90%), or TERGITOL® surfactants (commercially available from Dow), e.g., TERGITOL® 15-S-9 can preferably be used.

In another embodiment it is preferred to use organosilicones such as polyethersiloxanes and polyether siloxane copolymers, e.g., commercially available TEGO® additives (Evonik), preferably TEGO® Wet 270, and in particular a surfactant comprising, preferably consisting of, 3-[methylbis (trimethylsilyloxy)silyl]propyl-polyethylene glycol, or preferably TEGO® Wet 280. Furthermore, TEGO® WET 260 and TEGO® Wet KL 245 and the silicone surfactants described in U.S. Pat. No. 7,618,777 can be preferably used, e.g., $H_3CSi(CH_3)_2OSiO(CH_3)(CH_2CH_2CH_2O(CH_2CH_2O)_7CH_3)Si(CH_3)_3$.

In yet another embodiment it is preferred to use fluorosurfactant(s), preferably FluorN 322, and in particular a surfactant comprising and more preferably consisting of 2-[[2-methyl-5-(3,3,4,4,5,5,6,6,7,7,8,8,8-tridecafluoro-octoxycarbonylamino)phenyl]carbamoyloxy]ethyl-polypropylene glycol. Other fluorosurfactant(s) such as commercially available FluorN 561 and FluorN 562 (Cytonix) can also preferably be used.

In yet another embodiment it is preferred to use poloxamer copolymers, preferably copolymers comprising units of polyethylene oxide and polypropylene oxide, more preferably a triblock copolymer consisting of a central hydrophobic block of polypropylene glycol flanked by two hydrophilic blocks of polyethylene glycol, and in particular commercially available poloxamer 407 or Pluronic® F-127

(BASF) or Synperonic PE/F127 (Croda). Alternatively or additionally, other Pluronic® additives, e.g., Pluronic® 10R5, may preferably be used.

The surfactant is preferably provided in an amount, relative to the composition as provided for preparing the capsules, of less than 30% by weight, more preferably less than 25% by weight, even more preferably less than 20% by weight, and in particular less than 15% by weight.

When, in accordance with a preferred embodiment, the surfactant is provided as a prepared aqueous mixture, the amount of water is not considered to contribute to the overall composition in terms of weight, i.e., water is excepted in this respect.

Also in the process for preparing the nanocapsules according to the invention polymeric surfactants or surface active polymers or block copolymers can be used.

In a particular embodiment the use of such polymeric surfactants or surface active polymers is however avoided.

According to an aspect of the invention polymerizable surfactant, i.e., surfactant comprising one or more polymerizable groups, can be used.

Such polymerizable surfactant can be used alone, i.e., as the only surfactant provided, or in combination with non-polymerizable surfactant.

In an embodiment, a polymerizable surfactant is provided in addition and in combination with a non-polymerizable surfactant. This optional provision of polymerizable surfactant can provide the combined benefits of contributing to suitable droplet formation and stabilization as well as to the formation of stable polymeric capsule shells. Therefore, these compounds act at the same time as surfactant and polymerizable compound. Particular preference is given to polymerizable nonionic surfactants, in particular to nonionic surfactants which additionally have one or more acrylate and/or methacrylate groups. This embodiment which includes the use of polymerizable surfactant can have an advantage in that the template properties at the amphiphilic interface may be particularly well preserved during polymerization. Furthermore, the polymerizable surfactant may not only take part in the polymerization reaction, but may be favourably incorporated as a building block into the polymer shell, and more preferably also at the shell surface such that it may advantageously influence the interface interactions. In a particularly preferred embodiment silicone polyether acrylate is used as polymerizable surfactant, more preferably cross-linkable silicone polyether acrylate.

In the process the composition is added to an aqueous mixture, wherein the composition is dispersed in an aqueous phase. In this respect the provided surfactant(s) can favourably contribute to form and stabilize the dispersion, in particular emulsion, and to promote homogenization.

In case aqueous mixtures are provided, the amount of water is not considered to contribute to the overall composition in terms of weight, i.e., water is excepted in this respect.

Preferably water is provided as purified water, in particular deionized water.

The composition as provided is then dispersed as nanodroplets in an aqueous phase.

The process can favourably result in the preparation of a large multitude of individual, dispersed or respectively dispersible nanocapsules which each have a polymeric shell and a core comprising LC material, wherein the used surfactant(s) can contribute to a favourably low tendency for agglomeration.

In the PIPS process, phase separation and the properties of the formed polymeric shell, in particular stability and immiscibility with LC component, can be advantageously influenced by optionally and preferably crosslinking the forming or respectively formed polymer chains. However, also without such crosslinking the capsule properties can already be sufficiently good.

It was recognized that the respective miscibilities, solubilities and compatibilities of the various constituents, or a possible lack thereof, in particular of the LC material, the one or more polymerizable compounds as well as the dispersion medium and the forming and formed polymer play an important role, in particular the mixing free energies with the mixing interaction energies and mixing entropies.

Furthermore, it was noted that the encapsulation process is based on polymerization reaction, i.e., that a specific dynamic process is underlying the capsule formation. In particular, it is presently generally observed that the polymerizable compound(s) used for the encapsulation has (have) a suitable miscibility with the LC medium, while the formed capsule shell polymer exhibits a suitably low solubility with the LC material.

In the process for preparing the LC capsules polymerization conversion or completion can be surprisingly high and the amount of residual unreacted polymerizable compound favourably low. This can ensure that the properties and performance of the LC medium in the formed capsules are not or only minimally affected by residual reactive monomers.

In the process the dispersed nanodroplets are subjected to polymerization. In particular, the polymerizable compound(s) contained in, or respectively mixed with, the nanodroplets are polymerized. Preferably and favourably this polymerization leads to PIPS. Through the polymerization the nanocapsules having a core-shell structure as described above and below are formed. The obtained or respectively obtainable nanocapsules are typically spherical, substantially spherical or spheroidal. In this respect some shape asymmetry or small deformation may be beneficial, e.g., in terms of the operating voltage.

Polymerization in the emulsion droplets and at each droplet interface can be carried out using conventional methods. The polymerization can be carried out in one or more steps. In particular, polymerization of the polymerizable compound(s) in the nanodroplets is preferably achieved by exposure to heat or to actinic radiation, wherein actinic radiation here preferably is UV light. In a preferred embodiment free radical polymerization is carried out.

In case polymerization is carried out in more than one step, a shell having more than one layer may be prepared, e.g., a shell structure with two layers, wherein for the additional polymerization step(s) further reactive monomers are provided. Depending on the polymer precursors and/or the polymerization conditions in the steps, the shell layers may have different compositions and respectively different properties. For example, a shell may be formed with a more lipophilic inner layer facing the core and a more hydrophilic outer layer facing the exterior environment, e.g., the binder in a composite film.

Polymerization can be carried out at a suitable temperature. In an embodiment polymerization is performed at a temperature below the clearing point of the mesogenic mixture. In an alternative embodiment it is however also possible to carry out the polymerization at or above the clearing point.

In an embodiment, polymerization is carried out by heating the emulsion, i.e., by thermal polymerization, for example by thermal polymerization of acrylate and/or methacrylate compound(s). Particularly preferred is a thermally initiated free radical polymerization of the reactive polymerizable precursors leading to the nanoencapsulation of the LC material.

In another embodiment, polymerization is carried out by photoirradiation, i.e., with light, preferably UV light. As a source for actinic radiation, for example a single UV lamp or a set of UV lamps can be used. When using a high lamp power the curing time can be reduced. Another possible source for photoradiation is a laser, like e.g., a UV laser, a visible laser or an IR laser.

Suitable and conventionally used thermal initiators or photoinitiators can be added to the composition to facilitate the reaction, for example azo compounds or organic peroxides such as Luperox type initiators. Moreover, suitable conditions for the polymerization and suitable types and amounts of initiators are known in the art and are described in the literature.

In an embodiment initiators are used that are well soluble in the nanodroplets but which are water insoluble, or at least substantially water insoluble. For example, in the process for preparing the nanocapsules azobisisobutyronitrile (AIBN) can be used, which in a particular embodiment is further comprised in the composition according to the invention. Alternatively or also additionally, water soluble initiators may be provided, such as for example 2,2'-azobis(2-methylpropionamide) dihydrochloride (AIBA).

Further additives may also be added. In particular, the polymerizable material can additionally comprise one or more additives, such as for example catalysts, sensitizers, stabilizers, inhibitors and chain transfer agents.

For example, the polymerizable material may also comprise one or more stabilizers or inhibitors to prevent undesired spontaneous polymerization, like for example the commercially available Irganox® (Ciba Geigy AG, Basel, Switzerland).

By adding one or more chain transfer agents to the polymerizable material the properties of the obtained or respectively obtainable polymer may be modified. By using chain transfer agents the length of the free polymer chains and/or the length of the polymer chains between two cross-links in the polymer can be adjusted, wherein typically the polymer chain length in the polymer decreases when the amount of the chain transfer agent is increased.

Polymerization is preferably performed under an inert gas atmosphere, for example nitrogen or argon, more preferably in a heated nitrogen atmosphere. But also polymerization in air is possible.

It is furthermore preferred that for preparing the LC nanocapsules polymerization is carried out in the presence of an organic solvent, wherein preferably the organic solvent is provided in the composition comprising the LC medium. The use of the organic solvent, for example hexadecane or 1,4-pentanediol, can be favourable in terms of adjusting the solubility of the reactive compound(s) with the LC material and to stabilize the nanodroplets, and it can also be beneficial in influencing phase separation. It is however preferred that the amount of organic solvent, if used at all, is limited, typically to below 25% by weight, based on the overall composition, more preferably to less than 20% by weight, and in particular to less than 15% by weight.

The one or more organic solvents can contribute to setting or adapting the components solubilities or respectively miscibilities. The solvent may act as a suitable cosolvent, wherein the solvent power of other organic constituents may be enhanced or influenced. Furthermore, the organic solvent(s) can have a favourable influence during phase separation induced by the polymerization of the polymerizable compound(s).

In this respect as organic solvent(s) standard organic solvents can be used. The solvent(s) can be selected, for example, from aliphatic hydrocarbons, halogenated aliphatic hydrocarbons, aromatic hydrocarbons, halogenated aromatic hydrocarbons, alcohols, glycols or their esters, ethers, esters, lactones, ketones, and the like, more preferably from diols, n-alkanes and fatty alcohols. It is also possible to use binary, ternary or higher mixtures of the above solvents.

In a preferred embodiment the solvent is selected from one or more of cyclohexane, tetradecafluorohexane, dodecane, tridecane, tetradecane, pentadecane, hexadecane, heptadecane, hexadecan-1-ol, 2-isopropoxy ethanol, octyldodecanol, 1,2-ethanediol, 1,2-propanediol, 1,3-butanediol, 1,4-butanediol, pentanediol, in particular 1,4-pentanediol, hexanediol, in particular 1,6-hexanediol, heptanediol, octanediol, triethanolamine, ethyl acetate, ethyl hexanoate and butyl acetate. It is particularly preferable that the organic solvent used comprises hexadecane or 1,4-pentanediol, in particular is hexadecane or 1,4-pentanediol. In a further embodiment a combination comprising hexadecane and 1,4-pentanediol is used.

The organic solvent(s), in particular hexadecane, is (are) preferably added in an amount, based on the overall composition comprising the LC medium and the reactive monomers, from 0.1% by weight to 35% by weight, more preferably from 1% by weight to 25% by weight, in particular from 3% by weight to 17% by weight.

The organic solvent can enhance solubility or respectively solubilisation, or dilute other organic components and may contribute to tuning the viscosity.

In an embodiment the organic solvent acts as a hydrophobic agent. Its addition to the dispersed phase of the nano- or miniemulsion can influence, in particular increase, the osmotic pressure in the nanodroplets. This can contribute to stabilizing the "oil-in-water" emulsion by suppressing Ostwald ripening. Preferable organic solvents serving as hydrophobic agents have a solubility in water which is lower than the solubility of the liquid crystal in water, while they are soluble in the liquid crystal. The organic solvent, preferably the hydrophobic agent, can act as a stabilizer or co-stabilizer.

The composition used to prepare the LC nanocapsules may contain additional compounds such as one or more pleochroic dyes, in particular dichroic dye(s), one or more chiral compounds and/or other customary and suitable additives.

Pleochroic dyes preferably are dichroic dyes and can be selected from for example azo dyes and thiadiazole dyes.

Suitable chiral compounds are for example standard chiral dopants like R- or S-811, R- or S-1011, R- or S-2011, R- or S-3011, R- or S-4011, R- or S-5011, or CB 15 (all available from Merck KGaA, Darmstadt, Germany), sorbitols as described in WO 98/00428, hydrobenzoins as described in GB 2,328,207, chiral binaphthols as described in WO 02/94805, chiral binaphthol acetals as described in WO 02/34739, chiral TADDOLs as described in WO 02/06265, or chiral compounds having fluorinated linkage groups as described in WO 02/06196 or WO 02/06195.

Furthermore, substances can be added to change the dielectric anisotropy, the optical anisotropy, the viscosity and/or the temperature dependence of electro-optical parameters of the LC material.

The formed polymer shell of the nanocapsules suitably exhibits low solubility, i.e., is substantially insoluble, in respect of both the LC material as well as water. Furthermore, in the process, coagulation or respectively aggregation of the produced nanocapsules can suitably and favourably be limited or even avoided.

It is also preferred that the forming polymer or respectively the formed polymer in the shell is crosslinked. Such crosslinking can provide benefits in forming a stable polymeric shell and in giving suitable containment and barrier functionality, while maintaining sufficient mechanical flexibility.

The process thus provides encapsulation and confinement of the mesogenic medium, while substantially maintaining the electro-optical performance and in particular electric responsiveness of the LC material. In particular, the composition as well as process conditions are provided such that stability of the LC material is maintained. The LC material can therefore exhibit in the formed nanocapsules favourable characteristics, for example suitably high $\Delta\varepsilon$, suitably high $\Delta n$, a high favourable clearing point and a low melting point. In particular, the LC material provided can show suitable and favourable stability in the polymerization, for example with respect to exposure to heat or UV light.

In the process stable nanocapsules are produced which are suitably dispersed. After obtaining the nanocapsules optionally and preferably the aqueous phase can be removed, or respectively the amount of water can be reduced or depleted, or alternatively the aqueous phase can be exchanged for another dispersion medium.

In an embodiment the dispersed or respectively dispersible nanocapsules are substantially or fully separated from the aqueous phase, for example by filtration or centrifugation. Conventionally used filtration, e.g., membrane filtration, dialysis, cross-flow filtration and in particular cross-flow filtration in combination with dialysis, and/or centrifugation techniques can be used. Filtration and/or centrifugation can provide further benefits by, for example, removing excess or unwanted or even residual surfactant as provided in step (b). It is thus possible to not only provide concentration of the nanocapsules but also purification, e.g., by removing contaminants, impurities or unwanted ions.

Preferably and favourably the amount of surface charge of the capsules is kept at a minimum. Based on the mechanical stability the nanocapsules can be subjected to the separation techniques with relative ease, e.g., using evaporation or extraction methods. It is also possible to dry the nanocapsules, wherein drying means removing the dispersion medium but leaving the contained LC material inside the capsules. Conventional techniques such as drying in air, critical point drying and freeze-drying, in particular freeze-drying can be used. Other conventional means of solvent removal, separation, purification, concentration and work-up, e.g., chromatography or size fractionation may also be performed.

In the process for obtaining LC nanocapsules water or aqueous solutions are favourably used as dispersing medium. In this respect it is however also furthermore observed that the provided composition as well as the produced nanocapsules show suitable stability and chemical resistance to the presence of water, for example with respect to hydrolysis. In an embodiment the amount of water may be reduced or even substantially minimized by providing or adding polar media, preferably non-aqueous polar media, containing for example formamide or ethylene glycol or hydrofluorocarbons.

The process provides a large multitude of individual nanocapsules which are dispersible and even redispersible. They can thus be further used and applied to various environments with ease and flexibility. Due to their stability storing of the capsules, in particular with suitably long shelf life, before use in various applications also becomes possible. However, immediate further processing is also an option that is favourably provided. In this respect the capsules are suitably stable during processing, in particular for coating applications with the polymeric binder as described herein.

The process as described above provides a convenient method to produce the nanocapsules in a controlled and adaptable manner. In particular, capsule particle size can suitably be tuned while keeping polydispersity low, for example by adjusting the amount of surfactant in the composition. It was surprisingly found that a suitably set, uniform capsule size can be particularly advantageous in view of reducing the operating voltage in electro-optical applications.

In the LC nanocapsules, the LC medium is preferably contained in an amount, based on the capsules as a whole, from 5% by weight to 95% by weight, more preferably from 15% by weight to 75% by weight, in particular from 25% by weight to 65% by weight.

By providing the nanocapsules it is possible to confine discrete amounts of LC material in nanovolumes, which are stably contained and individually addressable and which can be mounted or dispersed in the binder as described herein.

The LC material nanoencapsulated by a polymeric shell can be easily applied to and supported from a single substrate, which may be flexible and wherein the layer or film thickness can be variable or respectively varied. The LC medium which is surrounded, i.e., enclosed by a polymeric wall, is operable in at least two states.

However, the nanodroplets each provide only a comparatively small volume of LC. It was thus presently realized to preferably and favourably provide the LC component having a suitably large $\Delta n$, while furthermore exhibiting good transmission and good reliability, including in particular a suitable voltage holding ratio (VHR) and thermal and UV stability as well as relatively small rotational viscosity. Furthermore, the LC component can favourably be provided with suitable and reasonably high values for the dielectric anisotropy $\Delta\varepsilon$ to obtain relatively small threshold voltages in electro-optical device applications.

It was furthermore advantageously recognized that in the nanocapsules the interface area between the LC core and the polymeric shell is relatively large compared to the provided nanovolume and that therefore the respective properties of the polymeric shell component and the LC core component and their interrelations need to be particularly taken into consideration. In the nanocapsules the interactions between the polymer and the LC component can favourably and suitably be set and adjusted, which is primarily obtainable on account of the provided composition for nanoencapsulation as well as the control and adaptability of the provided process of preparation.

For example, the interface interactions can favour or discourage the formation of any alignment or orientation in the LC nanodroplets.

Considering the small size of the nanocapsules, which can be subwavelength of visible light and even smaller than $\lambda/4$ of visible light, the capsules may advantageously be only very weak scatterers of visible light.

Furthermore, in the absence of an electric field and depending on the interface interactions, the LC medium may in one case form a disordered phase with little or no orientation in the nanosized volumes, in particular an isotropic phase, which can for example provide excellent viewing angle behaviour. Moreover, having intrinsically an isotropic phase in the unpowered or non-addressed state can be advantageous in device applications in that a very good dark state may be realized, in particular when using polarizers.

As opposed to an occurrence of for example a radial or bipolar orientation, it is believed that in one case such orientation may not happen, or at least be limited, on account of the small volume provided in the nanocapsules.

Alternatively, and as preferred in a particular embodiment, arrangement may occur, wherein in particular the interface interaction(s) can be used to induce or influence alignment and orientation in the LC medium, for example by setting or adjusting anchoring strengths with the capsule wall. In such a case uniform, planar, radial or bipolar alignment may occur. When such nanocapsules having respectively and individually LC orientation or alignment are randomly dispersed, overall an optical isotropy may be observed.

The spherical or spheroidal geometry along with curvature set a constraint or boundary condition for the nematic configuration as well as the alignment of the liquid crystal molecules, which can further depend on the anchoring of the LC at the capsule surface, the elastic properties and the bulk and surface energetics as well as the size of the capsules. The electro-optical response in turn is dependent on the LC ordering and orientation in the nanocapsules.

Furthermore, any possible absence or presence of alignment and orientation of the encapsulated LC medium is independent of the substrate such that there is no need to provide an alignment layer on the substrate.

In particular, when the LC in the capsules has a radial configuration and the particle size is below the wavelength of light, the nanocapsules are substantially optically isotropic or respectively show pseudo-isotropic optical properties. This allows to realize an excellent dark state when two crossed polarizers are used. Upon switching with an electric field, in particular in-plane switching, an axial configuration which is optically anisotropic can be obtained, where the induced birefringence causes transmission of light.

Therefore, in a preferred embodiment the LC material comprised in the nanocapsules has a radial configuration.

For the switching, in particular switching based on birefringence induced in the IPS configuration, favourably dielectrically positive or dielectrically negative LC media may be used.

As described herein favourable nanocapsules may be provided, i.e., capsules constituting nanocontainers having a polymeric shell, which optionally and preferably is cross-linked, filled with the LC material. The capsules are individual and separate, i.e., discrete and dispersible particles having a core-shell structure. The capsules can act individually but also collectively as light modulating material. They can be applied to various environments and be dispersed in the polymer binder as presently described.

The nanocapsules can also be referred to as nanoparticles. In particular, the nanoparticles comprise nanoscale LC material surrounded by a polymer shell. These nanoencapsulated liquid crystals are embedded in the polymeric binder according to the present invention.

Optionally, the comprised mesogenic medium can further contain one or more chiral dopants and/or one or more pleochroic dyes and/or other customary additives.

In the nanocapsules a shell polymer can be provided, in particular by polymerizing the precursor compound(s) described above, which is well matched with respect to the LC component and which is compatible with the LC performance. It is preferred that the electrical impedance of the capsule polymer is at least equal to and more preferably larger than that of the LC material.

In addition, the shell polymer can be advantageous in terms of dispersibility and avoidance of unwanted aggregation. In particular, the shell polymer can be combined and function well with the binder as described herein, for example in a film-forming composite system and in particular in electro-optical applications.

The capsules, wherein a liquid crystal is encapsulated by a shell material component, are characterized in that they are nano-sized. Preference is given to nanocapsules having an average size of not greater than 400 nm.

Preferably, the nanocapsules have an average size, as determined by dynamic light scattering analysis, of not greater than 400 nm, for example, from 10 nm to 400 nm, more preferably from 50 nm to 300 nm, even more preferably from 100 nm to 250 nm. Dynamic light scattering (DLS) is a commonly known technique which is useful for determining the size as well as the size distribution of particles in the submicron region. For example, a commercially available Zetasizer (Malvern) may be used for the DLS analysis.

Even more preferably, the average size of the nanocapsules is below 200 nm, in particular is not greater than 150 nm, as is preferably determined by DLS. In a particularly preferred embodiment the average nanocapsule size is below the wavelength of visible light, in particular smaller than λ/4 of visible light. It is advantageously found that the nanocapsules according to the invention in at least one state, in particular with appropriate LC alignment or configuration, can be very weak scatterers of visible light, i.e., that they do not, or substantially not, scatter visible light. In this case the capsules can be useful in modulating the phase shift between the two polarization components of light, i.e., the phase retardation, while not showing or substantially not showing unwanted scattering of light in any state.

In an embodiment the retardation is set to be approximately λ/2, in particular to be λ/2 for a wavelength of 550 nm. This can be achieved by e.g., providing suitable types and amounts of nanocapsules in a film and setting an appropriate film thickness.

For electro-optical applications the polymer-encapsulated mesogenic medium preferably exhibits a confinement size from 15 nm to 400 nm, more preferably from 50 nm to 250 nm and in particular from 75 nm to 150 nm.

If the capsule size becomes very small, in particular approaching the molecular size of the LC molecules, the functionality of the capsules may become less efficient, considering that the amount of enclosed LC material decreases and also the mobility of the LC molecules becomes more limited.

The thickness of the polymeric shell or respectively wall, which forms a discrete individual structure, is chosen such that it effectively contains and stably confines the contained LC medium, while at the same time allowing for relative flexibility and still enabling excellent electric responsiveness of the LC material. In view of capacitance and electro-optical performance, the shell should preferably be as thin as possible while still providing adequate strength for containment. Therefore, the typical capsule shell or wall thickness is below 100 nm. Preferably, the polymeric shell has a thickness of less than 50 nm, more preferably below 25 nm, and in particular below 15 nm. In a preferred embodiment, the polymeric shell has a thickness from 1 nm to 15 nm, more preferably from 3 nm to 10 nm, and in particular from 5 nm to 8 nm.

Microscopy techniques, in particular SEM and TEM can be used to observe the nanocapsule size, structure and morphology. Wall thickness can e.g., be determined by TEM on freeze-fractured samples. Alternatively, neutron scattering techniques may be used. Moreover, for example AFM, NMR, ellipsometric and sum-frequency generation techniques can be useful to study the nanocapsule structure. The nanocapsules according to the invention typically have spherical or spheroidal shape, wherein the hollow spherical or spheroidal shells are filled with or respectively contain the LC medium according to the invention.

The present invention thus provides a composite comprising the binder as described above and below and a plurality of dispersed discrete spherical or spheroidal bodies or particles of LC which are each nanoencapsulated by a polymeric shell and which each individually but also collectively are operable in electro-optical devices in at least two states.

The LC component provides the beneficial chemical, physical and electro-optical characteristics as described above, such as good reliability and stability and low rotational viscosity. In a preferred embodiment the LC medium according to the invention has a birefringence of $\Delta n \geq 0.15$, more preferably $\geq 0.20$ and most preferably $\geq 0.25$. It is even more preferred when the LC medium according to the invention additionally has a dielectric anisotropy of $\Delta \varepsilon \geq 10$.

Surprisingly, by suitably providing and setting the birefringence as well as the dielectric anisotropy according to the invention, even the small nanovolume of LC is sufficient to effectively and efficiently modulate light, wherein only moderate electric fields or respectively only moderate driving voltages can be used to effect or respectively change alignment of the LC molecules in the nanocapsules.

Furthermore, using the method described herein it is possible to obtain substantially uniform capsule sizes, i.e., to achieve low polydispersity. This uniformity can favourably provide a uniform electro-optical performance of the capsules in device applications.

Moreover, the capsules obtained by or respectively obtainable from the controlled and adaptable process described herein can be adjusted and tuned in terms of capsule size, which in turn allows to tune the electro-optical performance as desired, in particular based on the Kerr effect.

The small and uniform size of the nanocapsules can be beneficial in terms of obtaining fast and uniform switching in response to an applied electric field, in particular in combination with the binder as used according to the present invention, preferably giving low millisecond or even sub-millisecond response times.

It was found that the combination of the nanocapsules with the binder material as described herein can suitably influence and increase the processibility and applicability of the light modulating material, in particular in view of coating, dropping or printing on substrates and film formation.

It was found that the discrete nanocapsules can be mixed with the binder material, wherein the mixed nanocapsules substantially maintain, preferably fully maintain, their integrity in the composite while however being bound, held or mounted in the binder.

The binder can be useful in that it can disperse the nanocapsules, wherein the amount or concentration of the capsules can be set and adjusted. By independently providing the capsules and the binder the amount of the capsules in the combined composite cannot only be tuned, but especially a very high content, and alternatively also a very low content, of the capsules is obtainable if desired.

Typically, the nanocapsules are contained in the composite in a proportion from about 2% by weight to about 95% by weight. Preferably, the composite contains the nanocapsules in a range from 10% by weight to 85% by weight, more preferably from 30% by weight to 70% by weight. In a preferred embodiment the amounts of binder and nanocapsules used are approximately the same.

It was found that the binder material as described above and below can particularly improve or influence the coatabilty or printability of the capsules and the film forming ability and performance. In addition, the binder can provide mechanical support while maintaining a suitable degree of flexibility, and it can serve as a matrix. The binder furthermore exhibits suitable and adequate transparency.

In an embodiment, the binder composition may additionally comprise, besides the modified PVA as described herein, further inorganic or organic materials commonly used as binders, in particular polymeric materials such as synthetic resins, for example epoxy resins, polyurethanes, polyvinyl acrylates, polyvinyl acetates and polymethyl methacrylate. Alternatively or additionally, materials such as polyvinyl pyrrolidine and polyvinyl alcohol, which includes partially and fully hydrolyzed PVA, can also be used, in particular as a minor component of the binder.

The binder can be provided as a liquid or paste, wherein a carrier medium or solvent, such as water, aqueous solvent or organic solvent, can be removed from the composite mixture, for example during or after film formation, in particular by evaporation at an elevated temperature. Preferably the use of organic solvent is minimized or even entirely avoided.

The binder as described herein can be mixed and combined well with the nanocapsules. Furthermore, aggregation of capsules is suitably avoided or minimized, such that e.g., light leakage can be avoided or minimized, which in turn can make a very good dark state possible. Moreover, it is possible to provide the binder such that a high density of nanocapsules can be provided in the composite, for example in a film formed of the composite. Furthermore, in the composite the structural and mechanical advantages of the binder can be combined with the favourable electro-optical properties of the LC capsules.

The binder cannot only improve film forming behaviour but also film properties, wherein in particular the binder can hold the capsules relative to a substrate. Typically, the capsules are randomly distributed or respectively randomly oriented in the binder. Owing to the LC alignment in the capsules, in particular in case of radial alignment, and/or due to the random distribution of the capsules overall a material which is optically isotropic, or at least substantially optically isotropic, on the macroscopic scale can be obtained.

The composite comprising the binder material and the nanocapsules may be suitably applied or laminated to a substrate. For example, the composite can be applied onto the substrate by conventional coating techniques such as spin coating, blade coating or drop coating. Alternatively they can also be applied to the substrate by conventional and known printing methods, like for example ink-jet printing. It is also possible to dissolve the composite in a suitable solvent. This solution is then coated or printed onto the substrate, for example by spin-coating or printing or other known techniques, and the solvent is evaporated off. In many cases it is suitable to heat the mixture in order to facilitate the evaporation of the solvent. As solvents for example water, aqueous mixtures or standard organic solvents can be used. However, preferably the use of organic solvent is minimized or even avoided.

Typically films are formed having a thickness of below 25 µm, preferably below 15 µm. In a preferred embodiment a film made of the composite has a thickness of from 0.5 µm to 10 µm, very preferably from 1 µm to 7 µm, in particular from 2 µm to 5 µm. In a particularly preferred embodiment the layer thickness is in a range from 2 µm to 4 µm, more preferably from 3 µm to 4 µm, and even more preferably from 3.5 µm to 4.0 µm.

As substrate for example glass, silicon, quartz sheets or plastic films can be used. It is also possible to put a second substrate on top of the applied, preferably coated or printed, material. Isotropic or birefringent substrates can be used. It is also possible to apply an optical coating, in particular with optical adhesive.

In a preferred embodiment the substrate can be a flexible material. Given the flexibility as provided by the composite, overall a flexible system or device is thus obtainable.

Suitable and preferred plastic substrates are for example films of polyester such as polyethyleneterephthalate (PET) or polyethylenenaphthalate (PEN), polyvinylalcohol (PVA), polycarbonate (PC) or triacetylcellulose (TAC), more preferably PET or TAC films. As birefringent substrates for example uniaxially stretched plastics film can be used. PET films are commercially available for example from DuPont Teijin Films under the trade name Melinex®.

The substrates can be transparent and transmissive or reflective. For electro-optical addressability the substrates can exhibit electrode(s). In a typical embodiment a glass substrate with ITO electrodes is provided.

The electrical and optical properties of the LC material, the polymeric capsule shell and the binder can be favourably matched or aligned in terms of compatibility and in view of the respective applications. The composite according to the invention can provide suitable and advantageous electro-optical behaviour and performance.

Furthermore, excellent physical and chemical stability is obtainable, for example by favourably reducing water uptake. In particular, good stability and resistance to heat or mechanical stress can be achieved while at the same time still providing suitable mechanical flexibility.

The binder as preferably used herein, and preferably also the polymer shell, has a relatively large impedance in view of the electric responsiveness of the LC as well as a suitable dielectric constant close to that of the LC material to limit charging at the interfaces. It is observed that the dielectric constant of the binder is sufficiently high to ensure that an electric field is efficiently applied across the LC medium in the capsules. Any charge or ionic content in these materials is preferably minimized to keep conductivity very low. In this respect it was found that the properties of the provided binder can be improved by purification, in particular by removing or decreasing the amount of impurities and charged contaminants. For example, the binder may be dissolved and washed in deionized water or alcohol, and it may be treated by dialysis or soxhlet purification.

Furthermore, the refractive indices of the LC material, the polymeric capsule shell and the binder are favourably and preferably matched or aligned in view of optimum performance in the respective applications. In particular, the refractive indices of the LC material and the binder are coordinated. In particular, the refractive index of the binder, and possibly also that of the capsule polymer, can be set or adjusted in view of the extraordinary refractive index ($n_e$) of the LC, the ordinary refractive index ($n_o$) of the LC, or the average refractive index ($n_{avg}$) of the LC. In particular, the refractive index of the binder, and also of the shell polymer, can be matched closely to $n_e$, $n_o$ or $n_{avg}$ of the LC material.

In an embodiment the nanocapsules are dispersed in the binder, wherein the capsules in the binder exhibit a random orientation relative to each other. Regardless of any possible absence or presence of alignment or orientation of the LC material within each individual capsule, this random orientation of the capsules with respect to each other can result in the LC material as a whole giving an observed average refractive index ($n_{avg}$). Considering the nano-size of the capsules and their favourable potential to act as only very weak scatterers of light, in this embodiment the application of an electric field, wherein the electric field forces (re) alignment of the LC material, can modulate the phase shift, or retardation, of the transmitted, or reflected, light, without however changing the apparent scattering, if at all present. In such a case, and in particular when the size of the capsules is significantly smaller than the wavelength of light, the refractive index of the binder, and preferably also the polymeric capsule shell, can e.g., suitably and advantageously be adjusted or matched with respect to $n_{avg}$ of the LC material. The nanocapsules can thus behave as efficient nanoscale phase modulators.

Given the nanosize of the capsules and in the absence of an electric field, light scattering may be substantially suppressed, preferably completely suppressed, in particular for sizes smaller than 400 nm. Furthermore, scattering and refraction may be controlled by matching or adjusting the refractive indices of the LC material and of the polymeric materials.

When the capsules and the respective LC directors are randomly oriented in the binder, in an embodiment the phase shift can be polarization-independent for normally incident light.

In another embodiment the capsules are aligned or oriented in the binder.

The composite systems according to the invention advantageously allow for a high degree of adaptability and for setting and adjusting several degrees of freedom, especially in view of tuning the electro-optical properties and functionality. For example the layer or film thickness can be set, adapted or varied while being able to independently vary the density of the nano-sized LC material in the film, wherein furthermore the size of the nanocapsules, i.e., the amount of LC material in each individual capsule can be preset and thus also adjusted. Furthermore, the LC medium can be chosen to have specific properties, e.g., suitably high values of Δε and Δn. In addition, the binder properties can be adjusted and tuned as described above.

In a preferred embodiment the amount of LC in the nanocapsules and in the composite is suitably maximized to achieve favourably high electro-optical performance.

According to the invention a composite can favourably be provided, with relative production ease and high processibility, that can make good transmittance, low operating voltages, improved VHR and a good dark state possible. Surprisingly a robust, effective and efficient system is obtainable, which is applicable to a single substrate without any alignment layer or without surface rubbing and which can exhibit relative insensitivity to layer thickness deviations or to external forces such as touching, also in terms of light leakage. Moreover, a wide viewing angle can be obtainable without providing an alignment layer or an additional retardation layer.

Preferably and favourably the nanocapsules and composite systems as provided show sufficient processibility such that aggregation during concentration and filtration of the capsules, mixing with the binder, film formation and optional drying of the film is kept at a minimum.

The composite systems according to the invention are useful in optical and electro-optical applications, in particular in light-modulation elements or ectro-optical devices, and especially in displays. For display applications, fast response and switching times and thus e.g., fast video and/or sequential colour capabilities may be obtainable.

In particular, the composites comprising a plurality of nanocapsules containing the LC medium and mixed with the binder are suitable for efficient control and modulation of light. They may be used, for example, in optical filters, tunable polarizers and lenses, and phase plates. As phase modulators they may be useful for photonic devices, optical communications and information processing, and three-dimensional displays. A further use is in smart windows or privacy windows which are switchable.

The liquid crystalline medium contained in the nancapsules preferably comprises one or more compounds of formula I as set forth above. It is particularly preferred that one or more compounds of the one or more compounds of formula I are selected from the compounds of formulae Ia, Ib, Ic and Id

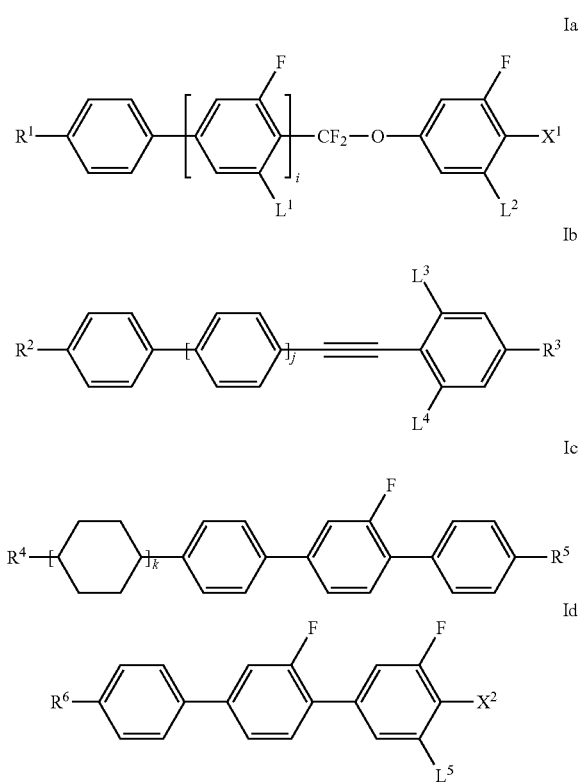

wherein $R^1$, $R^2$, $R^3$, $R^4$, $R^5$ and $R^6$ denote, independently of one another, straight-chain or branched alkyl or alkoxy having 1 to 15 carbon atoms or straight-chain or branched alkenyl having 2 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, $X^1$ and $X^2$ denote, independently of one another, F, $CF_3$, $OCF_3$ or CN, $L^1$, $L^2$, $L^3$, $L^4$ and $L^5$ are, independently of one another, H or F, i is 1 or 2, and j and k are, independently of one another, 0 or 1.

Many of the mesogenic compounds or mixtures thereof described above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here in greater detail.

The media according to the invention are prepared in a manner conventional per se. In general, the components are dissolved in one another, preferably at elevated temperature. By means of suitable additives, the liquid-crystalline phases of the present invention can be modified in such a way that they can be used in liquid-crystal display elements. Additives of this type are known to the person skilled in the art and are described in detail in the literature (H. Kelker/R. Hatz, Handbook of Liquid Crystals, Verlag Chemie, Weinheim, 1980). For example, pleochroic dyes can be added for the production of coloured guest-host systems or substances can be added in order to modify the dielectric anisotropy, the viscosity and/or the alignment of the nematic phases.

The term "alkyl" preferably encompasses straight-chain and branched alkyl groups having 1-7 carbon atoms, particularly the straight-chain groups methyl, ethyl, propyl, butyl, pentyl, hexyl and heptyl. Groups having 2-5 carbon atoms are generally preferred.

An alkoxy can be straight-chain or branched, and it preferably is straight-chain and has 1, 2, 3, 4, 5, 6 or 7 carbon atoms, and accordingly is preferably methoxy, ethoxy, propoxy, butoxy, pentoxy, hexoxy or heptoxy.

The term "alkenyl" preferably encompasses straight-chain and branched alkenyl groups having 2-7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4E-alkenyl, $C_6$-$C_7$-5E-alkenyl and $C_7$-6E-alkenyl, in particular $C_2$-$C_7$-1E-alkenyl, $C_4$-$C_7$-3E-alkenyl and $C_5$-$C_7$-4E-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Groups having up to 5 carbon atoms are generally preferred.

Fluorinated alkyl or alkoxy preferably comprises $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, $OCFHCFH_2$, $OCH_2CF_3$, $OCH_2CF_2H$, $OCH_2CFH_2$, $OCF_2CF_2H$, $OCF_2CFH_2$, $C_3F_7$ or $OC_3F_7$, in particular $CF_3$, $OCF_3$, $CF_2H$, $OCF_2H$, $C_2F_5$, $OC_2F_5$, $CFHCF_3$, $CFHCF_2H$, $CFHCFH_2$, $CF_2CF_2H$, $CF_2CFH_2$, $OCFHCF_3$, $OCFHCF_2H$, $OCFHCFH_2$, $OCF_2CF_2H$, $OCF_2CFH_2$, $C_3F_7$ or $OC_3F_7$, particularly preferably $OCF_3$ or $OCF_2H$. Fluoroalkyl in a preferred embodiment encompasses straight-chain groups with terminal fluorine, i.e., fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

Oxaalkyl preferably encompasses straight-chain groups of the formula $C_nH_{2n+1}$—O—$(CH_2)_m$, where n and m are each, independently of one another, from 1 to 6. Preferably, n=1 and m is 1 to 6.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

Halogen is preferably F or Cl, in particular F.

If one of the above mentioned groups is an alkyl group in which one $CH_2$ group has been replaced by —CH=CH—, this can be straight-chain or branched. It is preferably straight-chain and has 2 to 10 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

If one of the above mentioned groups is an alkyl group in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms.

They are accordingly in particular acetyloxy, propionyloxy, butyryloxy, pentanoyloxy, hexanoyloxy, acetyloxymethyl, propionyloxymethyl, butyryloxy-methyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxy-carbonyl)propyl, 3-(ethoxycarbonyl)propyl or 4-(methoxycarbonyl)butyl.

If one of the above mentioned groups is an alkyl group in which one $CH_2$ group has been replaced by unsubstituted or substituted —CH=CH— and an adjacent $CH_2$ group has been replaced by CO, CO—O or O—CO, this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxy-octyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the above mentioned groups is an alkyl or alkenyl group which is monosubstituted by CN or $CF_3$, this group is preferably straight-chain. The substitution by CN or $CF_3$ is in any position.

If one of the above mentioned groups is an alkyl or alkenyl group which is at least monosubstituted by halogen, this group is preferably straight-chain and halogen is preferably F or Cl, more preferably F. In the case of polysubstitution, halogen is preferably F. The resulting groups also include perfluorinated groups. In the case of monosubstitution, the fluoro or chloro substituent can be in any desired position, but is preferably in the w-position.

Compounds containing branched groups may occasionally be of importance owing to better solubility in some conventional liquid-crystalline base materials. However, they are particularly suitable as chiral dopants if they are optically active.

Branched groups of this type generally contain not more than one chain branch. Preferred branched groups are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If one of the above mentioned groups is an alkyl group in which two or more $CH_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-bis-carboxynonyl, 10,10-biscarboxydecyl, bis(methoxycarbonyl)methyl, 2,2-bis-(methoxycarbonyl)ethyl, 3,3-bis(methoxycarbonyl)propyl, 4,4-bis(methoxy-carbonyl)butyl, 5,5-bis(methoxycarbonyl)pentyl, 6,6-bis(methoxycarbonyl)-hexyl, 7,7-bis(methoxycarbonyl)heptyl, 8,8-bis(methoxycarbonyl)octyl, bis-(ethoxycarbonyl)methyl, 2,2-bis(ethoxycarbonyl)ethyl, 3,3-bis(ethoxy-carbonyl)propyl, 4,4-bis(ethoxycarbonyl)butyl or 5,5-bis(ethoxycarbonyl)-pentyl.

The LC medium according to the present invention preferably has a nematic phase range between −10° C. and +70° C. The LC medium even more suitably may have a nematic phase range between −20° C. and +80° C. It is even more advantageous when the LC medium according to the present invention has a nematic phase range between −20° C. and +90° C.

The LC medium according to the present invention preferably has a birefringence of $\Delta n \geq 0.15$, more preferably $\Delta n$ is $\geq 0.20$, and most preferably $\Delta n$ is $\geq 0.25$.

The LC medium according to the present invention preferably has a dielectric anisotropy $\Delta\varepsilon \geq +10$, more preferably $\Delta\varepsilon$ is $\geq +15$, and most preferably $\Delta\varepsilon$ is $\geq +20$.

The LC medium according to the present invention preferably and favourably exhibits a high reliability and a high electric resistivity, also known as specific resistivity (SR). The SR value of an LC medium according to the invention is preferably $\geq 1 \times 10^{13}$ W cm, very preferably $\geq 1 \times 10^{14}$ W cm. Unless described otherwise, the measurement of the SR is carried out as described in G. Weber et al., Liquid Crystals 5, 1381 (1989).

The LC medium according to the present invention also preferably and favourably exhibits a high voltage holding ratio (VHR), see S. Matsumoto et al., Liquid Crystals 5, 1320 (1989); K. Niwa et al., Proc. SID Conference, San Francisco, June 1984, p. 304 (1984); T. Jacob and U. Finkenzeller in "Merck Liquid Crystals—Physical Properties of Liquid Crystals", 1997. The VHR of an LC medium according to the invention is preferably ≥85%, more preferably ≥90%, and even more preferably ≥95%. Unless described otherwise, the measurement of the VHR is carried out as described in T. Jacob, U. Finkenzeller in "Merck Liquid Crystals—Physical Properties of Liquid Crystals", 1997.

Herein, unless explicitly stated otherwise, all concentrations are given in weight percent and relate to the respective complete mixture.

All temperatures are given in degrees centigrade (Celsius, ° C.) and all differences of temperatures in degrees centigrade. All physical properties and physicochemical or electro-optical parameters are determined by generally known methods, in particular according to "Merck Liquid Crystals, Physical Properties of Liquid Crystals", Status November 1997, Merck KGaA, Germany and are given for a temperature of 20° C., unless explicitly stated otherwise.

Above and below, Δn denotes the optical anisotropy, wherein Δn=$n_e$–$n_o$, and Δε denotes the dielectric anisotropy, wherein Δε=$ε_\parallel$–$ε_\perp$. The dielectric anisotropy Δε is determined at 20° C. and 1 kHz. The optical anisotropy Δn is determined at 20° C. and a wavelength of 589.3 nm.

The Δε and Δn values and the rotational viscosity ($γ_1$) of the compounds according to the invention are obtained by linear extrapolation from liquid-crystalline mixtures consisting of 5% to 10% of the respective compound according to the invention and 90% to 95% of the commercially available liquid-crystal mixtures ZLI-2857 or ZLI-4792 (both mixtures from Merck KGaA).

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

| | |
|---|---|
| C | (cyclohexane) |
| P | (benzene) |
| D | (1,3-dioxane) |
| A | (tetrahydropyran) |
| G | (fluorobenzene) |
| U | (difluorobenzene) |

TABLE A-continued

Ring elements

| | |
|---|---|
| Y | (difluorobenzene) |
| M | (pyrimidine) |
| N | (pyridine) |
| Np | (naphthalene) |
| DI | (1,3-dioxane) |
| AI | (tetrahydropyran) |
| GI | (fluorobenzene) |
| UI | (difluorobenzene) |
| MI | (pyrimidine) |
| NI | (pyridine) |
| dH | (decahydronaphthalene) |
| N3f | (trifluoronaphthalene) |

TABLE A-continued

Ring elements

| Code | Structure |
|---|---|
| tH | tetrahydronaphthalene (2,6-disubstituted) |
| tH2f | 3,4-difluoro-tetrahydronaphthalene |
| K | 4,7,7-trifluoro-2,5-disubstituted indane |
| L | cyclohexene (1,4-disubstituted) |
| F | 3-fluoro-cyclohexene |
| Nf | 3-fluoro-pyridine (2,5-disubstituted) |
| N3fl | 1,2,3-trifluoro-naphthalene |
| tHl | tetrahydronaphthalene |
| tH2fl | 1,2-difluoro-tetrahydronaphthalene |
| Kl | 4,4,7-trifluoro-indane |
| Ll | cyclohexene |
| Fl | 2-fluoro-cyclohexene |
| Nfl | 3-fluoro-pyridine |

TABLE B

Linking groups

| | | | |
|---|---|---|---|
| E | —CH$_2$CH$_2$— | Z | —CO—O— |
| V | —CH=CH— | Zl | —O—CO— |
| X | —CF=CH— | O | —CH$_2$—O— |
| Xl | —CH=CF— | Ol | —O—CH$_2$— |
| B | —CF=CF— | Q | —CF$_2$—O— |
| T | —C≡C— | Ql | —O—CF$_2$— |
| W | —CF$_2$CF$_2$— | | |

TABLE C

End groups

| Left-hand side | | Right-hand side | |
|---|---|---|---|
| Used alone | | | |
| -n- | C$_n$H$_{2n+1}$— | -n | —C$_n$H$_{2n+1}$ |
| -nO- | C$_n$H$_{2n+1}$—O— | -On | —O—C$_n$H$_{2n+1}$ |
| —V— | CH$_2$=CH— | —V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| —N— | N≡C— | —N | —C≡N |
| —S— | S=C=N— | —S | —N=C=S |
| —F— | F— | —F | —F |
| —Cl— | Cl— | —Cl | —Cl |
| -M- | CFH$_2$— | -M | —CFH$_2$ |

TABLE C-continued

| End groups | | | |
|---|---|---|---|
| Left-hand side | | Right-hand side | |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -FXO- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Used together with one another and with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each denote integers, and the three dots "..." are place-holders for other abbreviations from this table.

The following table shows illustrative structures together with their respective abbreviations. These are shown in order to illustrate the meaning of the rules for the abbreviations. They furthermore represent compounds which may be preferably used.

TABLE D

Illustrative structures

C$_n$H$_{2n+1}$—⟨cyclohexyl⟩—⟨cyclohexyl⟩—C$_m$H$_{2m+1}$

CC-n-m

C$_n$H$_{2n+1}$—⟨cyclohexyl⟩—⟨cyclohexyl⟩—O—C$_m$H$_{2m+1}$

CC-n-Om

C$_n$H$_{2n+1}$—⟨cyclohexyl⟩—⟨cyclohexyl⟩—CH=CH$_2$

CC-n-V

C$_n$H$_{2n+1}$—⟨cyclohexyl⟩—⟨cyclohexyl⟩—CH=CH—C$_m$H$_{2m+1}$

CC-n-Vm

C$_n$H$_{2n+1}$—⟨cyclohexyl⟩—⟨cyclohexyl⟩—(CH$_2$)$_m$—CH=CH$_2$

CC-n-mV

C$_n$H$_{2n+1}$—⟨cyclohexyl⟩—⟨cyclohexyl⟩—(CH$_2$)$_m$—CH=CH—C$_l$H$_{2l+1}$

CC-n-mVl

TABLE D-continued
Illustrative structures
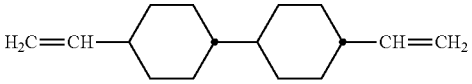
CC-V-V
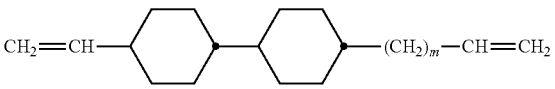
CC-V-mV
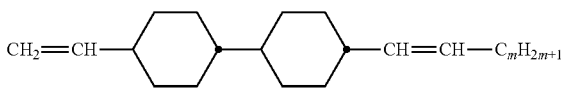
CC-V-Vm
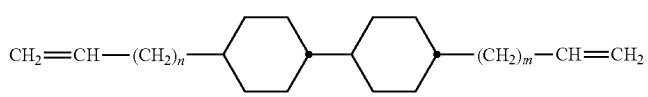
CC-Vn-mV
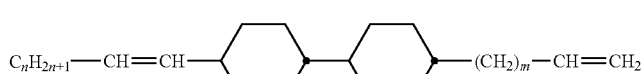
CC-nV-mV
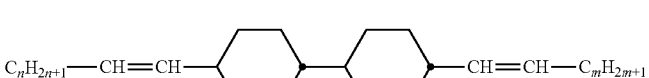
CC-nV-Vm
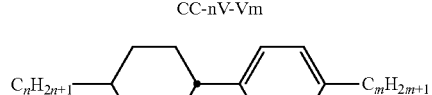
CP-n-m
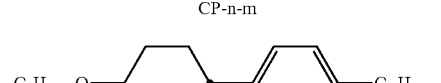
CP-nO-m
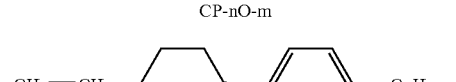
CP-V-m
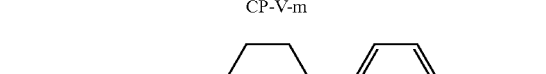
CP-Vn-m
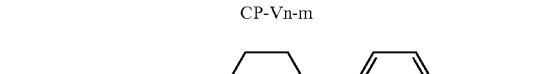
CP-nV-m TABLE D-continued
Illustrative structures
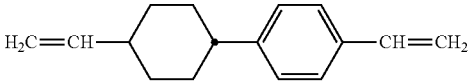
CP-V-V
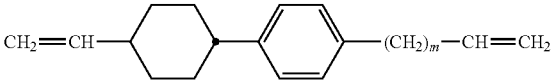
CP-V-mV
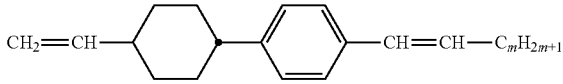
CP-V-Vm
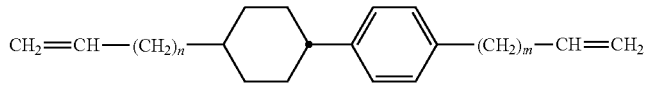
CP-Vn-mV
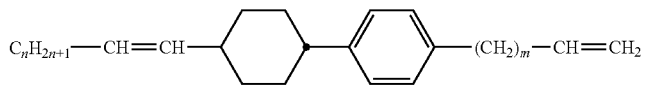
CP-nV-mV
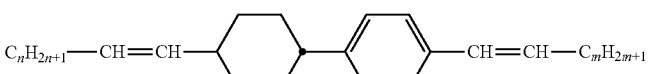
CP-nV-Vm
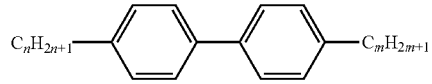
PP-n-m
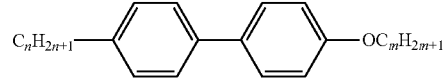
PP-n-Om
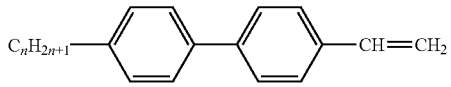
PP-n-V
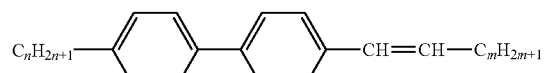
PP-n-Vm
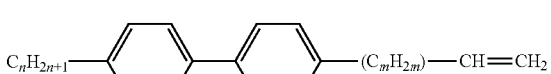
PP-n-mV TABLE D-continued
Illustrative structures
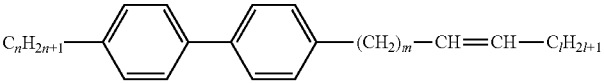
PP-n-mVI
CCP-n-m
CCP-nO-m
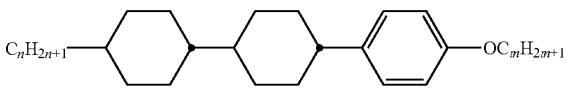
CCP-n-Om
CCP-n-V
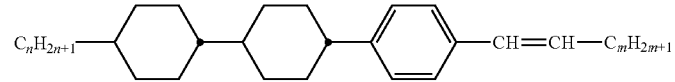
CCP-n-Vm
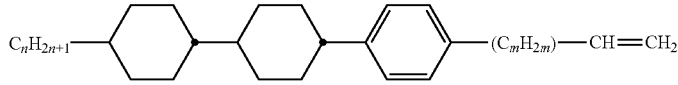
CCP-n-mV
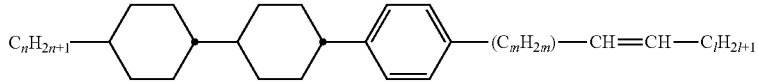
CCP-n-mVI
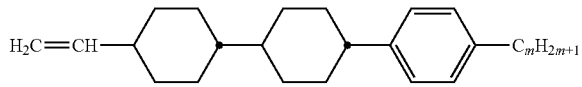
CCP-V-m
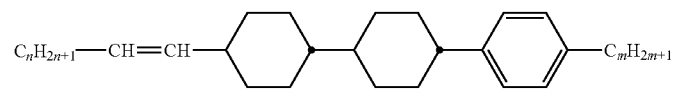
CCP-nV-m
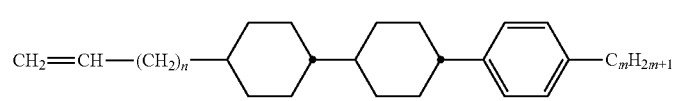
CCP-Vn-m TABLE D-continued
Illustrative structures
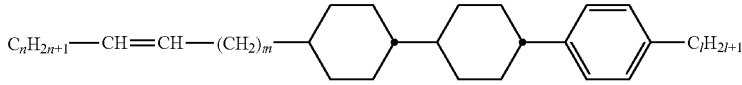
CCP-nVm-I
CPP-n-m
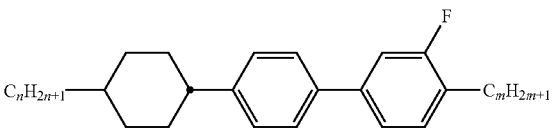
CPG-n-m
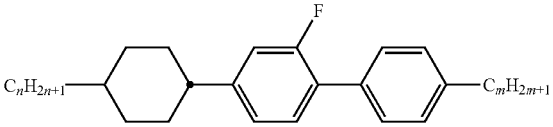
CGP-n-m
CPP-nO-m
CPP-n-Om
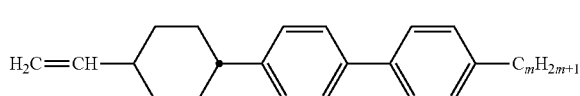
CPP-V-m
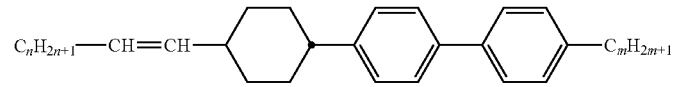
CPP-nV-m
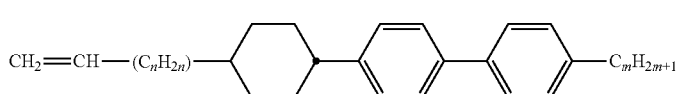
CPP-Vn-m
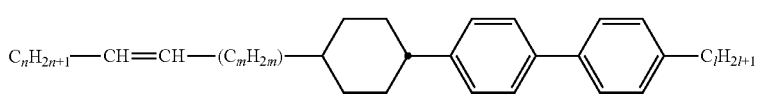
CPP-nVm-I TABLE D-continued Illustrative structures PGP-n-m PGP-n-V PGP-n-Vm PGP-n-mV PGP-n-mVl CCEC-n-m CCEC-n-Om CCEP-n-m CCEP-n-Om CPPC-n-m TABLE D-continued
Illustrative structures
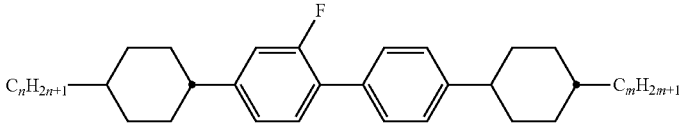
CGPC-n-m
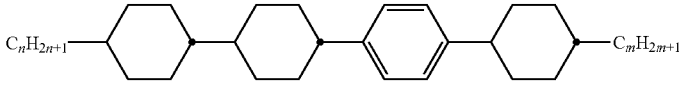
CCPC-n-m
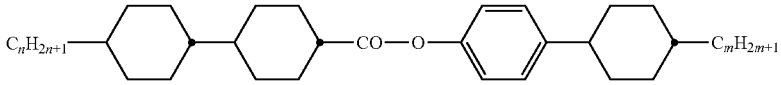
CCZPC-n-m
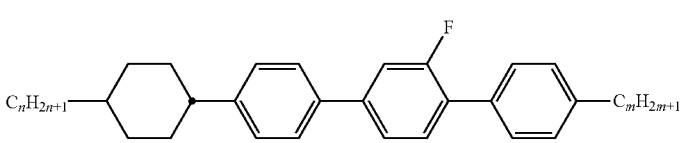
CPGP-n-m
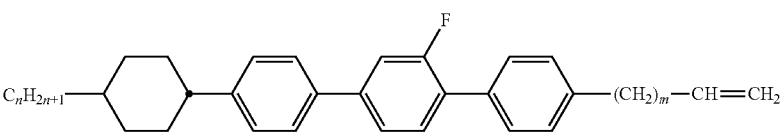
CPGP-n-mV
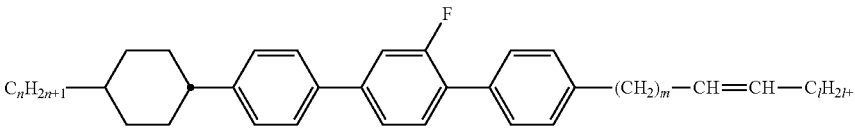
CPGP-n-mVI
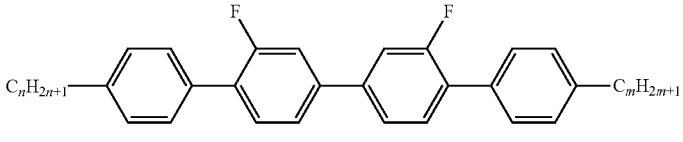
PGIGP-n-m
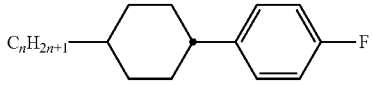
CP-n-F
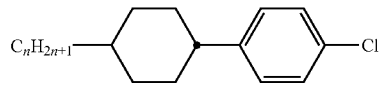
CP-n-Cl TABLE D-continued
Illustrative structures
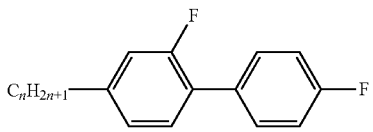
GP-n-F
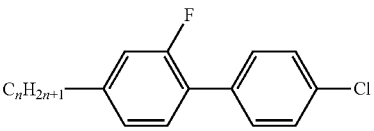
GP-n-Cl
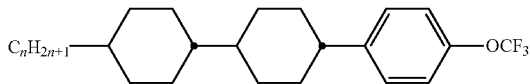
CCP-n-OT
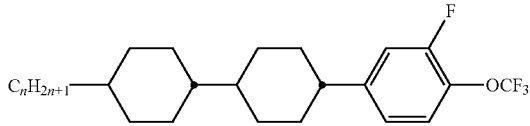
CCG-n-OT
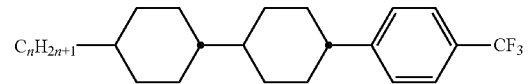
CCP-n-T
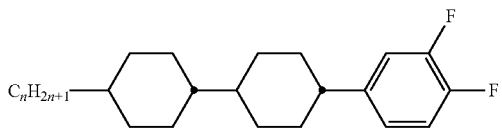
CCG-n-F
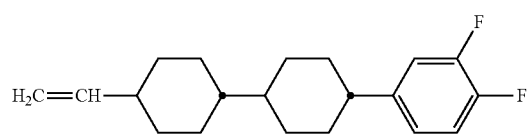
CCG-V-F
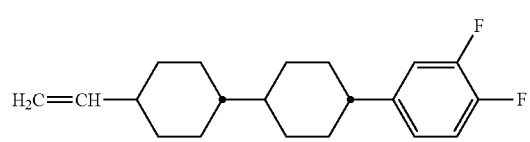
CCG-V-F
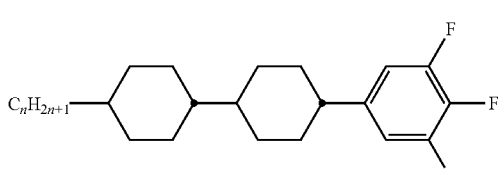
CCU-n-F TABLE D-continued
Illustrative structures
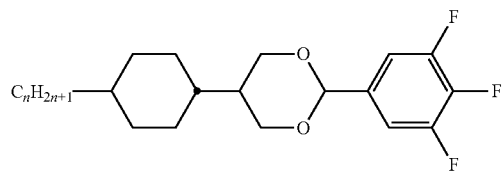
CDU-n-F
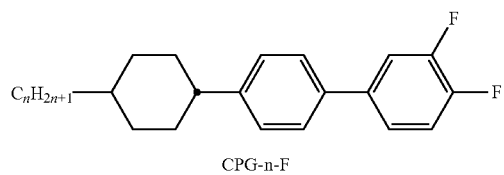
CPG-n-F
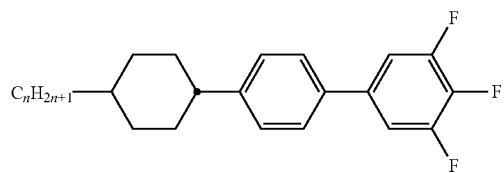
CPU-n-F
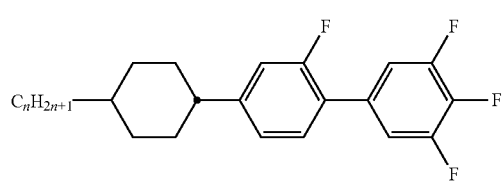
CGU-n-F
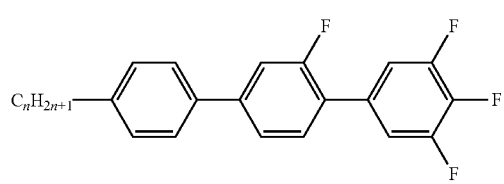
PGU-n-F
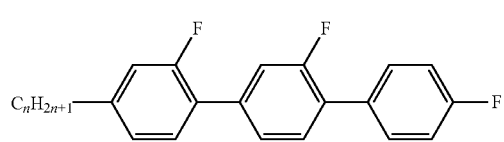
GGP-n-F
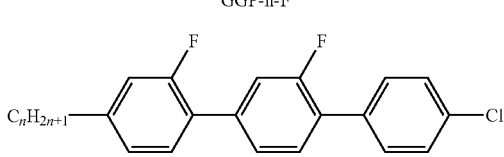
GGP-n-Cl
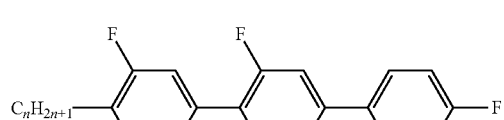
GIGIP-n-F TABLE D-continued
Illustrative structures
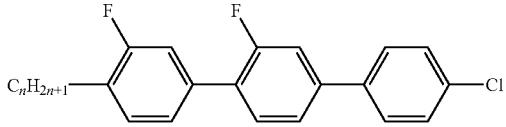
GIGIP-n-Cl
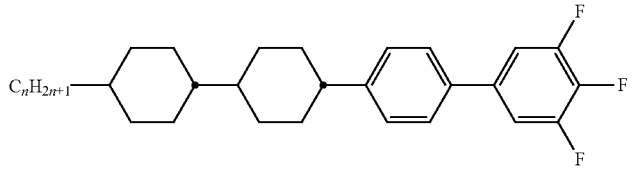
CCPU-n-F
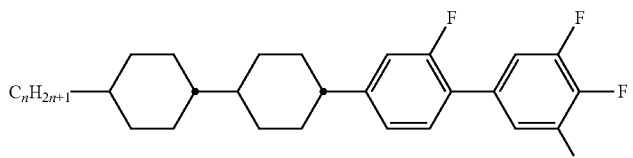
CCGU-n-F
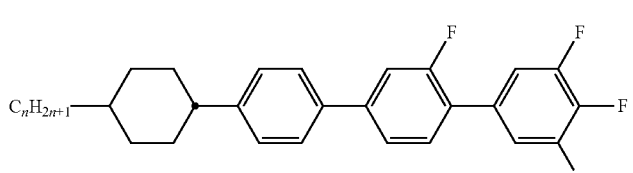
CPGU-n-F
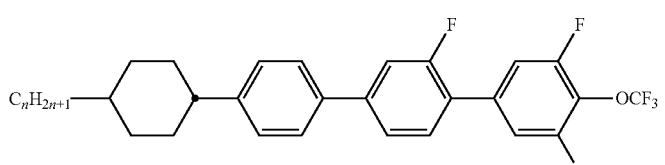
CPGU-n-OT
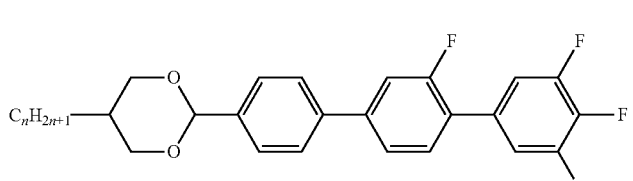
DPGU-n-F
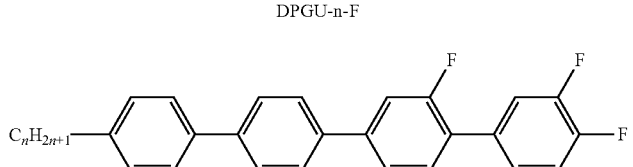
PPGU-n-F TABLE D-continued
Illustrative structures
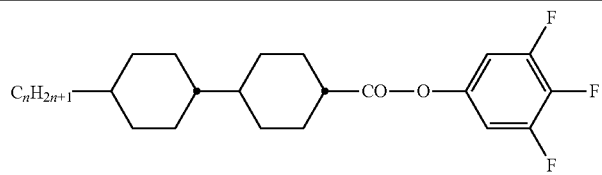
CCZU-n-F
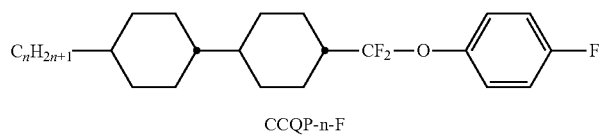
CCQP-n-F
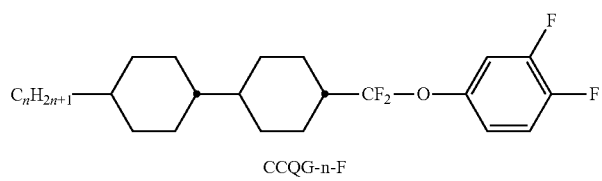
CCQG-n-F
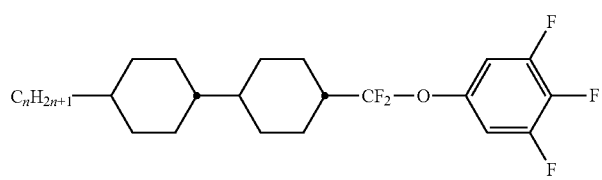
CCQU-n-F
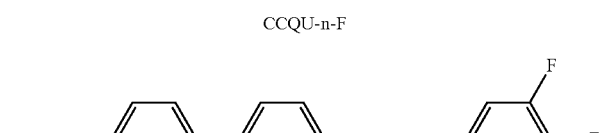
PPQG-n-F
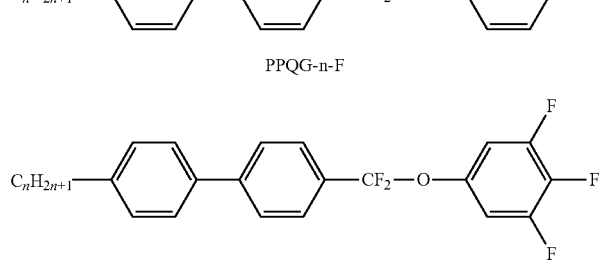
PPQU-n-F
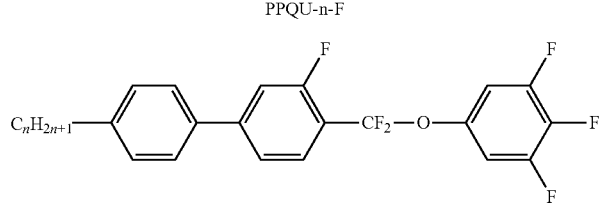
PGQU-n-F
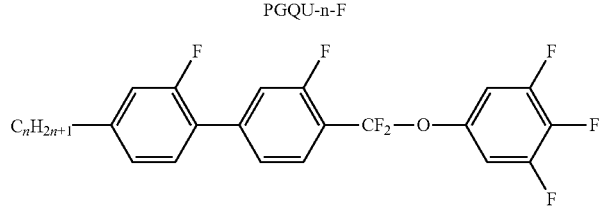
GGQU-n-F TABLE D-continued
Illustrative structures
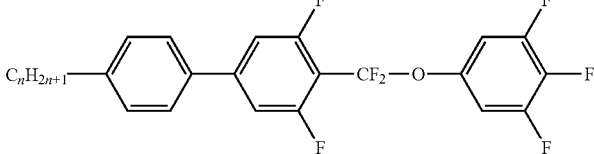
PUQU-n-F
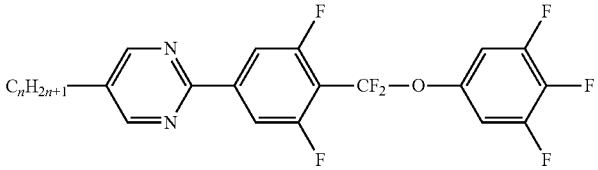
MUQU-n-F
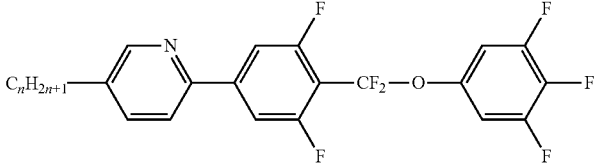
NUQU-n-F
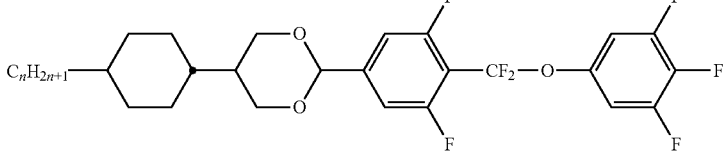
CDUQU-n-F
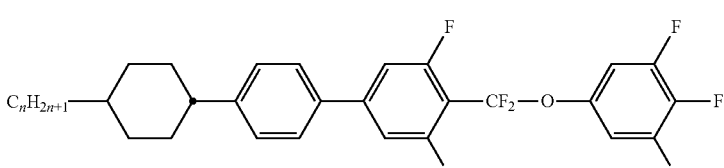
CPUQU-n-F
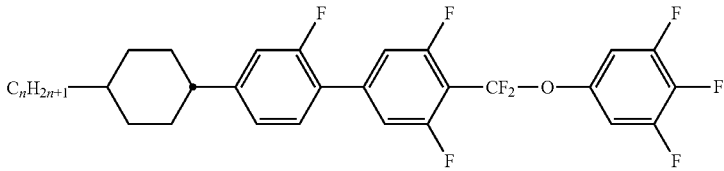
CGUQU-n-F
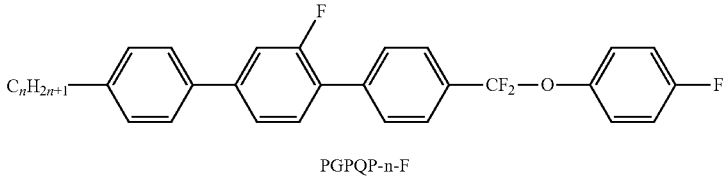
PGPQP-n-F TABLE D-continued
Illustrative structures
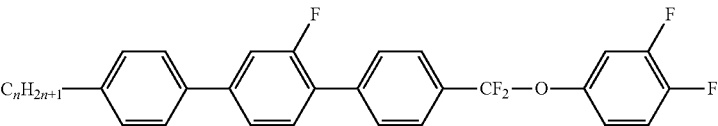
PGPQG-n-F
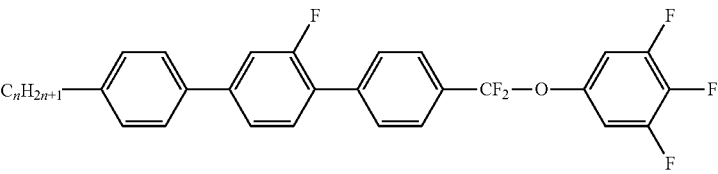
PGPQU-n-F
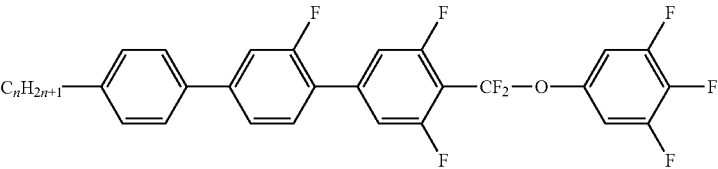
PGUQU-n-F
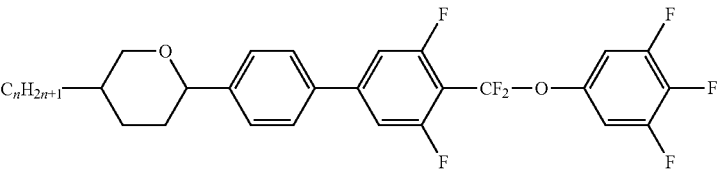
APUQU-n-F
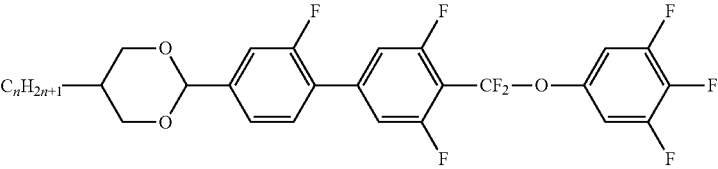
DGUQU-n-F
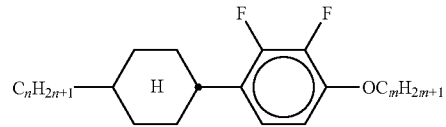
CY-n-Om
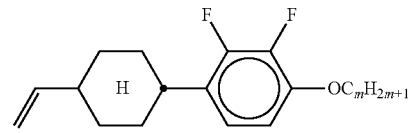
CY-V-Om
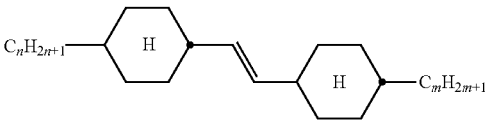
CVC-n-m TABLE D-continued
Illustrative structures
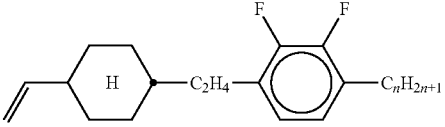
CEY-V-m
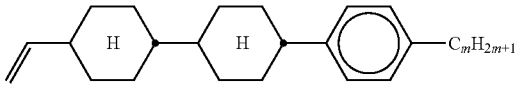
CCP-V-m
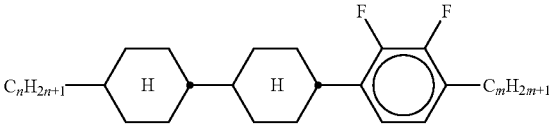
CCY-n-m
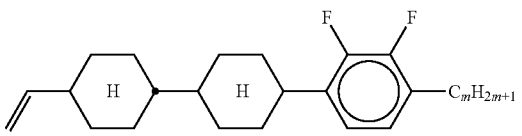
CCY-V-m
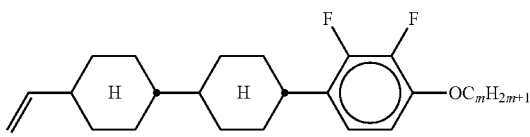
CCY-V-Om
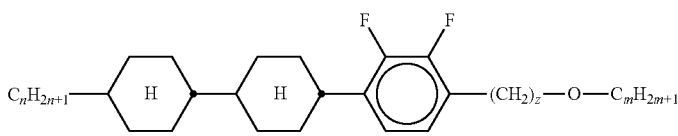
CCY-n-zOm
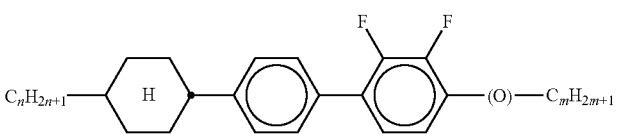
CPY-n-(O)m
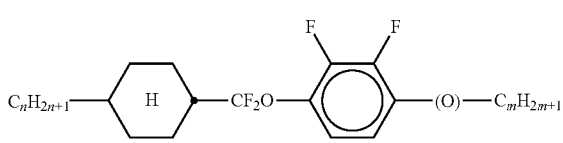
CQY-n-(O)m
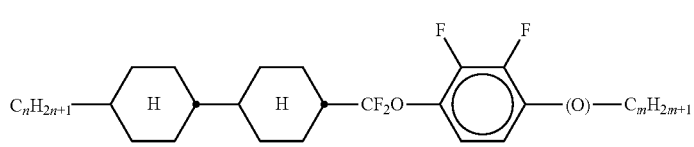
CCQY-n-(O)m TABLE D-continued
Illustrative structures
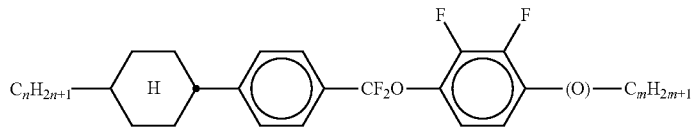
CPQY-n-(O)m
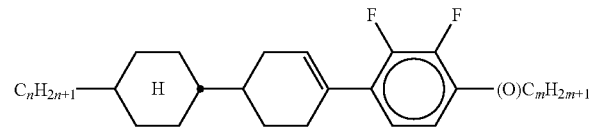
CLY-n-(O)m
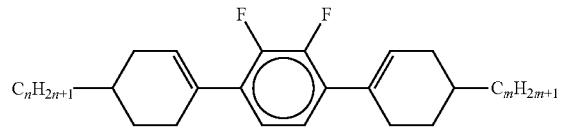
LYLI-n-m
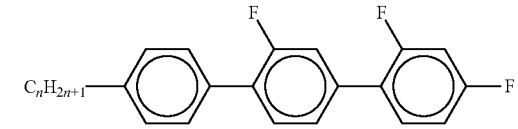
PGIGI-n-F
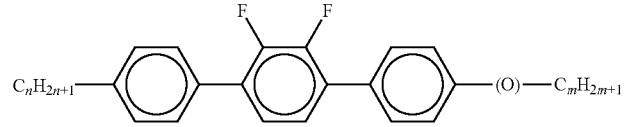
PYP-n-(O)m
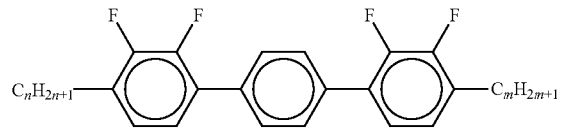
YPY-n-m
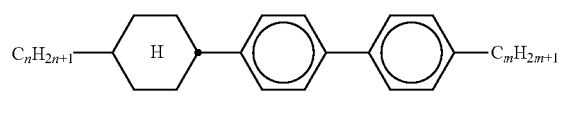
CPP-n-m
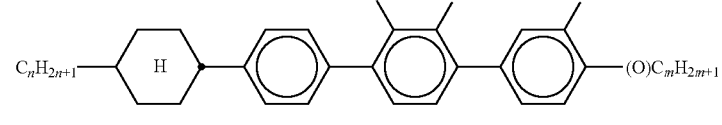
CPYP-n-(O)m
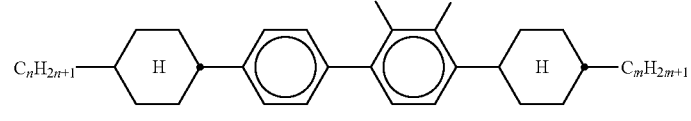
CPYC-n-m TABLE D-continued
Illustrative structures
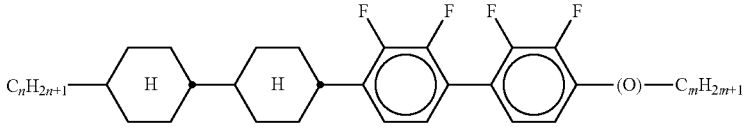
CCYY-n-m
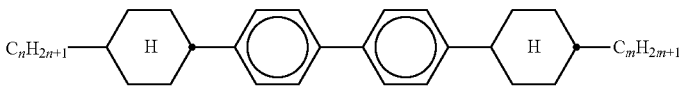
CPPC-n-m
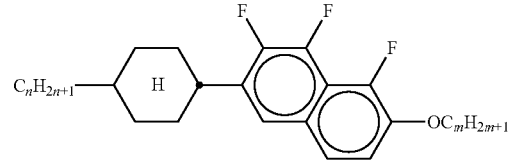
CNap-n-Om
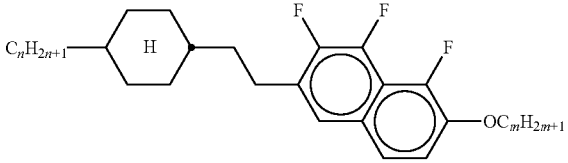
CENap-n-Om
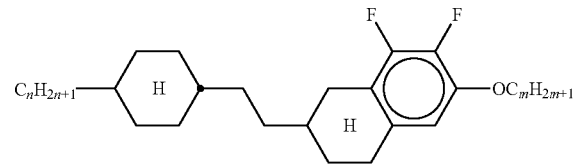
CETNap-n-Om
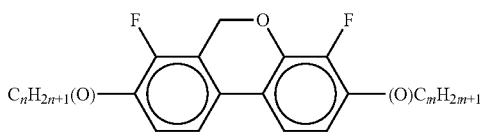
DFDBC-n(O)-(O)m
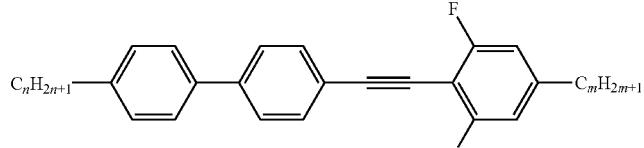
PPTUI-n-m
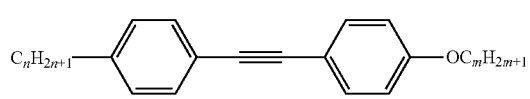
PTP-n-Om

TABLE D-continued
Illustrative structures
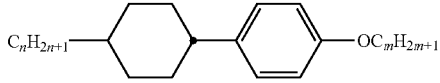
CP-n-Om
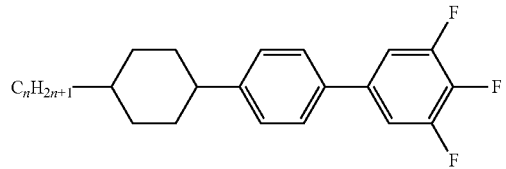
CPU-n-F
wherein n, m, l and z preferably, independently of one another, denote 1 to 7.
The following table shows illustrative compounds which can be used as additional stabilizers in the mesogenic media according to the present invention.
TABLE E
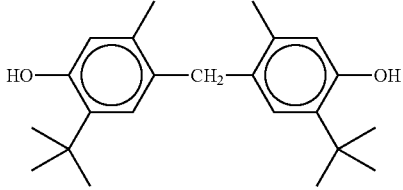
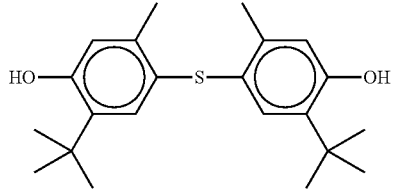
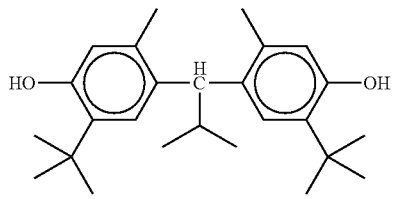
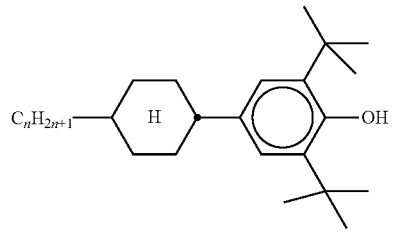

TABLE E-continued
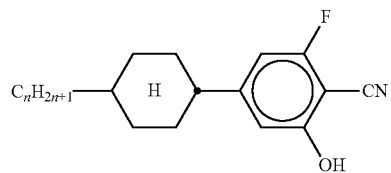
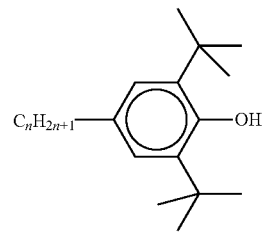
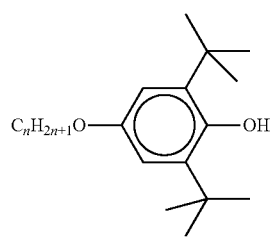
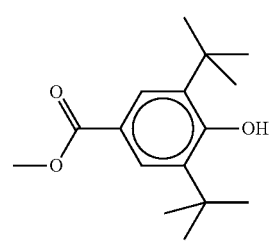
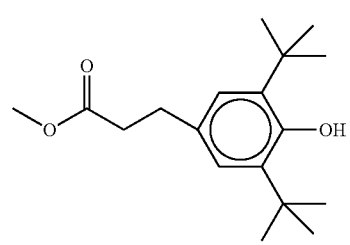
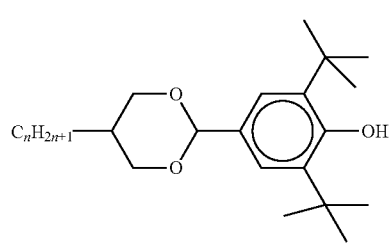
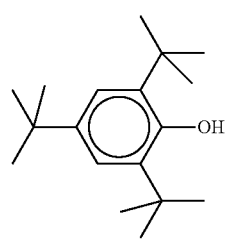

TABLE E-continued
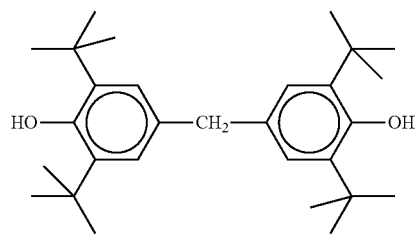
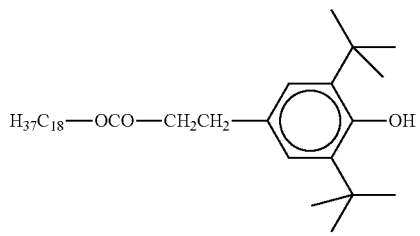
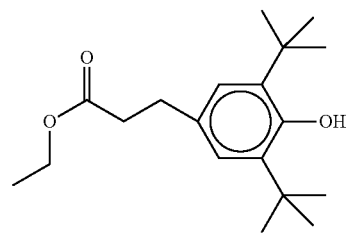
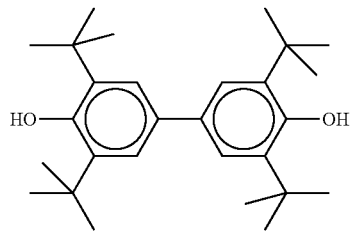
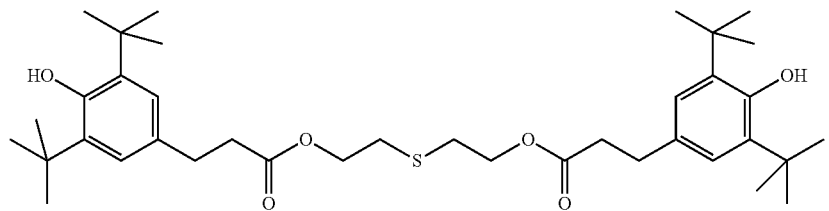 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
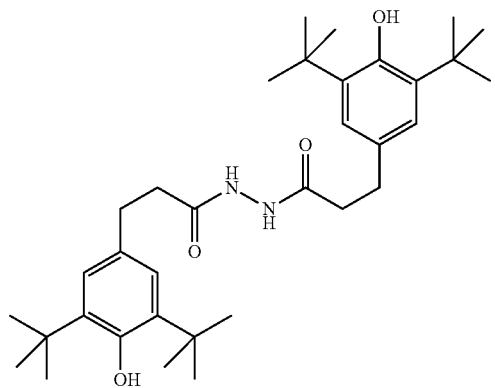 [SMILES: CC(C)(C)c1cc(CCC(=O)NNC(=O)CCc2cc(C(C)(C)C)c(O)c(C(C)(C)C)c2)cc(C(C)(C)C)c1O]

TABLE E-continued
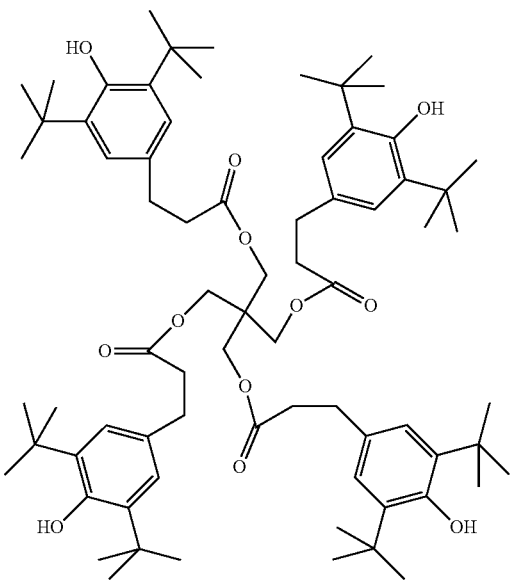 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
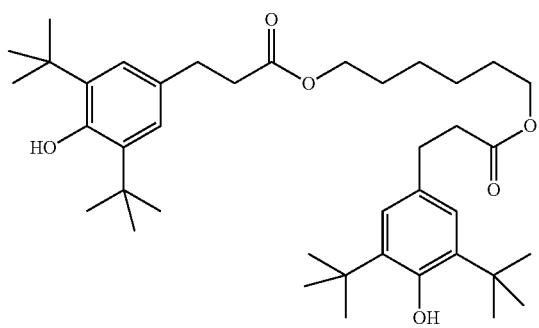 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
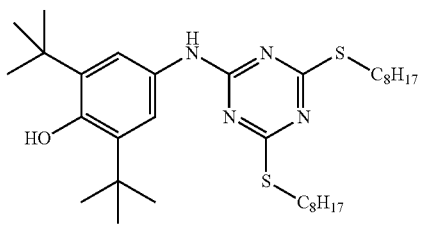
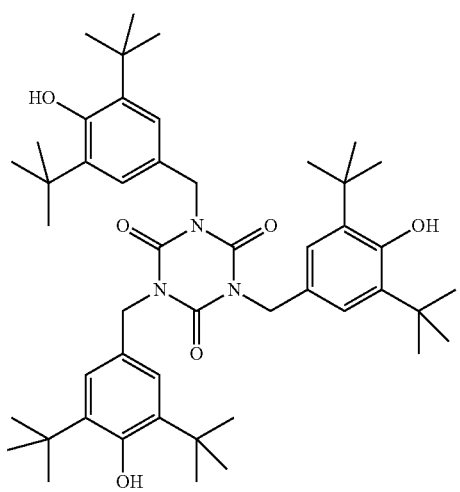 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE E-continued
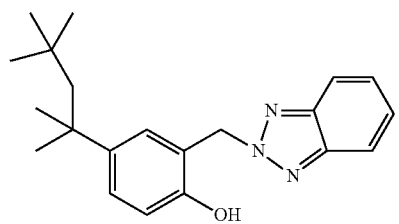 [SMILES: CC(C)(C)CC(C)(C)c1ccc(O)c(Cn2nc3ccccc3n2)c1]
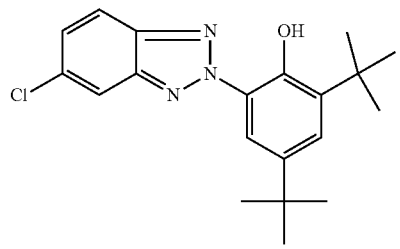 [SMILES: CC(C)(C)c1cc(-n2nc3ccc(Cl)cc3n2)c(O)c(C(C)(C)C)c1]
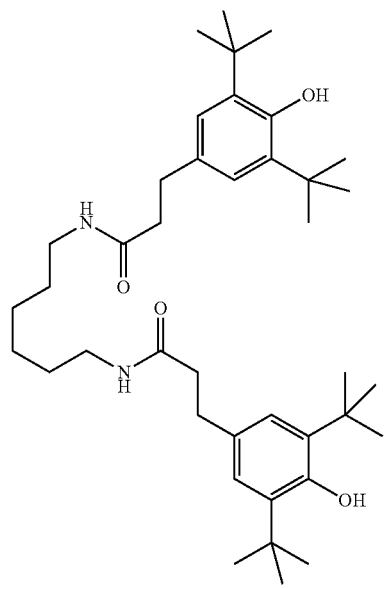 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
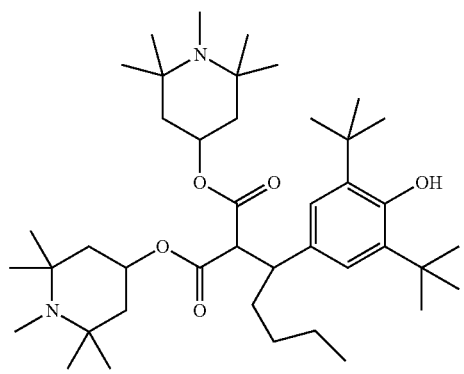 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
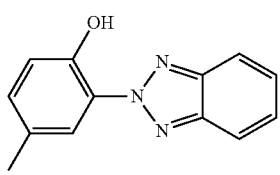 [SMILES: Cc1ccc(O)c(-n2nc3ccccc3n2)c1]

TABLE E-continued
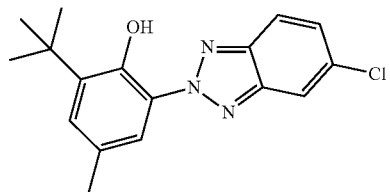 [SMILES: Cc1cc(-n2nc3ccc(Cl)cc3n2)c(O)c(C(C)(C)C)c1]
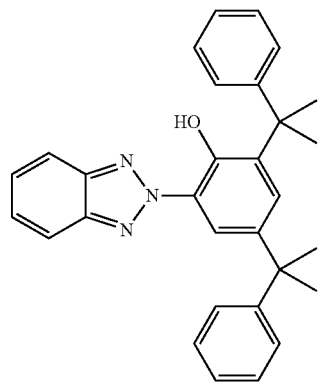 [SMILES: CC(C)(c1ccccc1)c1cc(-n2nc3ccccc3n2)c(O)c(C(C)(C)c2ccccc2)c1]
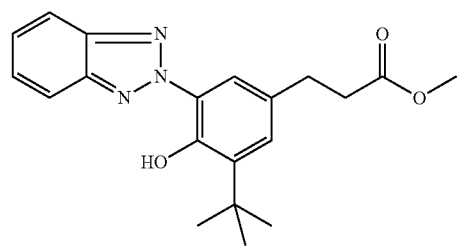 [SMILES: COC(=O)CCc1cc(-n2nc3ccccc3n2)c(O)c(C(C)(C)C)c1]
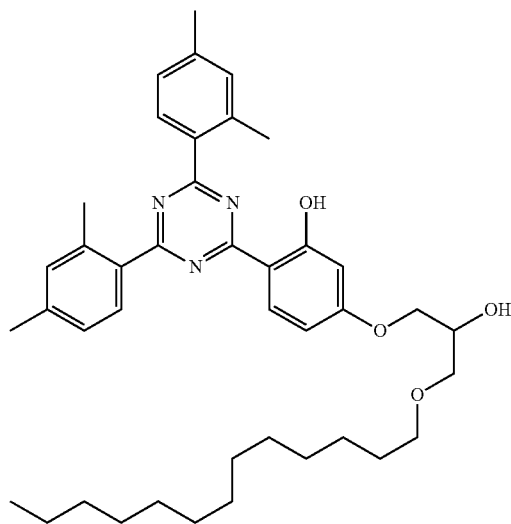 [SMILES: CCCCCCCCCCCCCOCC(O)COc1ccc(-c2nc(-c3ccc(C)cc3C)nc(-c3ccc(C)cc3C)n2)c(O)c1]
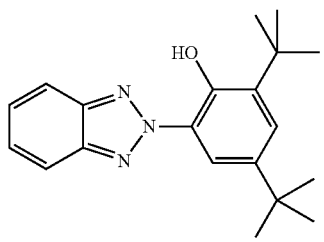 [SMILES: CC(C)(C)c1cc(-n2nc3ccccc3n2)c(O)c(C(C)(C)C)c1]

TABLE E-continued
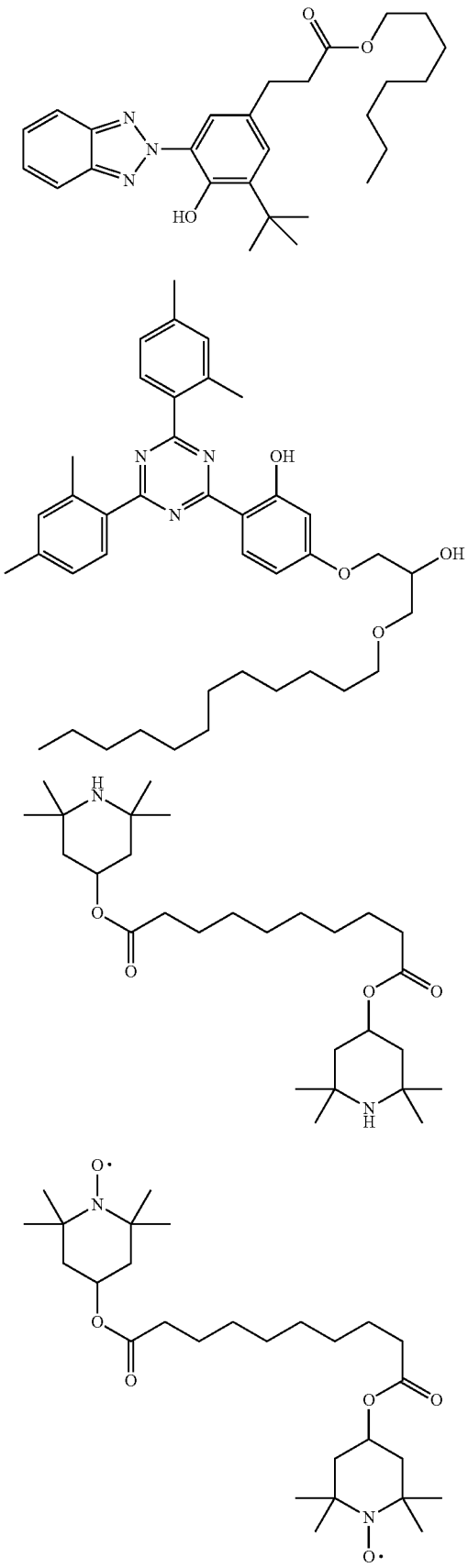

TABLE E-continued
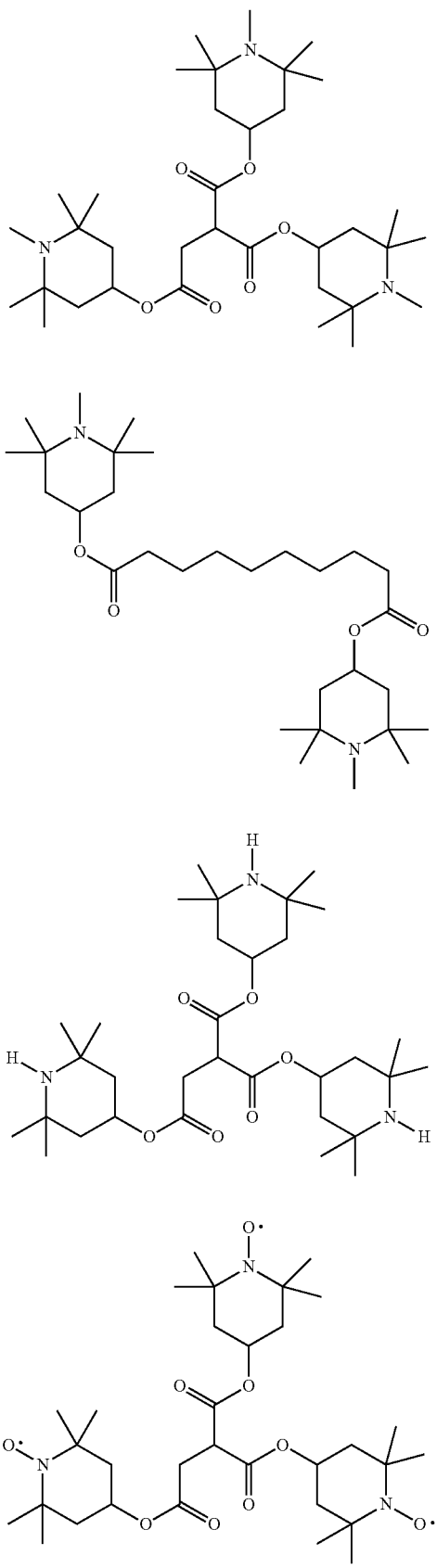

TABLE E-continued

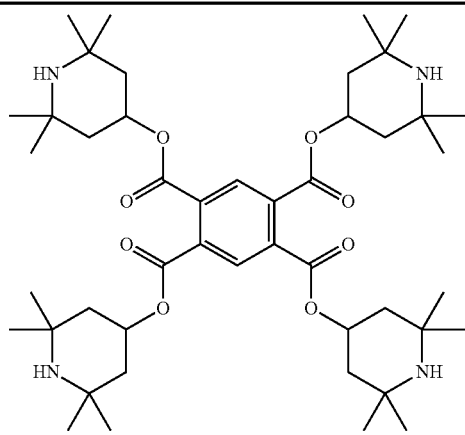

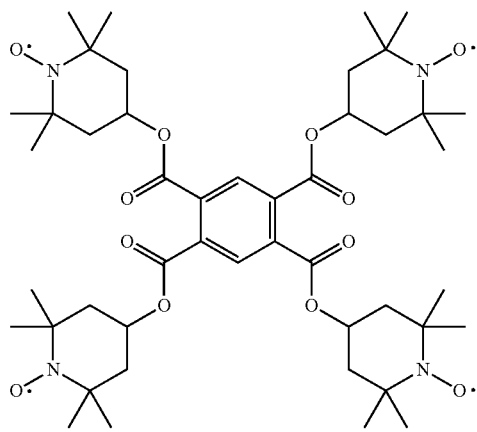

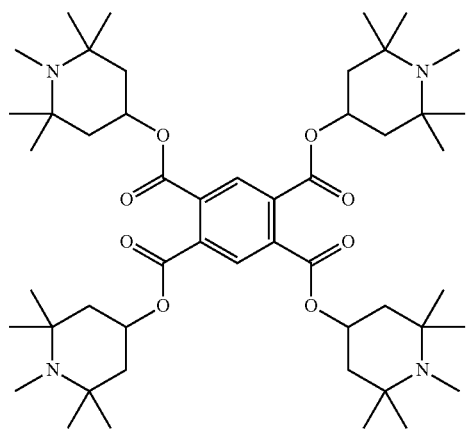

Table E shows possible stabilizers which can be added to the LC media according to the invention, wherein n denotes an integer from 1 to 12, preferably 1, 2, 3, 4, 5, 6, 7 or 8, more preferably 3 or 5.

The LC media preferably comprise 0 to 10% by weight, in particular 1 ppm to 5% by weight, particularly preferably 1 ppm to 1% by weight, of stabilizers.

Table F below shows illustrative compounds which can preferably be used as chiral dopants in the mesogenic media according to the present invention.

TABLE F
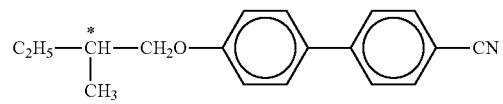
C 15
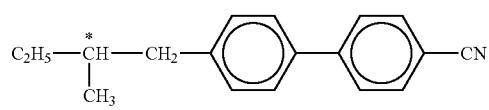
CB 15
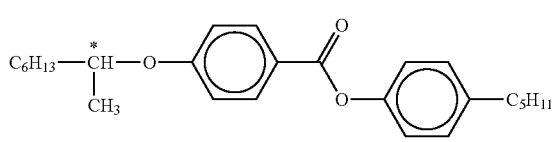
CM 21
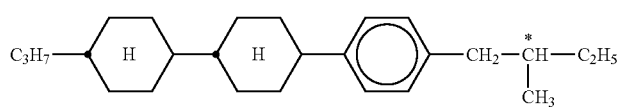
CM 44
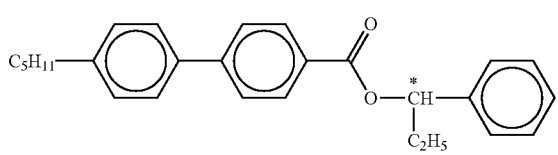
CM 45
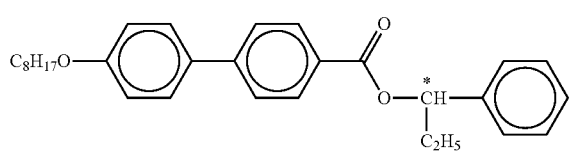
CM 47
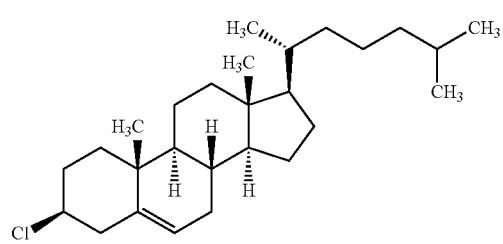
CC
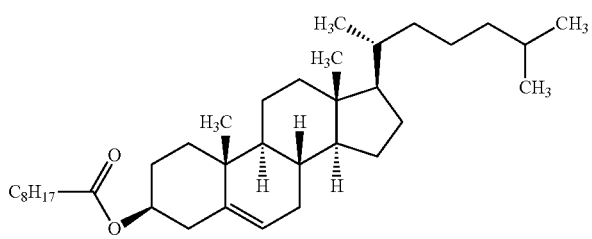
CN TABLE F-continued

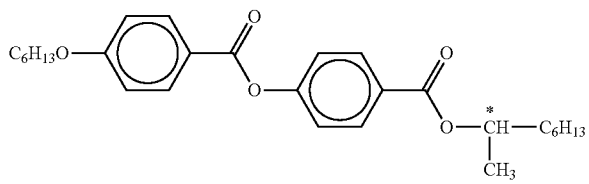

R/S-811

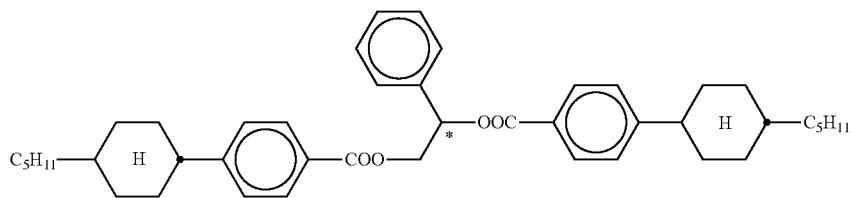

R/S-1011

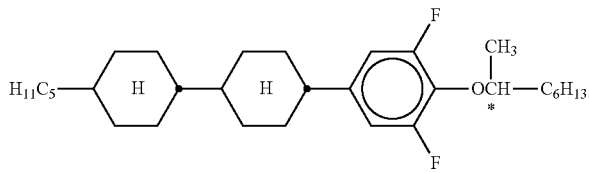

R/S-2011

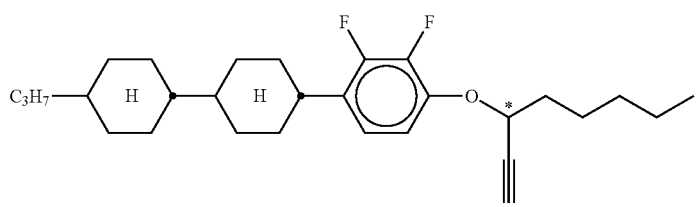

R/S-3011

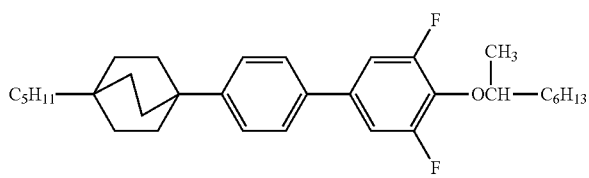

R/S-4011

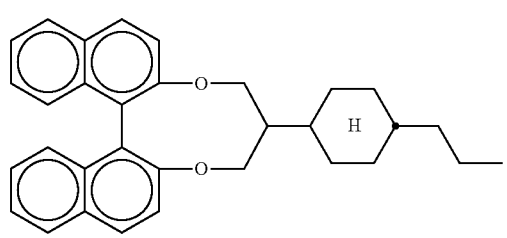

R/S-5011

In a preferred embodiment of the present invention, the mesogenic media comprise one or more compounds selected from the compounds shown in Table F.

The mesogenic media according to the present invention preferably comprise two or more, preferably four or more, compounds selected from the compounds shown in the above tables D to F.

The LC media according to the present invention preferably comprise three or more, more preferably five or more compounds shown in Table D.

The following examples are merely illustrative of the present invention and they should not be considered as limiting the scope of the invention in any way. The examples and modifications or other equivalents thereof will become apparent to those skilled in the art in the light of the present disclosure.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 17195020.7, filed Oct. 5, 2017, are incorporated by reference herein.

EXAMPLES

In the Examples, $V_o$ denotes threshold voltage, capacitive [V] at 20° C., $n_e$ denotes extraordinary refractive index at 20° C. and 589 nm, $n_o$ denotes ordinary refractive index at 20° C. and 589 nm, Δn denotes optical anisotropy at 20° C. and 589 nm, $\varepsilon_\parallel$ denotes dielectric permittivity parallel to the director at 20° C. and 1 kHz, $\varepsilon_\perp$ denotes dielectric permittivity perpendicular to the director at 20° C. and 1 kHz, Δε denotes dielectric anisotropy at 20° C. and 1 kHz, cl.p., T(N,I) denotes clearing point [° C.], $\gamma_1$ denotes rotational viscosity measured at 20° C. [mPa·s], determined by the rotation method in a magnetic field, $K_1$ denotes elastic constant, "splay" deformation at 20° C. [pN], $K_2$ denotes elastic constant, "twist" deformation at 20° C. [pN], $K_3$ denotes elastic constant, "bend" deformation at 20° C. [pN], The term "threshold voltage" for the present invention relates to the capacitive threshold ($V_0$), unless explicitly indicated otherwise. In the Examples, as is generally usual, the optical threshold can also be indicated for 10% relative contrast ($V_{10}$), for 50% relative contrast ($V_{50}$), and for 90% relative contrast ($V_{90}$).

Preparation of Modified Polymer

Synthesis Example 1

The compound of interest is prepared according to the following Scheme:

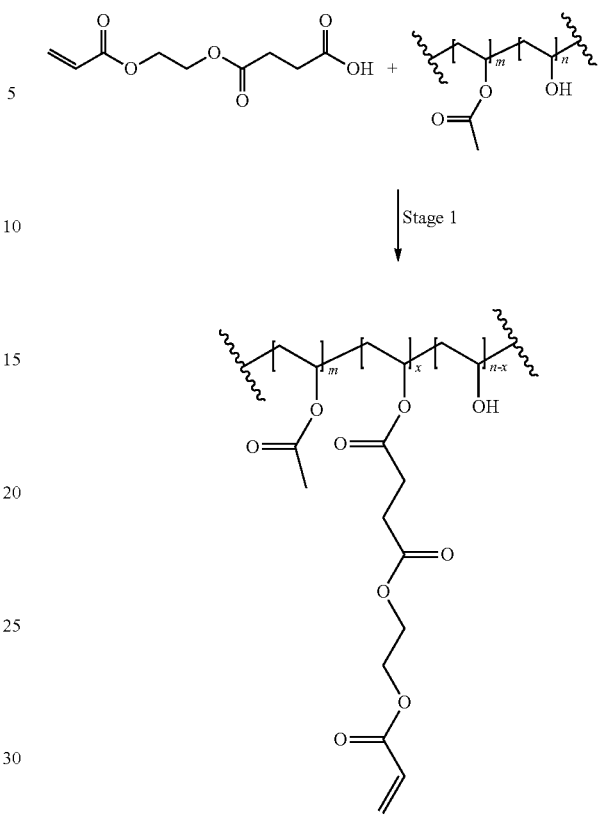

The compound is prepared based on a method known from the literature, see P. Martens, T. Holland, K. S. Anseth, Polymer 43 (2002), pp. 6093-6100. To a 40 ml anhydrous dichloromethane solution of the succinic acid mono-(2-acryloyloxy-ethyl) ester (3.59 ml; 20.43 mmol) N,N'-dicyclohexylcarbodiimide (2.11 g; 10.21 mmol) is slowly added, while cooling at ice bath. After stirring at room temperature for 1 h under nitrogen, the precipitate is filtered off. The filtrate is evaporated, and the residue is dissolved in anhydrous DMSO (5 ml), and a solution of poly(vinyl alcohol) ($M_w$ 9,000-10,000, 80 mol % hydrolyzed) (9.00 g) in 50 ml dimethyl sulfoxide, which is prepared by heating at 60° C. for 1 h, is added at room temperature. Triethylamine (2.85 ml; 20.43 mmol) is added and the solution is stirred overnight at room temperature. The mixture is precipitated in 600 ml aceton:ether (1:1 ratio). The precipitate is collected and dried under reduced pressure overnight (8 g).

$^1$H NMR ($D_2O$): acrylate group; 6.37 ppm (d, J=17.8 Hz), 6.13 ppm (dd, J=11.5 Hz, J=17.8 Hz), 5.93 ppm (d, J=11.5 Hz)

Synthesis Example 2

The compound of interest is prepared according to the following Scheme:

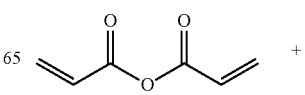

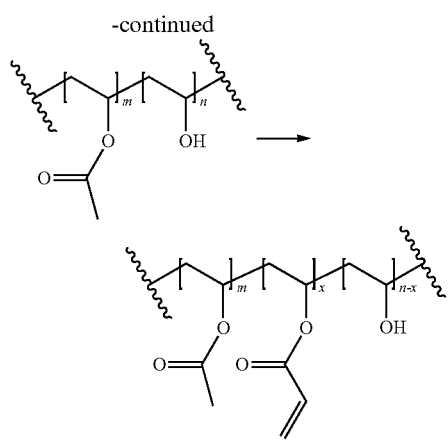

Anhydride of acrylic acid (1.47 g) is added to pre-dissolved Mowiol 4-88 (9.0 g) from Sigma-Aldrich (PVA, $M_w$~31,000 (in short 31 k), 88 mol % hydrolyzed) in 50 ml DMSO. The mixture is stirred overnight at room temperature. A filterable solid is obtained by adding to MeOH (300 ml), and precipitating is carried out by addition of ether (300 ml). The product is dried in vacuo at room temperature. 9.12 g of a yellow solid is obtained.

$^1$H NMR ($D_2O$): acrylate group; 6.36 ppm (d, J=17.6 Hz), 6.13 ppm (dd, J=10.69 Hz, J=17.6 Hz), 5.88 ppm (d, J=10.69 Hz)

Synthesis Example 3

The compound of interest is prepared according to the following Scheme:

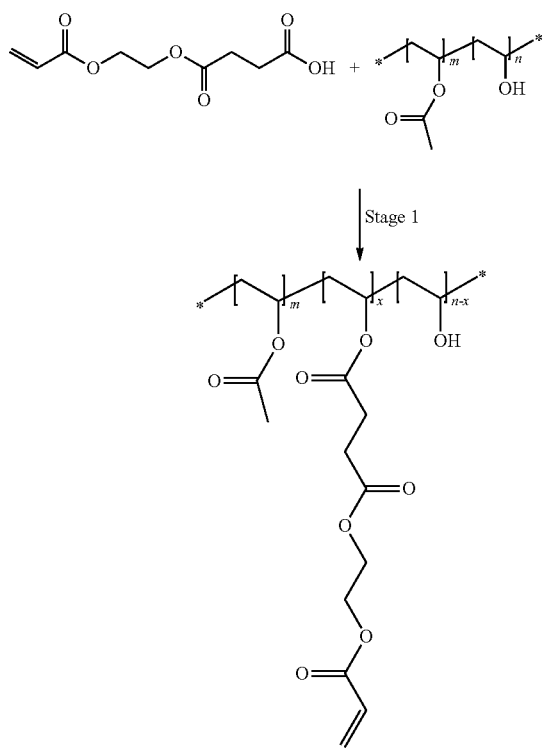

Anhydride of succinic acid mono(2-acyloyloxyethyl)ester (4.42 g) is added to pre-dissolved Mowiol 4-88 (9.0 g) from Sigma-Aldrich (PVA, $M_w$~31,000, 88 mol % hydrolyzed) in 50 ml DMSO. A filterable solid is obtained by adding to MeOH (300 ml), and precipitating is carried out by addition of ether (300 ml). The product is dried in vacuo at room temperature. 10.63 g of a solid is obtained.

$^1$H NMR ($D_2O$): acrylate group; 6.34 ppm (d, J=17.4 Hz), 6.09 ppm (dd, J=10.2 Hz, J=17.4 Hz), 5.88 ppm (d, J=10.2 Hz)

Synthesis Example 4

Anhydride of succinic acid mono(2-acyloyloxyethyl)ester (4.42 g) is added to pre-dissolved PVA (9.0 g) ($M_w$~9000-10000, 80 mol % hydrolyzed) in 50 ml DMSO. A filterable solid is obtained by adding to MeOH (300 ml), and precipitating is carried out by adding the reaction mixture to 375 ml of methanol:ether (1:2 ratio). The product is dried in vacuo at room temperature. 7.94 g of a solid is obtained.

$^1$H NMR ($D_2O$): acrylate group; 6.35 ppm (d, J=17.4 Hz), 6.08 ppm (dd, J=10.2 Hz, J=17.4 Hz), 5.89 ppm (d, J=10.2 Hz)

Synthesis Example 5

4.5 g of PVA ($M_w$~9,000-10,000, 80 mol % hydrolyzed) is solubilized in 35 ml DMSO. The solution is added to 4.42 g of anhydride of mono (2-acyloyloxylethyl) succinate). The mixture is then stirred for 2 days. Methanol (40 ml) is added. Then ether (100 ml) is added slowly with vigorous stirring to produce a gum. The supernatant liquors are decanted and the solid is washed with 2:1 ether:methanol. The solid is redigested into DMSO (30 ml) over 5 minutes, then ether (100 ml) is added. The supernatant liquors are decanted and the residual solid is redissolved in methanol (20 ml) over 5 minutes. Ether (50 ml) is added. The supernatant liquors are decanted, washed with ether, then dried in vacuo at room temperature to give a pale yellow solid (6.13 g).

$^1$H NMR ($D_2O$): acrylate group; 6.38 ppm (d, J=17.4 Hz), 6.11 ppm (dd, J=11.5 Hz, J=17.4 Hz), 5.91 ppm (d, J=11.5 Hz)

Synthesis Example 6

4.5 g of Mowiol 4-88 from Sigma-Aldrich (PVA, $M_w$~31,000, 88 mol % hydrolyzed) is solubilized in 35 ml DMSO. The solution is added to 4.42 g of anhydride of mono (2-acyloyloxylethyl) succinate). The mixture is stirred for 2 days. Methanol (40 ml) is added, then ether (100 ml) is added slowly with vigorous stirring to produce a solid. The crude product is partially redigested into methanol (50 ml) over 20 minutes forming a gelatinous slurry. Ether (60 ml) is added to give a cream-coloured particulate solid. The solid is filtered, washed with 1:1 methanol:ether and then ether to yield the product (5.08 g) as a tan-coloured solid after drying in vacuo at room temperature.

$^1$H NMR ($D_2O$): acrylate group; 6.35 ppm (d, J=17.6 Hz), 6.12 ppm (dd, J=11.4 Hz, J=17.6 Hz), 5.91 ppm (d, J=11.4 Hz)

Preparation of Nanocapsules

Reference Example 1

A liquid-crystal mixture B-1 is prepared and characterized with respect to its general physical properties, having the composition and properties as indicated in the following table.

| Base Mixture B-1 | | | |
|---|---|---|---|
| CPGP-5-2 | 5.00% | Clearing point [° C.]: | 102.0 |
| CPGP-5-3 | 5.00% | Δn: | 0.249 |
| PGUQU-3-F | 6.00% | $n_e$: | 1.761 |
| PGUQU-5-F | 8.00% | Δε: | 14.2 |
| PGU-3-F | 8.00% | $\varepsilon_\parallel$: | 18.3 |
| PUQU-3-F | 17.00% | $K_1$ [pN]: | 16.8 |
| CP-3-O1 | 10.00% | $K_3$ [pN]: | 16.8 |
| PGIGI-3-F | 6.00% | $\gamma_1$ [mPa · s]: | 282 |
| PPTUI-3-2 | 10.00% | $V_0$ [V]: | 1.13 |
| PPTUI-3-4 | 15.00% | | |
| PTP-1-O2 | 5.00% | | |
| PTP-2-O1 | 5.00% | | |
| Σ 100.00% | | | |

LC mixture B-1 (1.00 g), hexadecane (175 mg), methyl methacrylate (100 mg), hydroxyethyl methacrylate (40 mg) and ethylene glycol dimethacrylate (300 mg) are weighed into a 250 ml tall beaker.

Brij® L23 (50 mg) (from Sigma Aldrich) is weighed into a 250 ml conical flask and water (150 g) is added. This mixture is then sonicated in an ultrasound bath for 10 minutes.

The Brij® L23 aqueous surfactant solution is poured directly into the beaker containing the organics. The mixture is turrax mixed for 5 minutes at 10,000 rpm. Once turrax mixing is complete, the crude emulsion is passed through a high-pressure homogenizer at 30,000 psi four times.

The mixture is charged into a flask and fitted with a condenser, and after adding AIBN (35 mg) is heated to 70° C. for three hours. The reaction mixture is cooled, filtered, and then size analysis of the material is carried out on a Zetasizer (Malvern Zetasizer Nano ZS) instrument.

The obtained capsules have an average size of 213 nm, as determined by dynamic light scattering (DLS) analysis (Zetasizer).

The particle suspension is then concentrated by centrifugation, wherein the centrifuge tube is placed in a centrifuge (ThermoFisher Biofuge Stratos) and centrifuged at 6,500 rpm for 10 minutes and then at 15,000 rpm for 20 minutes. The resulting pellet is redispersed in 1 ml of the supernatant.

Reference Example 2

A liquid-crystal mixture B-2 is prepared and characterized with respect to its general physical properties, having the composition and properties as indicated in the following table.

| Base Mixture B-2 | | | |
|---|---|---|---|
| APUQU-3-F | 8.00% | Clearing point [° C.]: | 128 |
| CPU-3-F | 15.00% | Δn: | 0.206 |
| CCGU-3-F | 8.00% | $n_e$: | 1.711 |
| CPGP-5-2 | 4.00% | Δε: | 42.7 |
| CPGP-5-3 | 4.00% | $\varepsilon_\parallel$: | 48.2 |
| CPGU-3-OT | 8.00% | | |
| DPGU-4-F | 4.00% | | |
| PGU-2-F | 10.00% | | |
| PGU-3-F | 11.00% | | |
| PGUQU-3-F | 8.00% | | |
| PGUQU-4-F | 10.00% | | |
| PGUQU-5-F | 10.00% | | |
| Σ 100.00% | | | |

LC mixture B-2 (1.0 g), ethylene dimethacrylate (0.34 g), 2-hydroxy ethylmethacrylate (0.07 g) and hexadecane (0.25 g) are weighed into a 250 ml tall beaker.

This mixture is treated and investigated as described above in Reference Example 1.

Reference Example 3

A liquid-crystal mixture B-3 is prepared and characterized with respect to its general physical properties, having the composition and properties as indicated in the following table.

| Base Mixture B-3 | | | |
|---|---|---|---|
| DGUQU-4-F | 3.00% | Clearing point [° C.]: | 85.5 |
| DPGU-4-F | 2.00% | Δn: | 0.208 |
| PGUQU-3-F | 8.00% | $n_e$: | 1.705 |
| PGUQU-4-F | 9.00% | Δε: | 24.0 |
| PGUQU-5-F | 10.00% | $\varepsilon_\parallel$: | 28.4 |
| PGU-3-F | 5.00% | | |
| PPTUI-3-2 | 11.00% | | |
| PPTUI-3-4 | 15.00% | | |
| PUQU-3-F | 13.00% | | |
| CC-3-O1 | 15.00% | | |
| CP-3-O1 | 9.00% | | |
| Σ 100.00% | | | |

LC mixture B-3 (2.00 g), methyl methacrylate (165 mg), hydroxyethyl methacrylate (75 mg) and ethylene glycol dimethacrylate (660 mg) are weighed into a 250 ml tall beaker.

Brij® L23 (150 mg) is weighed into a 250 ml conical flask and water (150 g) is added. This mixture is then sonicated for 5 to 10 minutes.

The Brij® L23 aqueous surfactant solution is poured directly into the beaker containing the organics. The mixture is turrax mixed for 5 minutes at 10,000 rpm. Once turrax mixing is complete, the crude emulsion is passed through a high-pressure homogenizer at 30,000 psi four times.

The mixture is charged into a flask and fitted with a condenser, and after adding AIBN (35 mg) is heated to 70° C. for three hours. The reaction mixture is cooled, filtered, and then size analysis of the material is carried out on a Zetasizer (Malvern Zetasizer Nano ZS) instrument.

The obtained capsules have an average size of 167 nm, as determined by dynamic light scattering (DLS) analysis (Zetasizer).

The particle suspension is then concentrated by centrifugation, wherein the centrifuge tube is placed in a centrifuge (ThermoFisher Biofuge Stratos) and centrifuged at 6,500 rpm for 10 minutes and at 15,000 rpm for 20 minutes. The resulting pellet is redispersed in 0.7 ml of the supernatant.

Reference Example 4

A liquid-crystal mixture B-4 is prepared and characterized with respect to its general physical properties, having the composition and properties as indicated in the following table.

| Base Mixture B-4 | | | |
|---|---|---|---|
| CPGP-5-2 | 3.00% | Clearing point [° C.]: | 98.5 |
| PUQU-3-F | 15.00% | Δn: | 0.252 |
| PGUQU-3-F | 6.00% | $n_e$: | 1.76 |
| PGU-3-F | 8.00% | Δε: | 19.8 |
| PGUQU-5-F | 8.00% | $\varepsilon_\parallel$: | 24.0 |
| CP-3-O1 | 15.00% | | |
| PPTUI-3-2 | 15.00% | | |

-continued

| Base Mixture B-4 | |
| --- | --- |
| PPTUI-3-4 | 20.00% |
| PTP-1-O2 | 5.00% |
| GUUQU-3-N | 5.00% |
| Σ | 100.00% |

LC mixture B-4 (2.00 g), hexadecane (100 mg), methyl methacrylate (100 mg), hydroxyethyl methacrylate (130 mg) and ethylene glycol dimethacrylate (198 mg) are weighed into a 250 ml tall beaker.

Brij® L23 (300 mg) is weighed into a 250 ml conical flask and water (100 g) is added. This mixture is then sonicated for 5 to 10 minutes.

The Brij® L23 aqueous surfactant solution is poured directly into the beaker containing the organics. The mixture is turrax mixed for 5 minutes at 10,000 rpm. Once turrax mixing is complete, the crude emulsion is passed through a high-pressure homogenizer at 30,000 psi four times.

The mixture is charged into a flask and fitted with a condenser, and after adding AIBA (20 mg) is heated to 70° C. for three hours. The reaction mixture is cooled, filtered, and then size analysis of the material is carried out on a Zetasizer (Malvern Zetasizer Nano ZS) instrument.

The obtained capsules have an average size of 129 nm, as determined by dynamic light scattering (DLS) analysis (Zetasizer).

Preparation of Binder

Comparative Example 1

Preparation of a 30% Solid Content PVA Binder

The PVA (molecular weight $M_w$ of PVA: 31 k; 88% hydrolysed) is first washed to remove ions in a Soxhlet apparatus for 3 days.

Deionized water (46.66 g) is added to a 150 ml bottle, a large magnetic stirrer bar is added and the bottle is placed on a 50° C. stirrer hotplate and allowed to come to temperature. 20.00 g of the solid washed 31 k PVA are weighed into a beaker. A vortex is created in the bottle and gradually the 31 k PVA is added over approximately 5 minutes, stopping to allow the floating PVA to disperse into the mixture. The hotplate is turned up to 90° C. and stirring is continued for 2-3 hours. The bottle is placed in oven at 80° C. for 20 hours. The mixture is filtered whilst still warm through a 50 μm cloth filter under an air pressure of 0.5 bar. The filter is replaced with a Millipore 5 μm SVPP filter and the filtration is repeated.

The solid content of the filtered binder is measured 3 times and the average is calculated by weighing an empty DSC pan using a DSC microbalance, adding approximately 40 mg of the binder mixture to the DSC pan and recording the mass, placing the pan on a 60° C. hotplate for 1 hour followed by 110° C. hotplate for 10 min, removing the pan from the hotplate and allowing to cool, recording the mass of the dry pan, and calculating the solid content.

Reference Examples 5, 6, 7, 8, 9 and 10

Preparation of 30% Solid Content Acrylate-Modified PVA Binders

The products of Synthesis Examples 1, 2, 3, 4, 5 and 6 are respectively dissolved in water to give 30% solutions of the respective modified PVA binders.

Preparation of Composite Systems

Comparative Example 2

A concentrated nanocapsule sample as prepared in Reference Example 1 is added to the PVA as prepared in Comparative Example 1, wherein the 30% washed 31 k PVA mixture is added in 2.5 ml vials, and then the nanocapsules are added to the vials. The weight ratio of PVA to capsules is 60:40. Deionized water is added to give a total solids content of 20%. The mixture is stirred using a vortex stirrer and leaving the mixture on a roller (Ratek RM5 Heavy Duty Roller) overnight to allow the PVA to disperse.

Film Preparation on Substrate

The substrate used is IPS (in-plane switching) glass having indium tin oxide (ITO) coated interdigitated electrodes with an electrode width of 4 μm and a gap of 8 μm. Prior to use the substrate is washed with deionised water and placed in a sonicator for 10 minutes, then washed with acetone, 2-propanol (IPA) and finally water for ion-chromatography. The substrate is then dried using a compressed air gun. The substrate is then treated with UV-ozone for 10 minutes.

The composite system comprising the nanocapsules and the binder are then coated on the substrate. 40 μL of the mixture is coated as a film using a coating machine (K Control Coater, RK PrintCoat Instruments, bar coating with k bar 1, coating speed of 7). The sample is dried at 60° C. for 10 minutes on a hotplate. The appearance of the film is recorded. The prepared film is stored in a dry box between measurements.

Film thickness is measured by removing a small area of the film from above the electrical contacts with a razor blade. The film thickness is measured in the region of the middle electrode using a profilometer (Dektak XT surface profiler, Bruker) with a stylus force of 5 mg and a scan length of 3000 nm and a time of 30 s.

Measurement of Electro-Optical Properties

The appearance of the respective films is checked by eye for uniformity and defects. Wires are soldered onto the ITO electrodes of the substrate. Voltage-transmission curves are measured using a display measurement system (Autronic-Melchers DMS-301) with applying a field of 1 kHz.

Images of the dark and light state are also recorded using a microscope, in the absence of an electric field for the dark state and with an applied electric field at the required voltages for respectively 10% and 90% transmission.

Switching speeds are measured at 40° C. and 25° C. at 150 Hz modulation frequency, and also at 10 Hz as appropriate.

The measured electro-optical parameters for the prepared film comprising the nanocapsules and the binder are given in the following Table. In this Comparative Example and the following Examples hysteresis is determined at $V_{50}$.

| | |
| --- | --- |
| film thickness | 3.8 μm |
| dark state transmission | 1.17% |
| bright state transmission | 16.2% |
| $V_{90}$ | 30.5 V |
| hysteresis | 3.25 V |

Working Example 1

A concentrated nanocapsule sample as prepared in Reference Example 1 is added to the binder formulation as prepared in Reference Example 5 containing the acrylate-modified PVA binder as prepared in Synthesis Example 1. The weight ratio of PVA to capsules is 60:40. To the mixture photoinitiator Irgacure 2959 (2-hydroxy-4'-(2-hydroxyethoxy)-2-methylpropiophenone, from Sigma-Aldrich) (5% by weight relative to the weight of the solid modified PVA polymer) is added.

The mixture is then treated and measured as described in Comparative Example 2.

After measuring the electro-optical properties of the prepared film, the film is cured using broad band UV light (UVACUBE 2000, Dr. Hönle AG) at 80 mW/cm² with an exposure time of 3 minutes.

The measured electro-optical parameters for the prepared film before and after curing with UV light are given in the following Table.

|  | before curing | after curing |
|---|---|---|
| film thickness | 3.5 μm |  |
| dark state transmission | 1.02% | 0.28% |
| bright state transmission | 14.9% | 8.4% |
| $V_{90}$ | 35.0 V | 30.0 V |
| hysteresis | 4.75 V | 0.50 V |

Among other advantages, in particular an improved dark state and a reduced hysteresis are obtained.

Working Example 2

A concentrated nanocapsule sample as prepared in Reference Example 1 is added to the binder formulation as prepared in Reference Example 5 containing the acrylate-modified PVA binder as prepared in Synthesis Example 1. The weight ratio of PVA to capsules is 60:40. To the mixture photoinitiator TPO (2,4,6-trimethylbenzoyl-diphenylphosphine oxide, from Sigma-Aldrich) (5% by weight relative to the weight of the solid modified PVA polymer) is added.

The mixture is then treated and measured as described in Comparative Example 2.

After measuring the electro-optical properties of the prepared film, the film is cured using broad band UV light (UVACUBE 2000, Dr. Hönle AG) at 80 mW/cm² with an exposure time of 30 seconds.

The measured electro-optical parameters for the prepared film before and after curing with UV light are given in the following Table.

|  | before curing | after curing |
|---|---|---|
| film thickness | 2.8 μm |  |
| dark state transmission | 0.32% | 0.18% |
| bright state transmission | 11.1% | 8.4% |
| $V_{90}$ | 33.0 V | 36.0 V |
| hysteresis | 0.75 V | 0.75 V |

Among other advantages, in particular an improved dark state and a reduced hysteresis are obtained.

Working Example 3

A concentrated nanocapsule sample as prepared in Reference Example 1 is added to the binder formulation as prepared in Reference Example 5 containing the acrylate-modified PVA binder as prepared in Synthesis Example 1. The weight ratio of PVA to capsules is 60:40. To the mixture photoinitiator TPO (2,4,6-trimethylbenzoyl-diphenylphosphine oxide, from Sigma-Aldrich) (5% by weight relative to the weight of the solid modified PVA polymer) is added.

The mixture is then treated and measured as described in Comparative Example 2.

After measuring the electro-optical properties of the prepared film, the film is cured using an LED (365 nm, 80 mW/cm², Delolux) with an exposure time of 1 minutes.

The measured electro-optical parameters for the prepared film before and after curing with UV light are given in the following Table.

|  | before curing | after curing |
|---|---|---|
| film thickness | 2.9 μm |  |
| dark state transmission | 0.3% | 0.16% |
| bright state transmission | 11.2% | 9.0% |
| $V_{90}$ | 35.0 V | 40.0 V |
| hysteresis | 0.50 V | 0.50 V |

Among other advantages, in particular an improved dark state and a reduced hysteresis are obtained.

Working Example 4

A concentrated nanocapsule sample as prepared in Reference Example 1 is added to the binder formulation as prepared in Reference Example 5 containing the acrylate-modified PVA binder as prepared in Synthesis Example 1. The weight ratio of PVA to capsules is 60:40. To the mixture 5% by weight, relative to the solid weight of the binder, of initiator AIBN (2,2'-azobis(2-methylpropionitrile), from Sigma-Aldrich) is added.

The mixture is then treated and measured as described in Comparative Example 2.

After measuring the electro-optical properties of the prepared film, the film is cured on a hotplate at 75° C. for 2 h under nitrogen.

The measured electro-optical parameters for the prepared film before and after thermal curing are given in the following Table.

|  | before curing | after curing |
|---|---|---|
| film thickness | 3.3 μm |  |
| dark state transmission | 0.96% | 0.65% |
| bright state transmission | 16.3% | 17.6% |
| $V_{90}$ | 34.5 V | 37.5 V |
| hysteresis | 3.75 V | 2.50 V |

Among other advantages, in particular an improved dark state, a favourable bright state transmission and a reduced hysteresis are obtained.

Working Example 5

A concentrated nanocapsule sample as prepared in Reference Example 1 is added to the binder formulation as prepared in Reference Example 6 containing the acrylate-modified PVA binder as prepared in Synthesis Example 2. The weight ratio of PVA to capsules is 60:40. To the mixture 5% by weight, relative to the solid weight of the binder, of photoinitiator TPO (2,4,6-trimethylbenzoyl-diphenylphosphine oxide, from Sigma-Aldrich) is added.

The mixture is then treated and measured as described in Comparative Example 2.

After measuring the electro-optical properties of the prepared film, the film is cured using an LED (Delolux from DELO, wavelength 365 nm) initially using an exposure time of 20 seconds at 60 mW/cm², followed by an exposure at 80 mW/cm² for 60 seconds.

The measured electro-optical parameters for the prepared film before and after curing with UV light are given in the following Tables.

|  | before curing | after curing |
|---|---|---|
| film thickness | 3.4 μm |  |
| dark state transmission | 0.72% | 0.41% |
| bright state transmission | 14.6% | 12.1% |
| $V_{90}$ | 25.5 V | 37.5 V |
| hysteresis | 0.75 V | 0.50 V |

Among other advantages, in particular an improved dark state and a reduced hysteresis and similar transmission are obtained.

Working Example 6

A concentrated nanocapsule sample as prepared in Reference Example 1 is added to the binder formulation as prepared in Reference Example 7 containing the acrylate-modified PVA binder as prepared in Synthesis Example 3. The weight ratio of PVA to capsules is 60:40. To the mixture 5% by weight, relative to the solid weight of the binder, of photoinitiator TPO (2,4,6-trimethylbenzoyl-diphenylphosphine oxide, from Sigma-Aldrich) is added.

The mixture is then treated and measured as described in Comparative Example 2.

After measuring the electro-optical properties of the prepared film, the film is cured using an LED (Delolux from DELO, wavelength 365 nm) using an exposure at 80 mW/cm² for 60 seconds.

The measured electro-optical parameters for the prepared film before and after curing with UV light are given in the following Table.

|  | before curing | after curing |
|---|---|---|
| film thickness | 3.8 μm |  |
| dark state transmission | 0.47% | 0.27% |
| bright state transmission | 9.4% | 6.8% |
| $V_{90}$ | 27 V | 34 V |
| hysteresis | 0.75 V | 0.50 V |

Among other advantages, in particular an improved dark state and a reduced hysteresis are obtained.

Working Example 7

A concentrated nanocapsule sample as prepared in Reference Example 1 is added to the binder formulation as prepared in Reference Example 8 containing the acrylate-modified PVA binder as prepared in Synthesis Example 4. The weight ratio of PVA to capsules is 60:40. To the mixture 5% by weight, relative to the solid weight of the binder, of photoinitiator TPO (2,4,6-trimethylbenzoyl-diphenylphosphine oxide, from Sigma-Aldrich) is added.

The mixture is then treated and measured as described in Comparative Example 2.

After measuring the electro-optical properties of the prepared film, the film is cured using an LED (Delolux from DELO, wavelength 365 nm) using an exposure at 80 mW/cm² for 60 seconds.

The measured electro-optical parameters for the prepared film before and after curing with UV light are given in the following Table.

|  | before curing | after curing |
|---|---|---|
| film thickness | 3.0 μm |  |
| dark state transmission | 0.3% | 0.15% |
| bright state transmission | 6.8% | 5.8% |
| $V_{90}$ | 29 V | 21 V |
| hysteresis | 0.75 V | 0.50 V |

Among other advantages, in particular an improved dark state and a reduced hysteresis are obtained.

Working Example 8

A concentrated nanocapsule sample as prepared in Reference Example 1 is added to the binder formulation as prepared in Reference Example 10 containing the acrylate-modified PVA binder as prepared in Synthesis Example 6. The weight ratio of PVA to capsules is 60:40. To the mixture 5% by weight, relative to the solid weight of the binder, of photoinitiator TPO (2,4,6-trimethylbenzoyl-diphenylphosphine oxide, from Sigma-Aldrich) is added.

The mixture is then treated and measured as described in Comparative Example 2.

After measuring the electro-optical properties of the prepared film, the film is cured using an LED (Delolux from DELO, wavelength 365 nm) initially using an exposure time of 3 seconds at 80 mW/cm², followed by an exposure at 60 mW/cm² for 30 seconds.

The measured electro-optical parameters for the prepared film before and after curing with UV light are given in the following Table.

|  | before curing | after curing |
|---|---|---|
| film thickness | 3.4 μm |  |
| dark state transmission | 0.73% | 0.34% |
| bright state transmission | 14.7% | 15.8% |
| $V_{90}$ | 34 V | 44.5 V |
| hysteresis | 1.25 V | 1.25 V |

Among other advantages, in particular an improved dark state is obtained.

Working Examples 9, 10 and 11

Concentrated nanocapsule samples as prepared respectively in Reference Example 2, Reference Example 3 and Reference Example 4 are respectively added to the binder formulation as prepared in Reference Example 5 containing the acrylate-modified PVA binder as prepared in Synthesis Example 1. The mixtures are then treated as further described in Working Example 4.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for preparing a composite, wherein the method comprises
   (i) providing nanocapsules which comprise a polymeric shell and a core containing a liquid crystalline medium, and
   (ii) mixing the nanocapsules with a polymer comprising one or more of the repeating units A and/or B

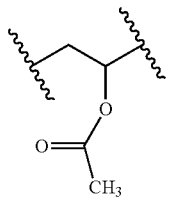
A

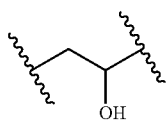
B and one or more of the repeating units C and/or D

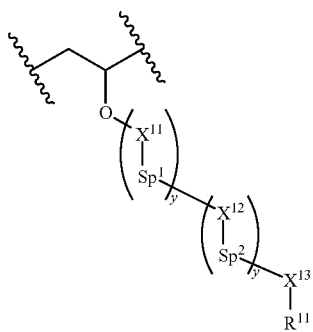
C

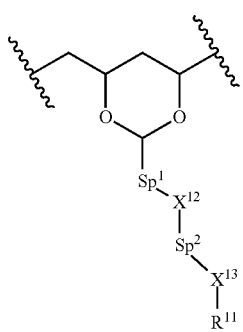
D wherein
Sp$^1$ and Sp$^2$ respectively represent a spacer group,
X$^{11}$ represents CH$_2$, CO, S—CO or NH—CO,
y is, independently in each occurrence, 0 or an integer from 1 to 10,
X$^{12}$ represents, independently in each occurrence, O, S, CO, NH or an ester group,
X$^{13}$ represents, independently in each occurrence, O, S, CO, NH or single bond, and
R$^{11}$ is a polymerizable group.

2. The method according to claim 1, wherein the polymer which is mixed with the nanocapsules in step (ii) has an average molecular weight within the range of 5,000 g/mol to 250,000 g/mol.

3. The method according to claim 1, wherein
   the amount of the repeating unit A in the polymer is in the range from 0 to 90 mol %, and/or
   the amount of the repeating unit B in the polymer is in the range from 1 mol % to 98 mol %, and/or
   the amount of the repeating unit C in the polymer is in the range from 0 mol % to 80 mol %, and/or
   the amount of the repeating unit D in the polymer is in the range from 0 mol % to 80 mol %,
and
wherein the combined amounts of the repeating units A, B, C and D, if respectively present, in the polymer is 100 mol % or less.

4. The method according to claim 1, wherein R$^{11}$ is an acryloyl group or a methacryloyl group.

5. The method according to claim 1, wherein di- or multireactive monomeric or oligomeric polymerizable compounds are further comprised in the composite.

6. The method according to claim 1, wherein in step (ii) the nanocapsules are dispersed in the polymer to prepare a dispersion, and wherein subsequently the dispersion is arranged as a layer supported on a substrate or as a layer between two opposing substrates.

7. The method according to claim 1, wherein the method further comprises polymerization of the polymerizable groups of the prepared composite.

8. A composite obtained by carrying out the method according to claim 1.

9. A composite, comprising
   nanocapsules which comprise a polymeric shell and a core containing a liquid crystalline medium, and
   a polymer containing the nanocapsule dispersed therein comprising one or more of the repeating units A and/or B and one or more of the repeating units C and/or D:

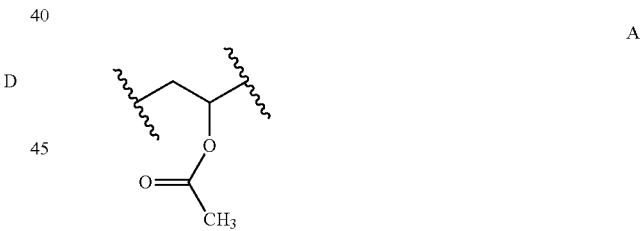
A

B

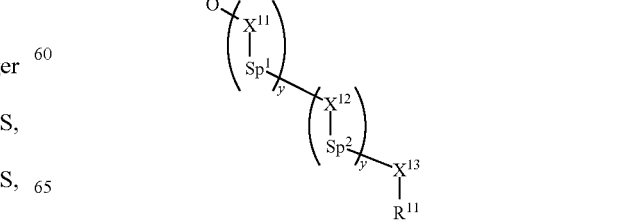
C

-continued

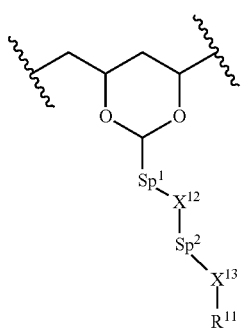
D wherein
Sp¹ and Sp² respectively represent a spacer group,
X¹¹ represents $CH_2$, CO, S—CO or NH—CO,
y is, independently in each occurrence, O or an integer from 1 to 10,
X¹² represents, independently in each occurrence, O, S, CO, NH or an ester group,
X¹³ represents, independently in each occurrence, O, S, CO, NH or single bond, and
R¹¹ is a polymerizable group.

10. The composite according to claim 9, wherein the liquid crystalline medium comprises one or more compounds of formula I

R-A-Y-A'-R'    I wherein
R and R' denote, independently of one another, a group selected from F, $CF_3$, $OCF_3$, CN, and straight-chain or branched alkyl or alkoxy having 1 to 15 carbon atoms or straight-chain or branched alkenyl having 2 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another,
A and A' denote, independently of one another, a group selected from -Cyc-, -Phe-, -Cyc-Cyc-, -Cyc-Phe-, -Phe-Phe-, -Cyc-Cyc-Cyc-, -Cyc-Cyc-Phe-, -Cyc-Phe-Cyc-, -Cyc-Phe-Phe-, -Phe-Cyc-Phe-, -Phe-Phe-Phe- and the respective mirror images thereof, wherein Cyc is trans-1,4-cyclohexylene, in which one or two non-adjacent $CH_2$ groups may be replaced by O,
and wherein Phe is 1,4-phenylene, in which one or two non-adjacent CH groups may be replaced by N and which may be substituted by one or two F, and
Y denotes single bond, —COO— —$CH_2CH_2$—, —$CF_2CF_2$—, —$CH_2O$—, —$CF_2O$—, —CH=CH—, —CF=CF— or —C≡C—.

11. The composite according to claim 10, wherein one or more compounds of the formula I are selected from the compounds of formulae Ia, Ib, Ic and Id

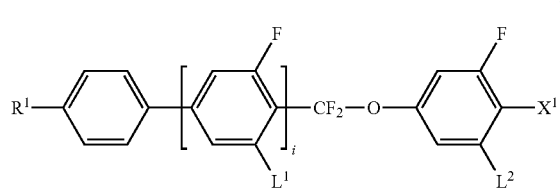
Ia

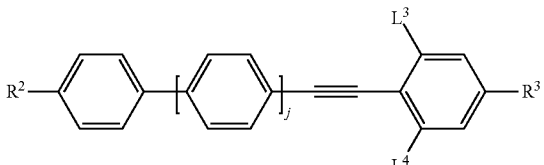
Ib

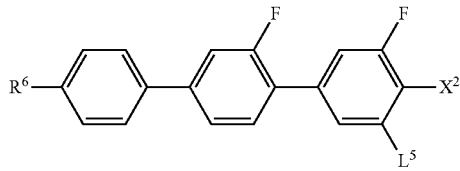
Ic

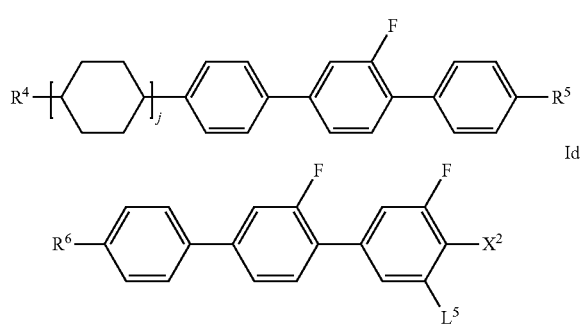
Id wherein
R¹, R², R³, R⁴, R⁵ and R⁶ denote, independently of one another, straight-chain or branched alkyl or alkoxy having 1 to 15 carbon atoms or straight-chain or branched alkenyl having 2 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another,
X¹ and X² denote, independently of one another, F, $CF_3$, $OCF_3$ or CN,
L¹, L², L³, L⁴ and L⁵ are, independently of one another, H or F,
i is 1 or 2, and
j and k are, independently of one another, 0 or 1.

12. A switching layer, comprising nanocapsules which comprise a polymeric shell and a core containing a liquid crystalline medium, wherein the nanocapsules are dispersed in a polymeric binder which polymeric binder comprises a polymer obtained by polymerizing a polymer comprising one or more of the repeating units A and/or B and one or more of the repeating units C and/or D:

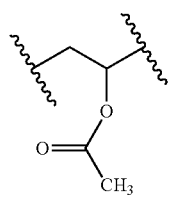
A

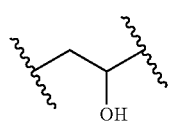
B

-continued

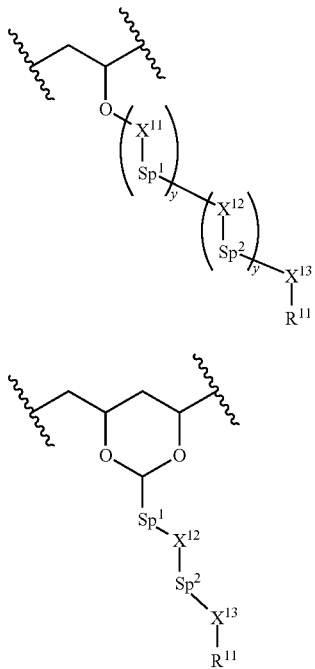

wherein
$Sp^1$ and $Sp^2$ respectively represent a spacer group,
$X^{11}$ represents $CH_2$, CO, S—CO or NH—CO,
y is, independently in each occurrence, O or an integer from 1 to 10,
$X^{12}$ represents, independently in each occurrence, O, S, CO, NH or an ester group,
$X^{13}$ represents, independently in each occurrence, O, S, CO, NH or single bond, and
$R^{11}$ is a polymerizable group.

13. A light-modulation element which comprises a composite according to claim 8.

14. A light-modulation element which comprises a switching layer according to claim 12.

15. An electro-optical device, comprising a composite according to claim 8.

16. An electro-optical device, comprising a switching layer according to claim 12.

17. The composite of claim 9, wherein the polymer has an average molecular weight within the range of 5,000 g/mol to 250,000 g/mol.

18. The composite of claim 9, wherein
the amount of the repeating unit A in the polymer is in the range from 0 to 90 mol %, and/or
the amount of the repeating unit B in the polymer is in the range from 1 mol % to 98 mol %, and/or
the amount of the repeating unit C in the polymer is in the range from 0 mol % to 80 mol %, and/or
the amount of the repeating unit D in the polymer is in the range from 0 mol % to 80 mol %,
and
wherein the combined amounts of the repeating units A, B, C and D, if respectively present, in the polymer is 100 mol % or less.

19. The composite of claim 9, wherein $R^{11}$ is an acryloyl group or a methacryloyl group.

20. The composite of claim 9, wherein $R^{11}$ is one of the following groups:

$CH_2$=$CW^1$—COO—,

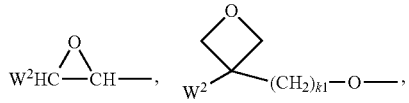

$CH_2$=$CW^2$—(O)$_{k1}$—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, Phe-CH=CH—, HOOC—, OCN—, with $W^1$ being H, Cl, CN, phenyl or alkyl with 1 to 5 C atoms, $W^2$ and $W^3$ being independently of each other H or alkyl with 1 to 5 C atoms, Phe being 1,4-phenylene and $k_1$ and $k_2$ being independently of each other 0 or 1.

* * * * *